United States Patent
Faulkner et al.

(10) Patent No.: US 11,486,380 B2
(45) Date of Patent: Nov. 1, 2022

(54) HYDRAULIC AND CONTROL SYSTEM FOR RESIN INJECTION

(71) Applicant: J-LOK Co., Pittsburgh, PA (US)

(72) Inventors: Dakota Faulkner, Wexford, PA (US); Mark Crable, Adah, PA (US); Michael Weaver, Pittsburgh, PA (US)

(73) Assignee: J-LOK Co., Pittsburgh, PA (US)

( * ) Notice: Subject to any disclaimer, the term of this patent is extended or adjusted under 35 U.S.C. 154(b) by 0 days.

(21) Appl. No.: 17/408,570

(22) Filed: Aug. 23, 2021

(65) Prior Publication Data

US 2021/0381501 A1 Dec. 9, 2021

Related U.S. Application Data

(63) Continuation of application No. 16/182,994, filed on Nov. 7, 2018, now Pat. No. 11,156,217.

(60) Provisional application No. 62/584,461, filed on Nov. 10, 2017.

(51) Int. Cl.

| B32B 41/00 | (2006.01) |
|---|---|
| F04B 43/02 | (2006.01) |
| E21D 20/02 | (2006.01) |
| F04B 15/02 | (2006.01) |
| F04B 49/06 | (2006.01) |
| F04B 49/08 | (2006.01) |
| F04B 23/04 | (2006.01) |

(Continued)

(52) U.S. Cl.
CPC ............ *F04B 43/02* (2013.01); *E21D 20/026* (2013.01); *E21D 20/028* (2013.01); *F04B 9/113* (2013.01); *F04B 15/02* (2013.01); *F04B 23/04* (2013.01); *F04B 23/06* (2013.01); *F04B 49/065* (2013.01); *F04B 49/08* (2013.01); *F04B 2201/0201* (2013.01)

(58) Field of Classification Search
CPC .......... F04B 43/02; F04B 9/113; F04B 15/02; F04B 23/04; F04B 23/06; F04B 49/065; F04B 49/08; F04B 2201/0201; E21D 20/026; E21D 20/028; E21D 20/025
USPC ................... 156/60, 64, 350, 351, 378, 379
See application file for complete search history.

(56) References Cited

U.S. PATENT DOCUMENTS

| 4,611,982 A | 9/1986 | Haeuser et al. |
|---|---|---|
| 4,744,699 A | 5/1988 | Price et al. |
| 10,487,655 B2 | 11/2019 | Faulkner et al. |

(Continued)

FOREIGN PATENT DOCUMENTS

| CN | 202883286 U | 4/2013 |
|---|---|---|
| CN | 203248430 U | 10/2013 |

(Continued)

*Primary Examiner* — Michael N Orlando
*Assistant Examiner* — Joshel Rivera
(74) *Attorney, Agent, or Firm* — The Webb Law Firm

(57) ABSTRACT

A pumpable resin system for installation of mine bolts includes a resin injection cylinder comprising a resin chamber and a resin hydraulic cylinder, a catalyst injection cylinder including a catalyst chamber and a catalyst hydraulic cylinder, with the resin hydraulic cylinder synchronized with the catalyst hydraulic cylinder, a hydraulic pump in fluid communication with the resin hydraulic cylinder and the catalyst hydraulic cylinder, a hydraulic reservoir in fluid communication with the hydraulic pump, and a delivery line in fluid communication with the resin injection cylinder and the catalyst injection cylinder. The delivery line is configured to deliver resin and catalyst from the resin injection cylinder and catalyst injection cylinder into a borehole.

9 Claims, 45 Drawing Sheets

(51) Int. Cl.
*F04B 9/113* (2006.01)
*F04B 23/06* (2006.01)

(56) References Cited

U.S. PATENT DOCUMENTS

| | | |
|---|---|---|
| 2007/0264088 A1 | 11/2007 | Richter |
| 2011/0070035 A1 | 3/2011 | Ricardo |
| 2012/0282039 A1 | 11/2012 | Hussey et al. |
| 2014/0140773 A1 | 5/2014 | Brown |
| 2020/0018165 A1 | 1/2020 | Faulkner et al. |

FOREIGN PATENT DOCUMENTS

| | | |
|---|---|---|
| GB | 2043748 A | 10/1980 |
| WO | 2014190382 A1 | 12/2014 |
| WO | 2016141008 A1 | 9/2016 |

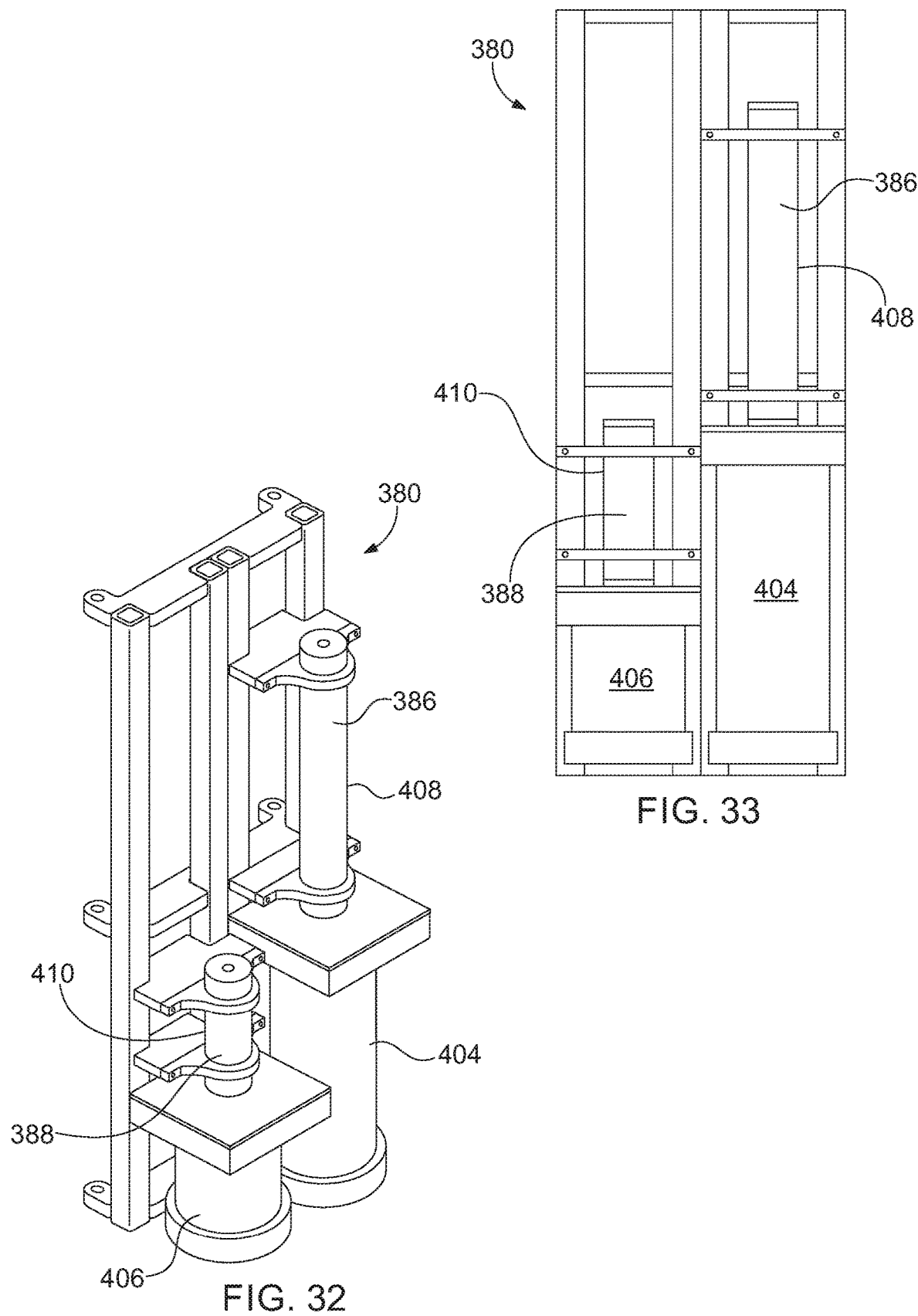

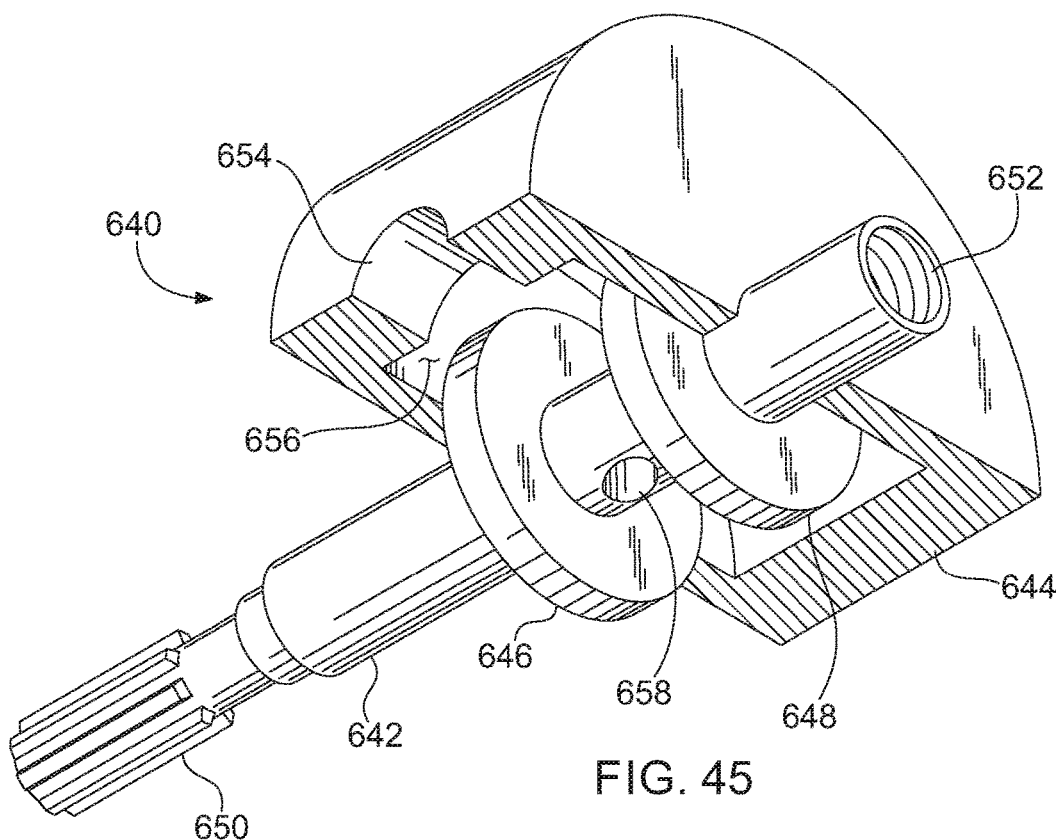
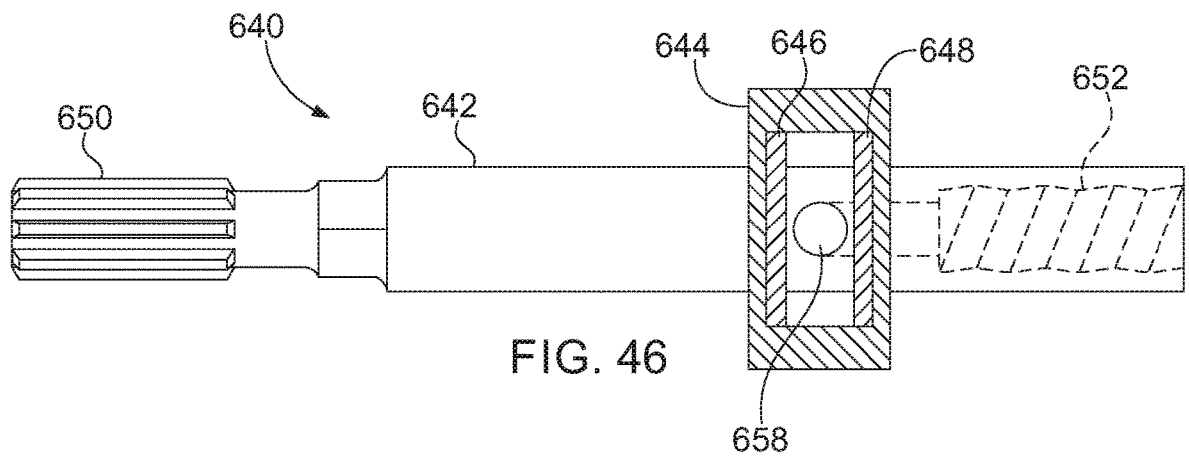

HYDRAULIC AND CONTROL SYSTEM FOR RESIN INJECTION

CROSS-REFERENCE TO RELATED APPLICATIONS

This application is a continuation of U.S. patent application Ser. No. 16/182,994 filed Nov. 7, 2018, which claims the benefit of U.S. Provisional Application No. 62/584,461, filed Nov. 10, 2017, both of which are hereby incorporated by reference in their entirety.

BACKGROUND OF THE INVENTION

Field of the Invention

The present invention relates to a pumpable two component resin system and, more particularly, to fittings for pumpable resin systems.

Description of Related Art

The roof of a mine is conventionally supported by tensioning the roof with steel bolts inserted into boreholes drilled in the mine roof that reinforce the unsupported rock formation above the mine roof. The mine roof bolt may be anchored mechanically to the rock formation by engagement of an expansion assembly on the distal end of the mine roof bolt with the rock formation. Alternatively, the mine roof bolt may be adhesively bonded to the rock formation with a resin bonding material inserted into the borehole. A combination of mechanical anchoring and resin bonding may also be employed by using both an expansion assembly and resin bonding material.

When resin bonding material is utilized, the bonding material penetrates the surrounding rock formation to adhesively join the rock strata and to firmly hold the mine roof bolt within the borehole. Resin is typically inserted into the mine roof borehole in the form of a two component plastic cartridge having one component containing a curable resin composition and another component containing a curing agent (catalyst). The two component resin cartridge is inserted into the blind end of the borehole and the mine roof bolt is inserted into the borehole such that the end of the mine roof bolt ruptures the two component resin cartridge. Upon rotation of the mine roof bolt about its longitudinal axis, the compartments within the resin cartridge are shredded and the components are mixed. The resin mixture fills the annular area between the borehole wall and the shaft of the mine roof bolt. The mixed resin cures and binds the mine roof bolt to the surrounding rock. The mine roof bolt is typically rotated via a drive head.

SUMMARY OF THE INVENTION

In one aspect, a pumpable resin system for installation of mine bolts includes a resin injection cylinder including a resin chamber and a resin hydraulic cylinder, a catalyst injection cylinder including a catalyst chamber and a catalyst hydraulic cylinder, with the resin hydraulic cylinder synchronized with the catalyst hydraulic cylinder, a hydraulic pump in fluid communication with the resin hydraulic cylinder and the catalyst hydraulic cylinder, a hydraulic reservoir in fluid communication with the hydraulic pump, and a delivery line in fluid communication with the resin injection cylinder and the catalyst injection cylinder, with the delivery line configured to deliver resin and catalyst from the resin injection cylinder and catalyst injection cylinder into a borehole.

The resin hydraulic cylinder and the catalyst hydraulic cylinder may be double-acting cylinders, with the resin hydraulic cylinder fluidly connected to the catalyst hydraulic cylinder in series such that movement of the resin hydraulic cylinder results in corresponding movement of the catalyst hydraulic cylinder. The resin hydraulic cylinder and the catalyst hydraulic cylinder may be identical in size. The resin chamber may have a larger volume than the catalyst chamber. The system may further include a synchronizing cylinder in fluid communication with the resin hydraulic cylinder and the catalyst hydraulic cylinder.

The resin hydraulic cylinder, the synchronizing cylinder, and the catalyst hydraulic cylinder may each include first and second chambers positioned on opposite sides of a piston, with the first chamber of the resin hydraulic cylinder in fluid communication with the hydraulic pump, the second chamber of the resin hydraulic cylinder in fluid communication with the second chamber of the synchronizing cylinder, the first chamber of the synchronizing cylinder in fluid communication with the first chamber of the catalyst hydraulic cylinder, and the second chamber of the catalyst hydraulic cylinder in fluid communication with the hydraulic reservoir. The resin hydraulic cylinder, the synchronizing cylinder, and the catalyst hydraulic cylinder may be identical in size. The resin chamber has a larger volume than the catalyst chamber. The resin hydraulic cylinder, the synchronizing cylinder, and the catalyst hydraulic cylinder may each be configured to be actuated independently.

The system may further include a resin load cylinder in fluid communication with the resin injection cylinder, and a catalyst load cylinder in fluid communication with the catalyst injection cylinder.

In a further aspect, a computer-implemented method for controlling a pumpable resin system including resin and catalyst injection cylinders, a hydraulic pump, a hydraulic reservoir, a control panel, and a control module, includes: receiving an injection input from the control panel; determining with at least one processor resin and catalyst volumes within the resin and catalyst injection cylinders; determining with at least one processor whether sufficient volumes of resin and catalyst are available for executing the injection input; generating a signal for the hydraulic pump to actuate the resin and catalyst cylinders; and determining with at least one processor whether a resin and catalyst value corresponding to the injection input has been obtained.

The resin and catalyst value may be a resin and catalyst injection volume. The resin and catalyst value may be a resin and catalyst injection pressure.

The method may further include displaying a load cylinder notification on the control panel if insufficient volume of resin or catalyst is available. The injection input may be an automatic injection input and a manual injection input, with the automatic injection input including preprogrammed resin and catalyst values, and the manual injection input including user-inputted resin and catalyst values. The preprogrammed resin and catalyst values may be at least one of resin and catalyst volumes and resin and catalyst injection pressures.

The method may further include actuating isolating valves to isolate the resin injection cylinder or the catalyst injection cylinder when the injection input comprises the manual injection input.

The method may further include pre-pressurizing the resin injection cylinder and the catalyst injection cylinder. Pre-pressurizing the resin injection cylinder and the catalyst injection cylinder may include: determining with at least one processor a pressure within the resin and catalyst injection cylinders; and separately increasing pressure within the resin and catalyst injection cylinders until a predetermined pressure value within the resin and catalyst injection cylinder is reached.

The pumpable resin system for installation of mine bolts further may include a synchronizing cylinder, with the method further including: determining with at least one processor a position of a piston of the synchronizing cylinder; and moving the piston of the synchronizing cylinder independently from the resin injection cylinder and the catalyst injection cylinder.

The method may further include: determining with at least one processor a volumetric ratio of resin and catalyst leaving the resin injection cylinder and the catalyst injection cylinder based on a position of the resin and catalyst injection cylinders; and displaying the volumetric ratio of resin and catalyst on the control panel. The method may further include displaying or providing an audible alarm when the volumetric ratio of resin and catalyst is below a predetermined ratio value. The predetermined ratio value may be a 2:1 resin to catalyst ratio.

In another aspect, a system for controlling a pumpable resin system comprising resin and catalyst injection cylinders, a hydraulic pump, and a hydraulic reservoir, the system including: (a) control panel comprising a display and a user input device; (b) a control module comprising at least one processor programmed or configured to: (i) receive an injection input from the control panel; (ii) determine resin and catalyst volumes within respective resin and catalyst injection cylinders; (iii) determine whether sufficient volumes of resin and catalyst are available for executing the injection input; (iv) generate a signal for the hydraulic pump to actuate the resin and catalyst cylinder; and (v) determine whether a resin and catalyst value corresponding to the injection input has been obtained.

The resin and catalyst value may be at least one of a resin and catalyst injection volume and a resin and catalyst injection pressure. The at least one processor may be further programmed or configured to: (vi) provide an automatic injection profile and a manual injection profile, with the automatic injection profile comprising preprogrammed resin and catalyst volumes, and the manual injection profile including user-inputted resin and catalyst volumes.

The pumpable resin system may further include a synchronizing cylinder, and the system may further include: (c) a resin cylinder encoder, a catalyst cylinder encoder, and a synchronizing cylinder encoder each configured to provide an output corresponding to a position of a piston of the resin and catalyst injection cylinders and synchronizing cylinder, respectively.

The pumpable resin system may further include a synchronizing cylinder, and the at least one processor may be further programmed or configured to: (vi) independently control the synchronizing cylinder.

In a further aspect, a computer program product for controlling a pumpable resin system including a control module, includes at least one non-transitory computer-readable medium including program instructions that, when executed by the control module, cause the control module to: receive an injection input from a control panel; determine resin and catalyst volumes within respective resin and catalyst injection cylinders; determine whether sufficient volumes of resin and catalyst are available for executing the injection input; generate a signal for the hydraulic pump to actuate the resin and catalyst cylinder; and determine whether a resin and catalyst value corresponding to the injection input has been obtained.

In another aspect, an injection fitting for a pumpable resin system includes a striker bar including a drive surface configured to engage a drive tool of a bolter machine and a threaded portion configured to secure the striker bar to a mine bolt, a grout body receiving a portion of the striker bar and defining an interior chamber, with the striker bar rotatable relative to the grout body, the grout body defining an injection port in fluid commination with the interior chamber, and a seal arrangement configured to provide a seal between the grout body and the striker bar, the striker bar defining an injection port positioned within the interior chamber of the grout body, the injection port of the striker bar configured to deliver fluid to a mine bolt secured to the threaded portion of the striker bar.

In a further aspect, an injecting fitting for a pumpable resin system includes a grout body including a shaft configured to be secured to a bolter arm of a bolter machine, the grout body defining an injection port configured to receive a delivery line for delivering resin and catalyst, a hydraulic motor secured to the grout body, and a rotatable body rotatable relative to the grout body via the hydraulic motor, the rotatable body including a threaded portion configured to be secured to a mine bolt, the rotatable body defining a passageway in fluid communication with the injection portion of the grout body.

The rotatable body may include a frusto-conical surface configured to engage and form a seal with a mine bolt.

BRIEF DESCRIPTION OF THE DRAWINGS

FIG. 32 is a perspective view of an injection cylinder set according to one aspect of the present invention.

FIG. 33 is a front view of the injection cylinder set of FIG. 32.

FIG. 45 is a partial cross-sectional perspective view of an injection fitting according to one aspect of the invention.

FIG. 46 is an elevational view of the injection fitting of FIG. 45.

DETAILED DESCRIPTION

Figure 1:
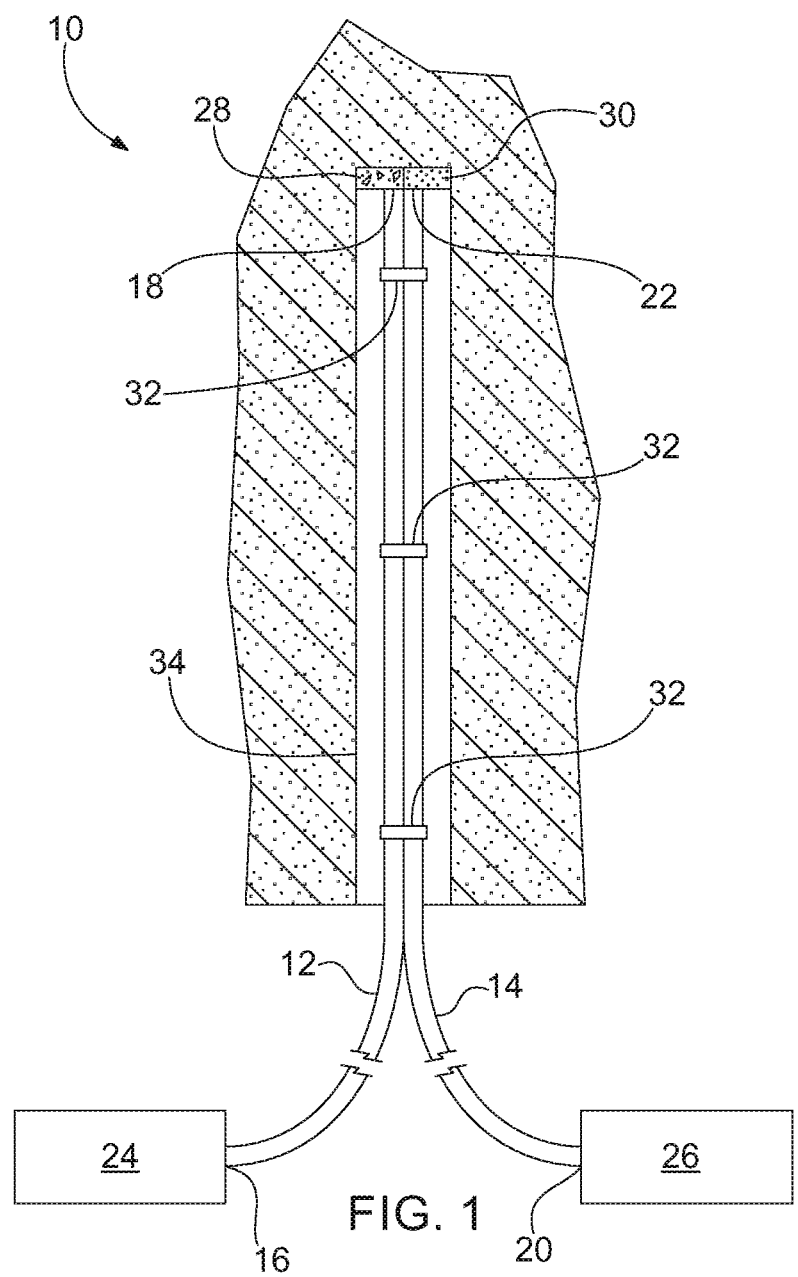
FIG. 1 is an elevational view of a pumping system and method for installing a mine roof bolt according to one aspect of the invention showing the filling of a rsi.

Aspects of the present invention will now be described with reference to the accompanying figures. For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is to be understood that the specific apparatus illustrated in the attached figures and described in the following specification is simply an exemplary aspect of the present invention.

Figure 2:
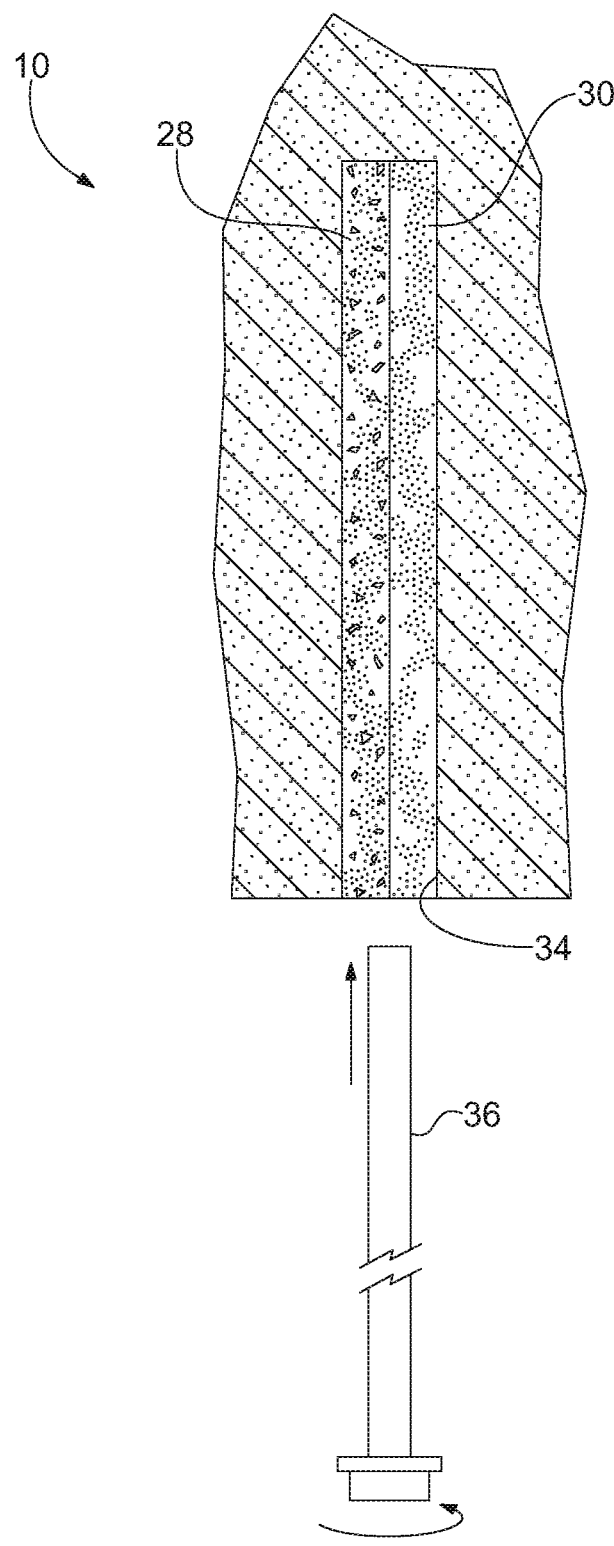
FIG. 2 is an elevational view of the system and method of FIG. 1 showing a mine roof bolt being inserted into a borehole.
Figure 3:
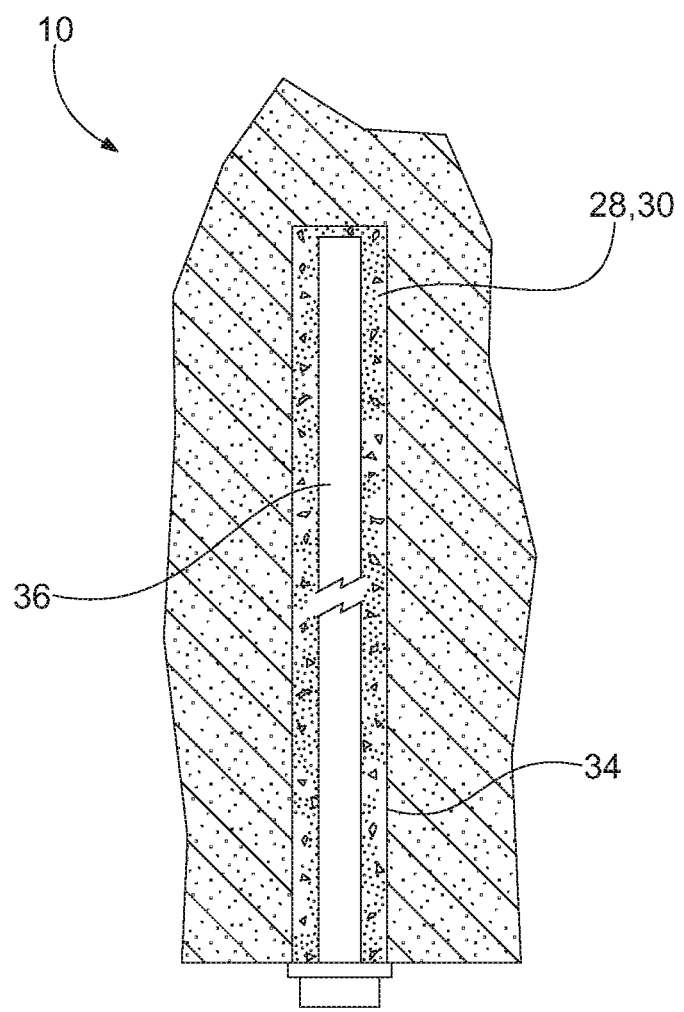
FIG. 3 is an elevational view of the system and method of FIG. 1 showing the mine roof bolt installed.

Referring to FIGS. 1-3, one aspect of a pumpable two component resin system 10 includes a delivery line formed by a resin line 12 and a catalyst line 14 that are configured to deliver grout, such as a resin 28 and a catalyst 30 to a borehole 34. The resin line 12 and the catalyst line 14 each have an inlet 16, 20 and an outlet 18, 22. The inlet 16 of the resin line 12 is connected to and in fluid communication with a resin pump 24. The inlet 20 of the catalyst line 14 is connected to and in fluid communication with a catalyst pump 26. The resin pump 24 and the catalyst pump 26 are connected to respective reservoirs (not shown) containing resin 28 and catalyst 30. The resin line 12 and the catalyst line 14 may be secured to each other via bands 32 to aid the insertion of the lines 12, 14 within a borehole 34. The resin and catalyst pumps 24, 26 may be chop check pumps, although other types of pumps suitable for pumping material of a high viscosity may also be utilized. The flow of each pump 24, 26 is calibrated to provide the proper ratio between the resin 28 and the catalyst 30, which is preferably 2:1 or 66% resin and 33% catalyst using a water-based catalyst. The ratio can range from about 4:1 to 3:2. With an oil-based catalyst, a 9:1+/−5% ratio is utilized. The flow of each pump 24, 26 may be calibrated by adjusting the air inlet pressure and the diameter of the outlets 18, 22 of the resin line 12 and the catalyst line 14. The resin 28 is a filled resin having 10-25% inert filler, such as limestone. The resin 28 may have a viscosity of about 100,000-400,000 centipoise. Conventional polyurethane resin typically has a viscosity of less than 10,000 centipoise. The use of a high viscosity resin generally makes pumping more difficult, but provides significant cost savings through the use of the less expensive filler.

Referring to FIG. 1, to start the filling of the borehole 34, the resin and catalyst lines 12, 14 are inserted into the borehole 34 and the pumps 24, 26 are activated simultaneously to fill the borehole 34 with the resin 28 and catalyst 30. As the resin 28 and catalyst 30 are pumped into the borehole 34, the lines 12, 14 are forced out of the borehole 34 by the displaced material ensuring a fully filled borehole 34. Alternatively, a packer or plug (not shown) slightly smaller than the inner diameter of the borehole 34 may be installed just before the end of the lines 12, 14.

Referring to FIGS. 2 and 3, the resin 28 and the catalyst 30 will contact each other and will react to create a very fine barrier, which will prevent further reaction from occurring between the resin 28 and the catalyst 30. A mine roof bolt 36 is then inserted into the borehole 34 and rotated to mix the resin 28 and catalyst 30. After the mine roof bolt 36 has been fully inserted, as shown in FIG. 3, the mixed resin 28 and catalyst 30 hardens and cures to securely anchor the bolt 36 within the borehole 34.

Figure 4:
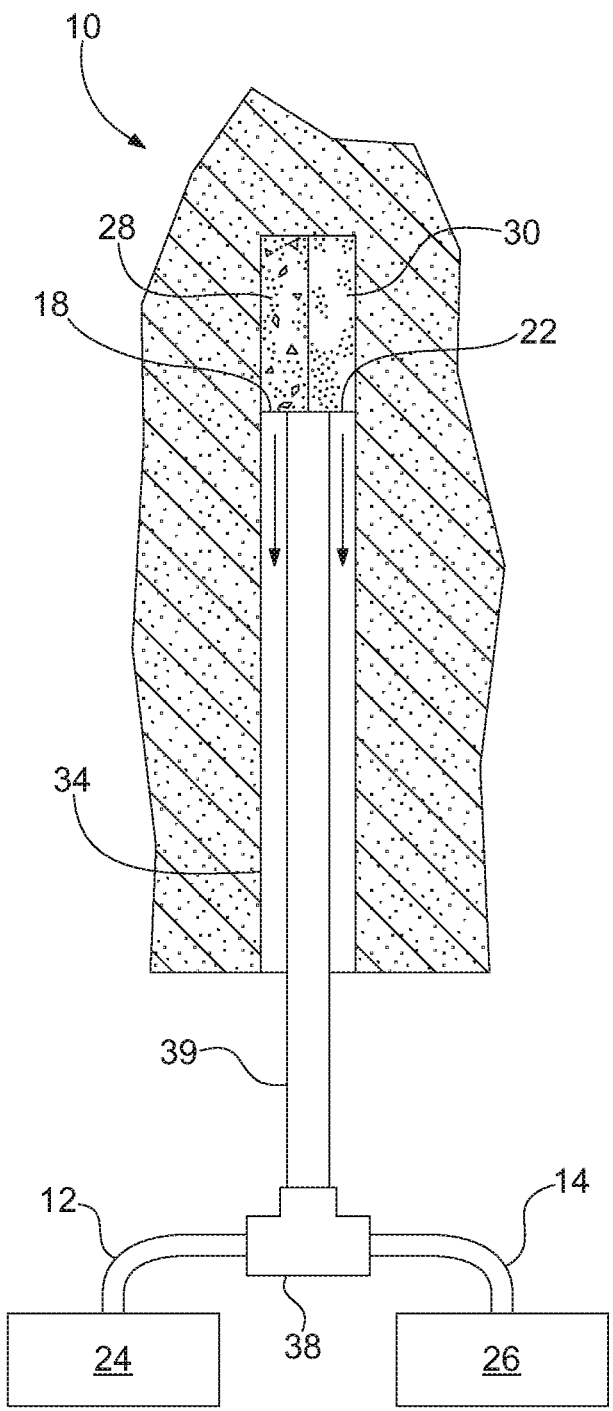
FIG. 4 is an elevational view of a pumping system and method for installing a mine roof bolt according to a second aspect of the invention.

Referring to FIG. 4, the pumpable two component resin system 10 may further include a connector 38, such as a wye or T connector, for receiving the resin line 12 and the catalyst line 14 from the resin pump 24 and the catalyst pump 26, respectively. The use of the connector 38 allows the resin and catalyst lines 12, 14 to be combined into a single grout tube 39 that is connected to the resin pump 24 and catalyst pump 26 through the connector 38. The single grout tube 39 acts as a delivery line and is configured to introduce the resin 28 and catalyst 30 into the borehole 34. The system 10 using the connector 38 would operate in the same manner as described above in connection with FIGS. 1-3.

Figure 5:
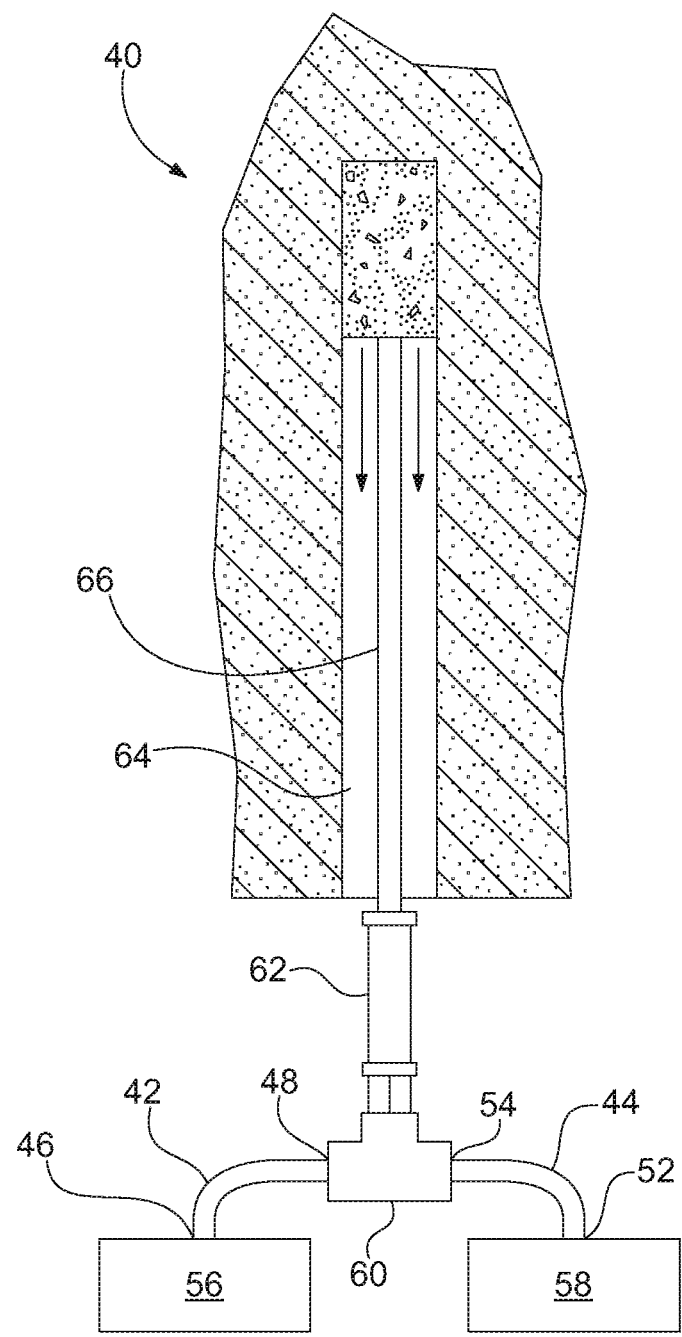
FIG. 5 is an elevational view of a pumping system and method for installing a mine roof bolt according to a third aspect of the invention.

Referring to FIG. 5, a third aspect of a pumpable two component resin system 40 includes a resin line 42 and a catalyst line 44. The resin line 42 and the catalyst line 44 each have an inlet 46, 52 and an outlet 48, 54. The inlets 46, 52 of the resin line 42 and the catalyst line 44 are connected to and in fluid communication with a resin pump 56 and a catalyst pump 58, respectively, in a similar manner as shown in FIG. 1 and discussed above. The outlets 48, 54 of the resin line 42 and the catalyst line 44, however, are connected to a connector 60, such as a wye or T fitting, which is secured to a static mixer 62. The static mixer 62 is configured to mix the resin 28 and catalyst 30 prior to being pumped into a borehole 64. A single grout tube 66 acts as a delivery line and is secured to the static mixer 62 and configured to introduce the resin 28 and catalyst 30 as a mixture into the borehole 64.

Figure 6:
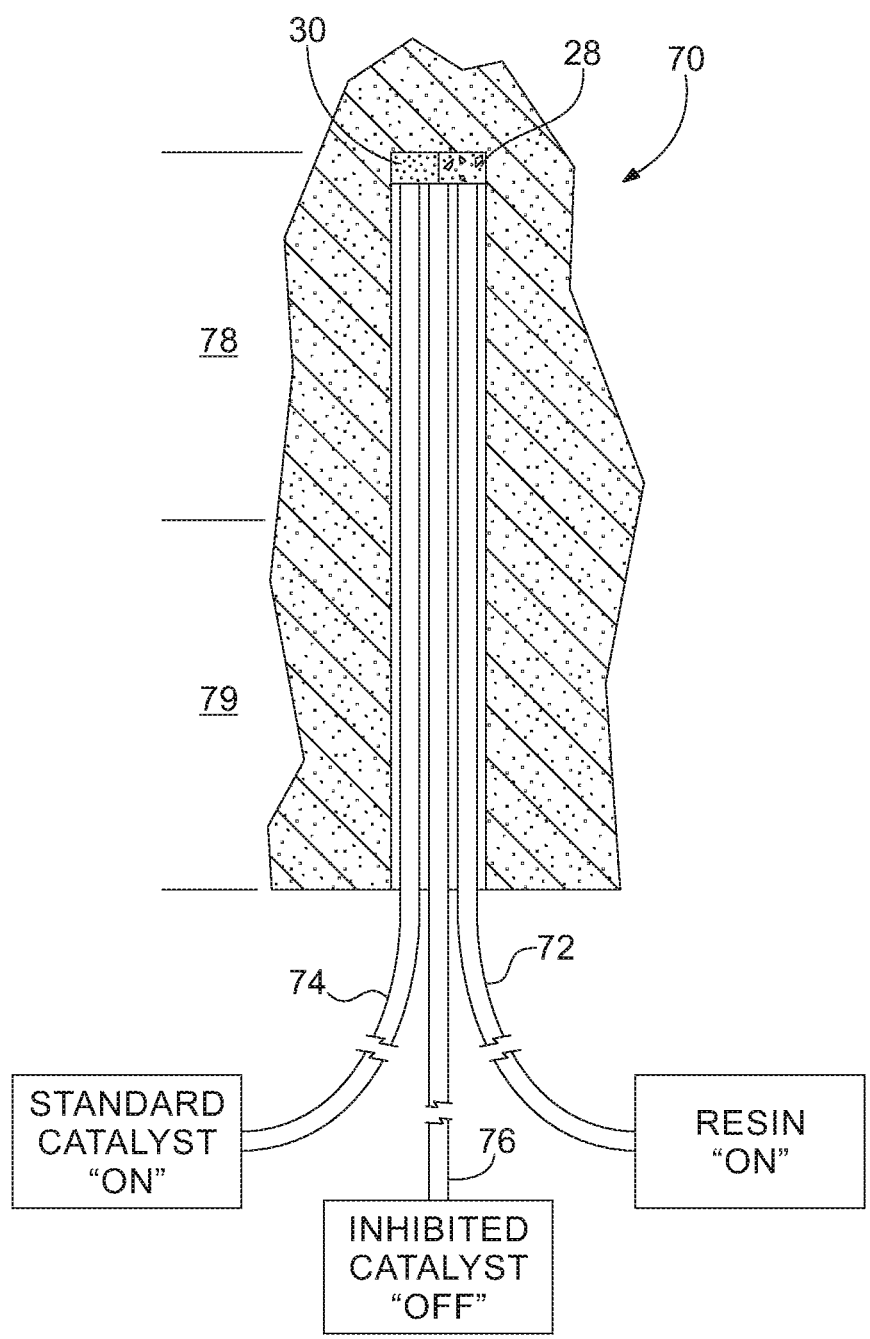
FIG. 6 is an elevational view of a pumping system and method for installing a mine roof bolt according to a fourth aspect of the invention showing the initial filling of the borehole.
Figure 7:
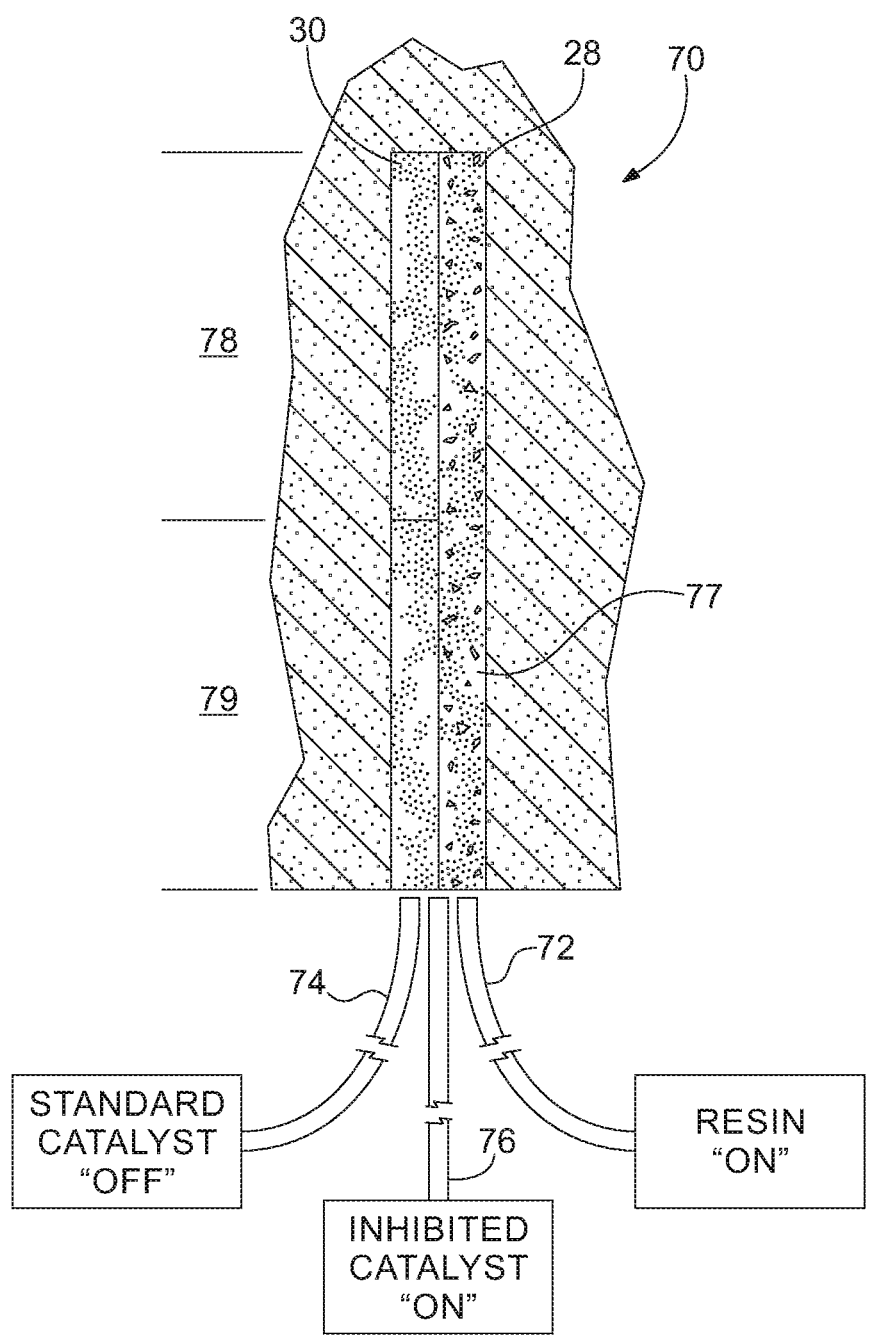
FIG. 7 is an elevational view of the system and method of FIG. 6 showing the borehole filled with a resin and a catalyst.

Referring to FIGS. 6 and 7, a fourth aspect of a pumpable two component resin system 70 includes a delivery line formed by a resin line 72, a standard catalyst line 74, and an inhibited catalyst line 76. The system 70 of FIGS. 6 and 7 operates in a similar manner to the system 10 shown in FIG. 1 and described above, but includes the inhibited catalyst line 76 to provide within the borehole 34 a fast set section 78 (such as at the blind end of the borehole 34) and a slow set section 79 (further spaced from the blind end of the borehole 34). Inhibited catalyst or inhibitor 77 reacts more slowly with the resin 28 from the resin line 72 than the standard catalyst 30 from the standard catalyst line 74 reacts with the resin 28 from the resin line 72. The sections 78, 79 allow a mine roof bolt to be anchored at the fast set section and subsequently tensioned while the slow set section is still curing.

Referring again to FIGS. 6 and 7, in use, the lines 72, 74, 76 may each be inserted into the borehole 34. The resin line 72 and the standard catalyst line 74 may then be activated or placed in the "ON" state as shown in FIG. 6 such that the resin 28 and standard catalyst 30 are delivered to the borehole 34 with the inhibited catalyst line 74 placed in the "OFF" state. The resin 28 and standard catalyst 30 are provided along a predetermined length of the borehole 34 to define the fast set section 78. At that point, the standard catalyst line 74 is deactivated or placed in the "OFF" state and the inhibited catalyst line 76 is placed in the "ON" state such that resin 28 and inhibited catalyst 30 are provided along a predetermined length of the borehole to define the slow set section 79. The fast set section 78 of resin 28 and catalyst 30 will harden and set up faster than the slow set section 79 due to differences between the catalyst 30 provided by the standard catalyst line 74 and the inhibited catalyst line 76, which allows a mine roof bolt to be installed and point anchored at the blind end of the borehole 34 and subsequently tensioned while the slow set section 79 is still curing.

Figure 8:
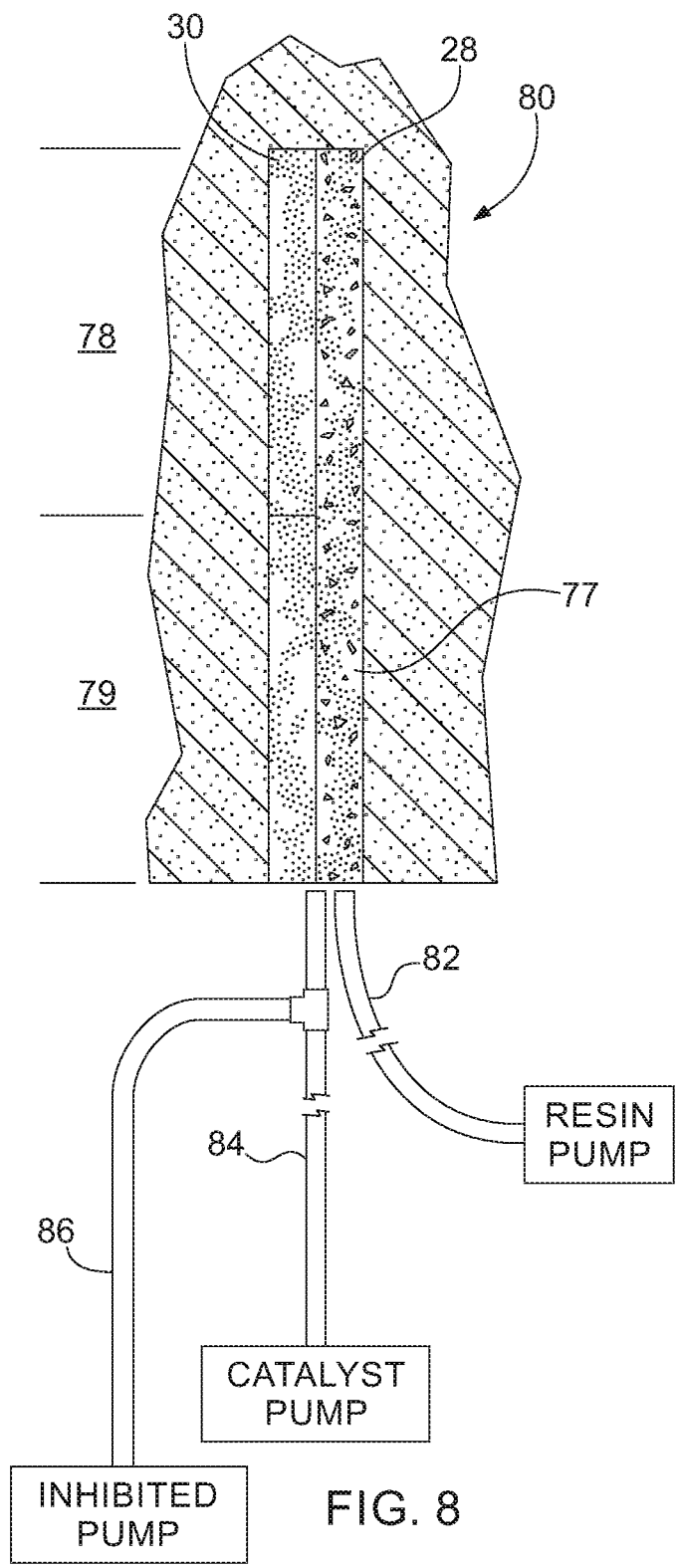
FIG. 8 is an elevational view of a pumping system and method for installing a mine roof bolt according to a fifth aspect of the invention.

Referring to FIG. 8, a fifth aspect of a pumpable two component resin system 80 includes a resin line 82, a standard catalyst line 84, and a catalyst inhibitor line 86. The system 80 of FIG. 8 is similar to the system shown in FIGS. 6 and 7 and described above, but feeds the catalyst inhibitor line 86 directly to the standard catalyst line 84. The catalyst inhibitor line 86 would only be operated or pumped at the sections where a slower set time is desired. Connecting the catalyst inhibitor line 86 to the standard catalyst line 84 prevents the need for a third line positioned within the borehole 34. This system 80 could also be utilized by pre-mixing the resin and the catalyst. The system 80 may also utilize two or more resin compositions in addition to using two or more catalysts. In particular, the system 80 may utilize a plurality of resins and catalysts to optimize their performance and cost.

Figure 9:
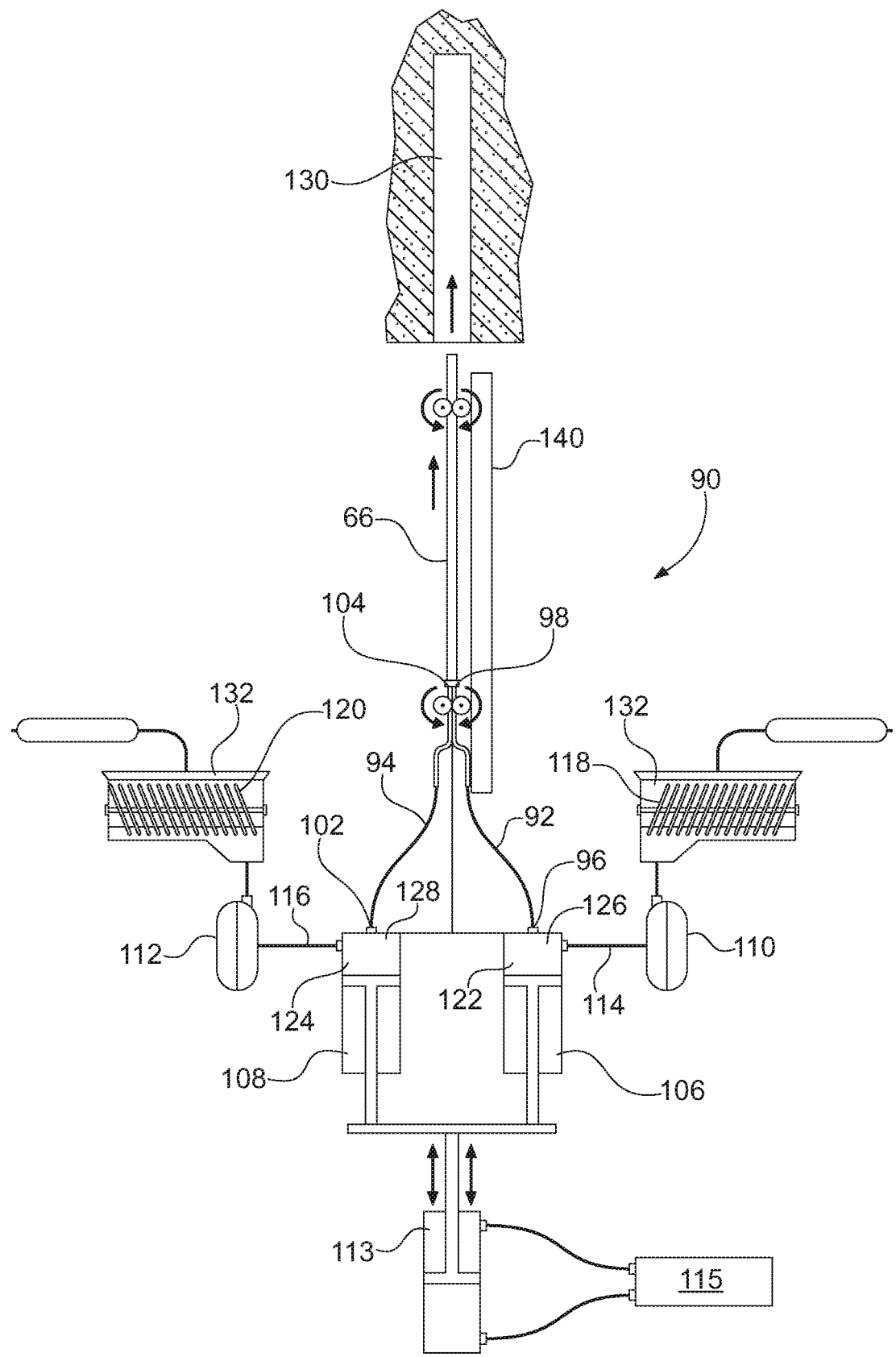
FIG. 9 is an elevational view of a pumping system and method for installing a mine roof bolt according to a sixth aspect of the invention.

Referring to FIG. 9, a sixth aspect of a pumpable two component resin system 90 includes a resin line 92 and a catalyst line 94. The resin line 92 and the catalyst line 94 each have an inlet 96, 102 and an outlet 98, 104. The inlet 96 of the resin line 92 is connected to and in fluid communication with a resin cylinder pump 106. The inlet 102 of the catalyst line 94 is connected to and in fluid communication with a catalyst cylinder pump 108. The outlets 98, 104 are connected to a grout tube 66 acting as a delivery line, although other suitable arrangements may be utilized. The resin cylinder pump 106 and the catalyst cylinder pump 108 are connected to respective supply pumps 110, 112 via a resin supply line 114 and a catalyst supply line 116. The supply pumps 110, 112 pump resin 126 and catalyst 128 from respective reservoirs 118, 120 through the respective resin supply line 114 and catalyst supply line 116 and into the respective resin cylinder pump 106 and catalyst cylinder pump 108. As shown in FIG. 9, the resin cylinder pump 106 and the catalyst cylinder pump 108 are slaved together to inject the resin 126 and catalyst 128 at about a constant 2:1 volumetric ratio, although other suitable ratios may be utilized. The slaved pumps 106, 108 are controlled by a separate piston 113, which is operated by a hydraulic pump 115. The hydraulic pump 115 may have a maximum output pressure of 1,200 psi, which has been demonstrated to be effective in injecting resin 126 and catalyst 128 into a borehole 130 through a ½" diameter tube over 50 feet in length, although other suitable pumps may be utilized. Although a single piston 113 controls the resin cylinder pump 106 and catalyst cylinder pump 108, one or more cylinders or pistons may be utilized to control the pumps 106, 108 to ensure the desire resin/catalyst ratio is achieved. For example, a duel servomotor-controlled cylinder arrangement may be provided to ensure equal pressure is applied to the pumps 106, 108.

Figure 11:
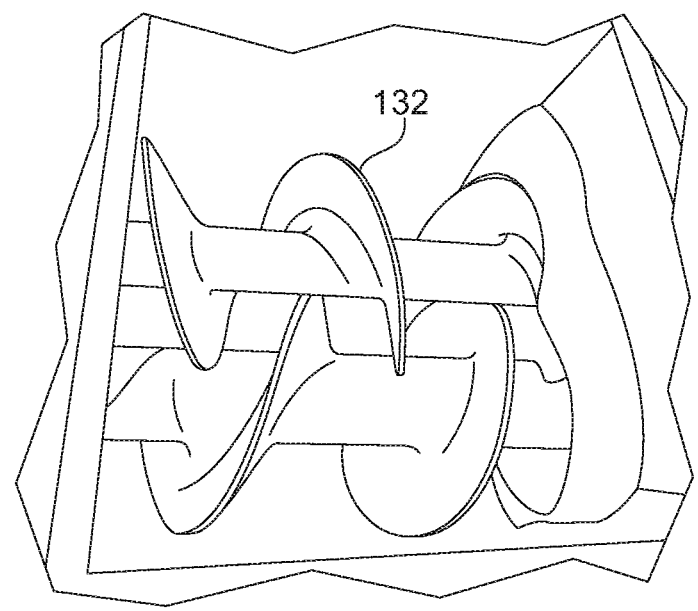
FIG. 11 is a perspective view of a twin auger arrangement for a hopper according to one aspect of the invention.

The supply pumps 110, 112 are diaphragm pumps, although other types of pumps suitable for pumping material of a high viscosity may also be utilized, such as chop check pumps, progressive cavity pumps, etc. The pumpable two component resin system 90 shown in FIG. 9 generally operates in the same manner as the system 10 shown in FIGS. 1-3 and discussed above. The supply pumps 110, 112 are used to fill respective cylinders 122, 124 of the resin cylinder pump 106 and catalyst cylinder pump 108 to a predetermined level for each of the cylinders 122, 124. The resin cylinder pump 106 and the catalyst cylinder pump 108 are then activated to dispense resin 126 and catalyst 128 simultaneously. In order to obtain the desirable resin to catalyst ratio, the resin cylinder 122 should generally be about two times larger in volume relative to the catalyst cylinder 124. In a similar manner as shown in FIGS. 2 and 3, the resin 126 and catalyst 128 will fill the borehole 130 and then a bolt is subsequently inserted into the borehole 130. The resin cylinder pump 106 and the catalyst cylinder pump 108 may then be recharged via the supply pumps 110, 112. The reservoirs 118, 120 may each be hoppers with a twin auger arrangement 132, which is shown more clearly in FIG. 11, although other suitable reservoir arrangements may be utilized. The twin auger arrangement 132 allows the components to be continuously mixed to prevent separation or drying out of the resin and catalyst 126, 128. The reservoirs 118, 120 may be supplied using large "chubs" or cartridges 139 or other containers containing the resin and catalyst 126, 128. As discussed in more detail below, the grout tube 66 is connected to a bolter arm 140 and is moveable relative to the bolter arm 140 to allow the insertion of the grout tube 66 within the borehole 130 for delivery of the grout. The system shown in FIG. 9 may utilize any other arrangements shown in FIGS. 1-8 and described above.

Figure 10:
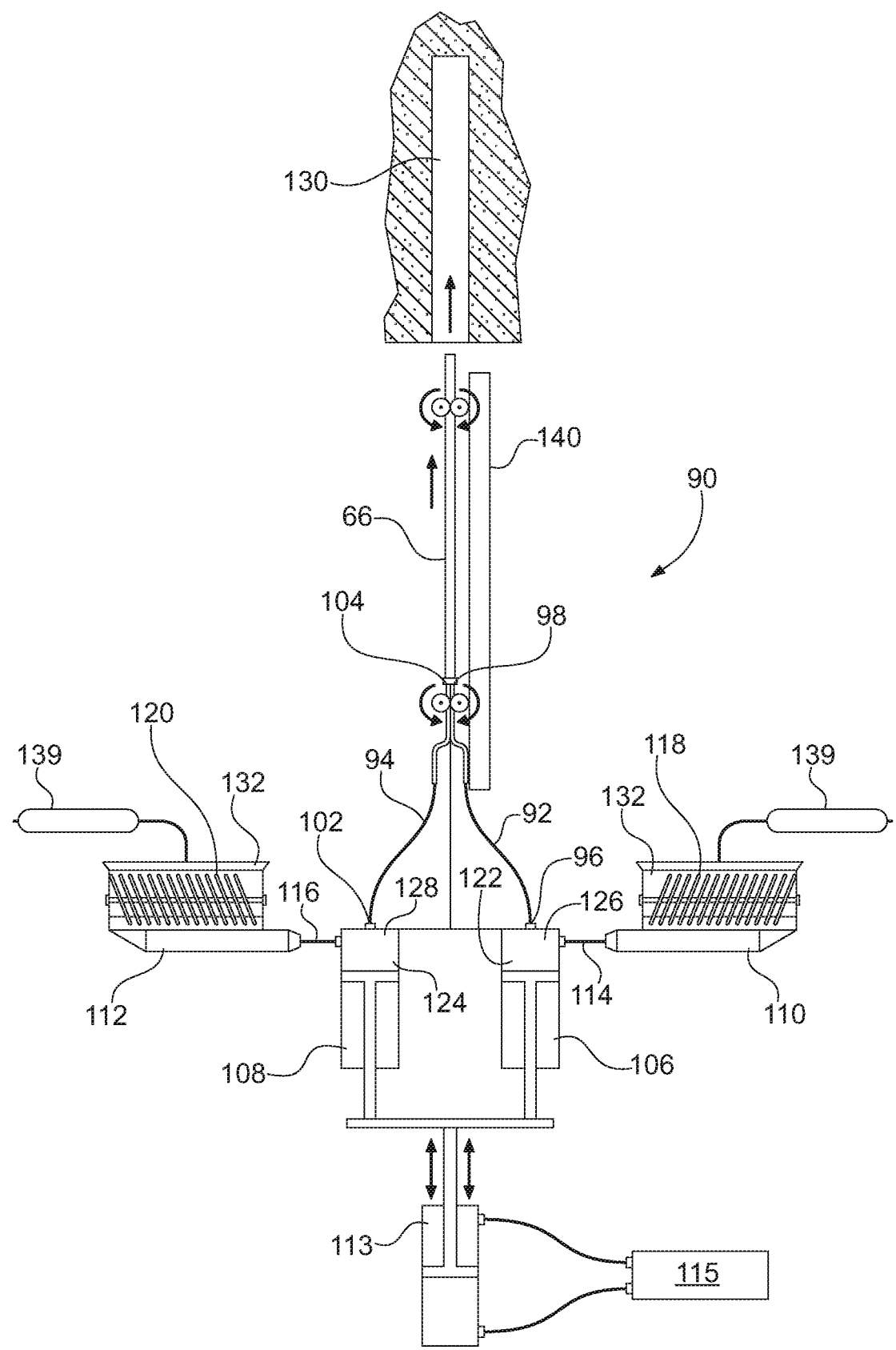
FIG. 10 is an elevational view of a pumping system and method for installing a mine roof bolt according to a seventh aspect of the invention.

Referring to FIG. 10, the pumpable two component resin system 90 shown in FIG. 9 and described above may utilize progressive cavity pumps for the supply pumps 110, 112 rather than the diaphragm pumps shown in FIG. 9. The system 90, however, would operate in the same manner as described above.

Figure 12A:
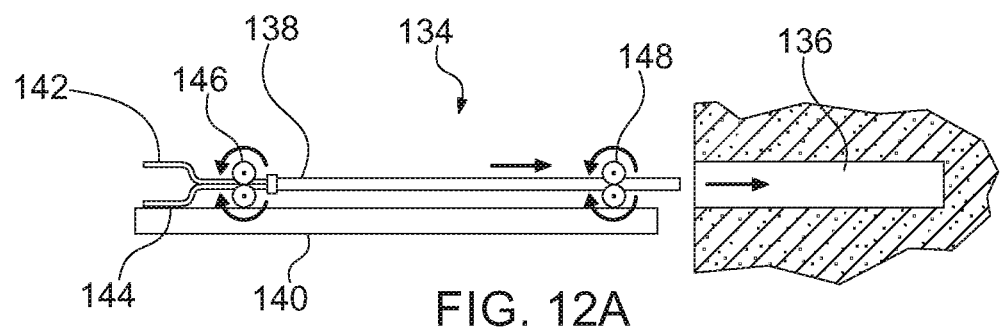
FIGS. 12A-12D are elevational views showing a method of installing a mine roof bolt according to one aspect of the invention.
Figure 12B:
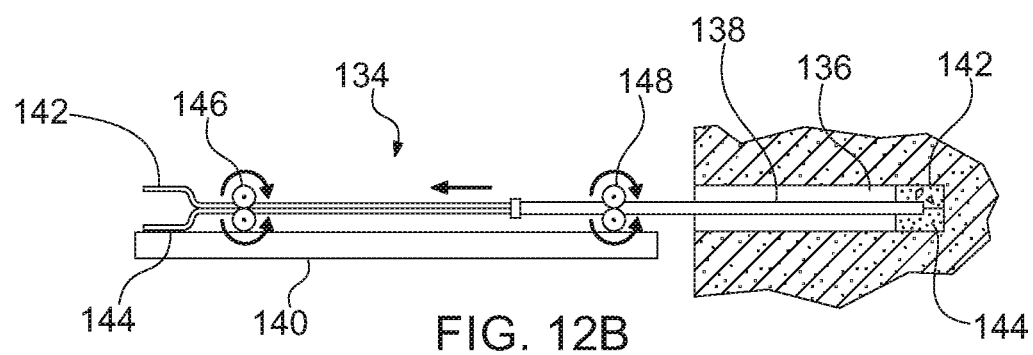
Figure 12C:
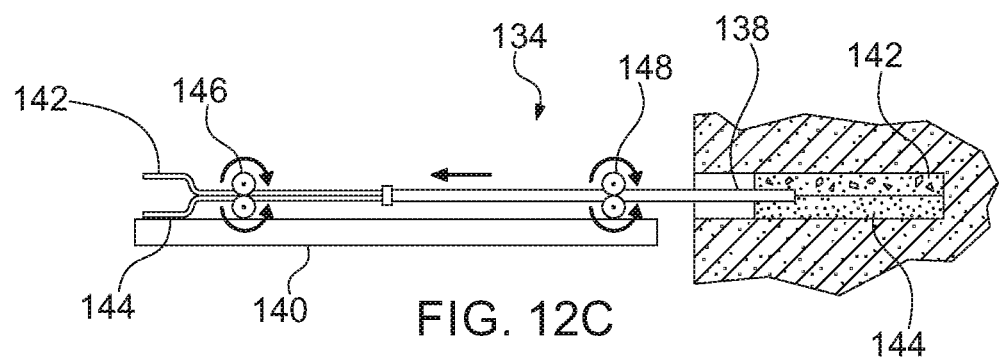
Figure 12D:
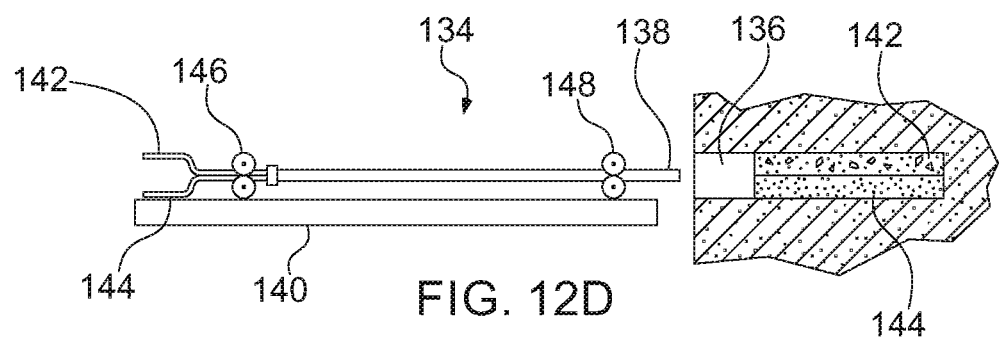

Referring to FIGS. 12A-12D, one aspect of a method 134 for installing a mine roof bolt is shown. The method 134 may provide an automated arrangement for injecting and installing a mine roof bolt using a bolting machine (not shown). After drilling a borehole 136 using a bolting machine, a grout tube 138 is inserted into the borehole 136 using the bolter arm 140 of the bolting machine as shown in FIG. 12A. Resin and catalyst components 142, 144 are injected into the borehole 136 and the grout tube 138 is retracted at a suitable rate to prevent air pockets or the flow of resin and catalyst 142, 144 from bypassing the tip of the grout tube 138 as shown in FIGS. 12B and 12C. Once the required amount of resin and catalyst 142, 144 is provided within the borehole 136, the grout tube 138 is removed from the borehole 136 as shown in FIG. 12D. A mine roof bolt may be subsequently inserted into the borehole 136 and rotated to mine the resin and catalyst 142, 144 in the same manner as described above in connection with FIGS. 1-3. Further, the method shown in FIGS. 12A-12D may utilize any of the systems and arrangements shown in FIGS. 1-11. The bolting machine may be configured to automatically drill the borehole 136, inject the resin and catalyst 142, 144 into the borehole 136, and install a mine roof bolt by inserting the bolt into the borehole 136 and rotating the bolt to mix the resin and catalyst 142, 144. The bolting machine may utilize a controller, such as a PLC, and one or more sensors to control the installation of the mine roof bolt. The grout tube 138 may be driven by a first and second set of drive wheels 146, 148, although any suitable arrangement for inserting and retracting the grout tube 138 may be utilized.

Figure 13:
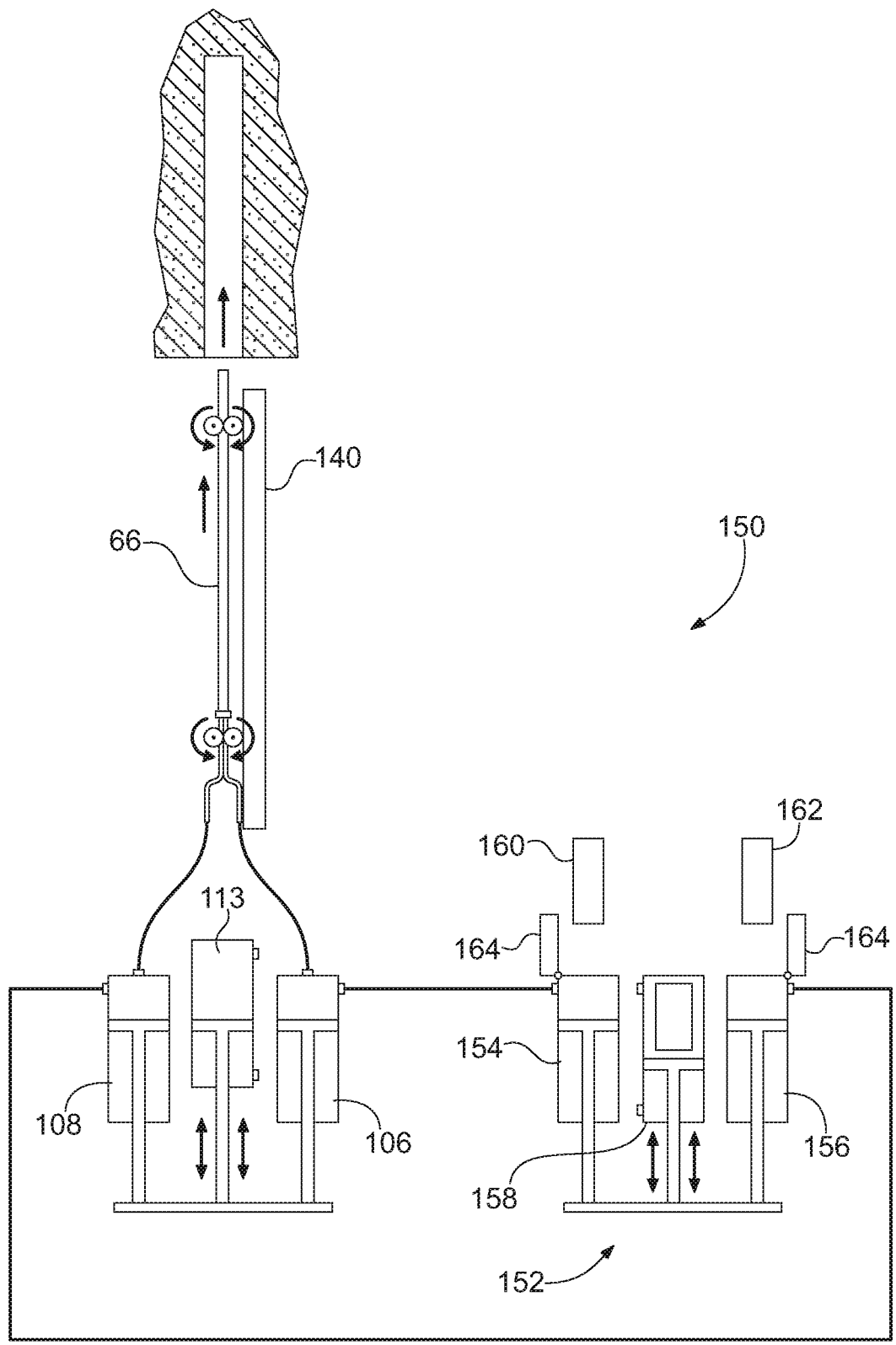
FIG. 13 is an elevational view of a pumping system and method for installing a mine roof bolt according to a further aspect of the invention.

Referring to FIG. 13, a pumpable two component resin system 150 is similar to the system 90 shown in FIG. 9 and discussed above. However, rather than utilizing supply pumps 110, 112 as in the system 90 of FIG. 9, the system 150 of FIG. 13 utilizes a feed pump arrangement 152 having a resin feed cylinder 154 and a catalyst feed cylinder 156 that are slaved together to feed the resin cylinder pump 106 and catalyst cylinder pump 108, respectively. The cylinders 154, 156 are controlled by a main piston 158, which is operated by a hydraulic pump (not shown). The resin feed cylinder 154 and catalyst feed cylinder 156 may be supplied with resin and catalyst cartridges 160, 162 or other suitable arrangements as discussed above. For example, the resin and catalyst may be provided to the cylinders 154, 156 via any suitable container, such as a bucket, bag, bladder, etc. The resin and catalyst cartridges 160, 162 may be fed into the cylinders 154, 156 by removing a cap 164, which is discussed in more detail below and shown in FIGS. 15 and 16. Rather than utilizing the resin feed cylinder 154 and catalyst feed cylinder 156 that are slaved together, the cylinders 154, 156 may be piston-type or bladder-type accumulators with a transducer to measure the position of the piston or bladder. The accumulators may be operated hydraulically or pneumatically. Accumulators are typically smaller and lighter than the cylinder arrangement shown in FIG. 13. Likewise, the resin cylinder pump 106 and the catalyst cylinder pump 108 may be piston-type or bladder-type accumulators for the same reasons. The system 150 may be provided as a standalone unit on a bolting machine with the system 150 having its own source of hydraulic fluid/pressure and/or compressed air/pressure, although other suitable arrangements, such as incorporation into the bolting machine hydraulics, may be utilized.

Referring to FIGS. 14A-14D, further methods of installing a mine roof bolt using the systems 10, 40, 70, 80, 90 discussed above are shown. The mixing and/or non-mixing of the resin and catalyst can be controlled during injection by the amount of turbulence introduced into a grout injection line. The basic properties that control the amount of turbulence are the viscosities of the two components, the internal diameter and length of the injection tube, and the flow rate. Changes in any of these parameters can change the characteristics of the flow from turbulent (mixing) to laminar (non-mixing). This flow rate property and being able to control whether the flow is turbulent or laminar, or a combination thereof, is important for proper installation of mine roof bolts in the systems 10, 40, 70, 80, 90 discussed above. In certain situations, mixing of the resin and catalyst is undesirable because the resin can set before the bolt can be installed. However, in other situations, fully mixing or partially mixing the resin and catalyst during injection may be desirable.

Figure 14A:
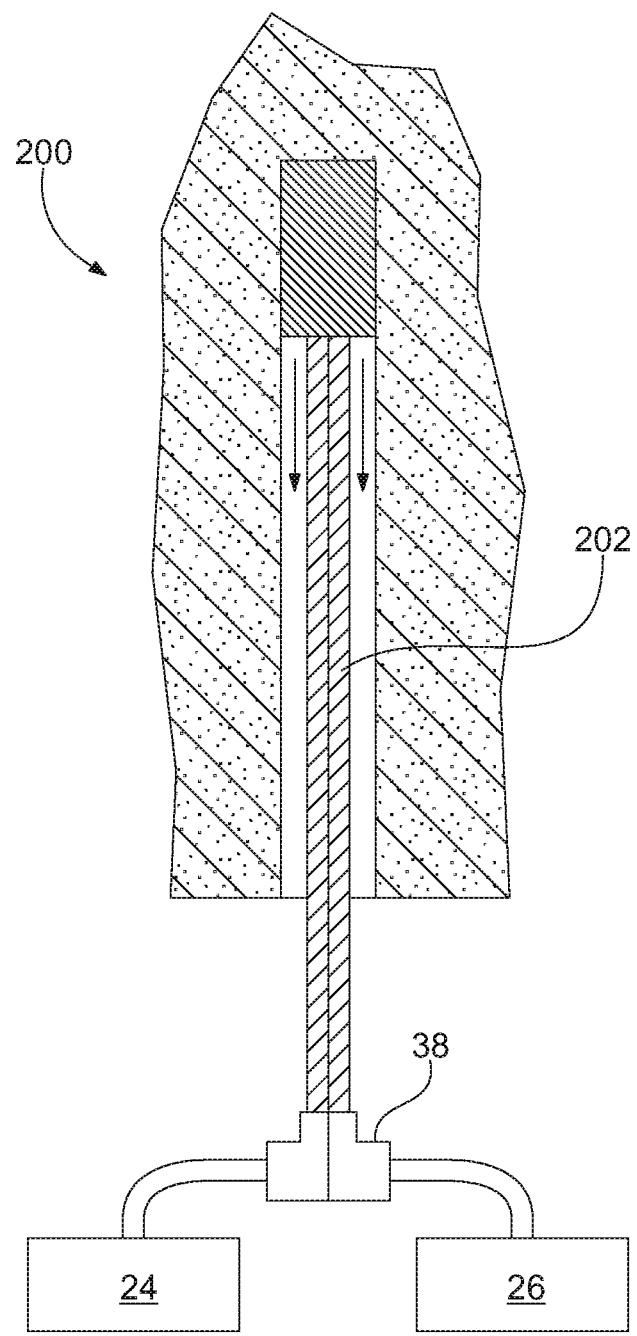
FIGS. 14A-14D are elevational views showing various methods of installing a mine roof bolt according to one aspect of the invention.
Figure 14B:
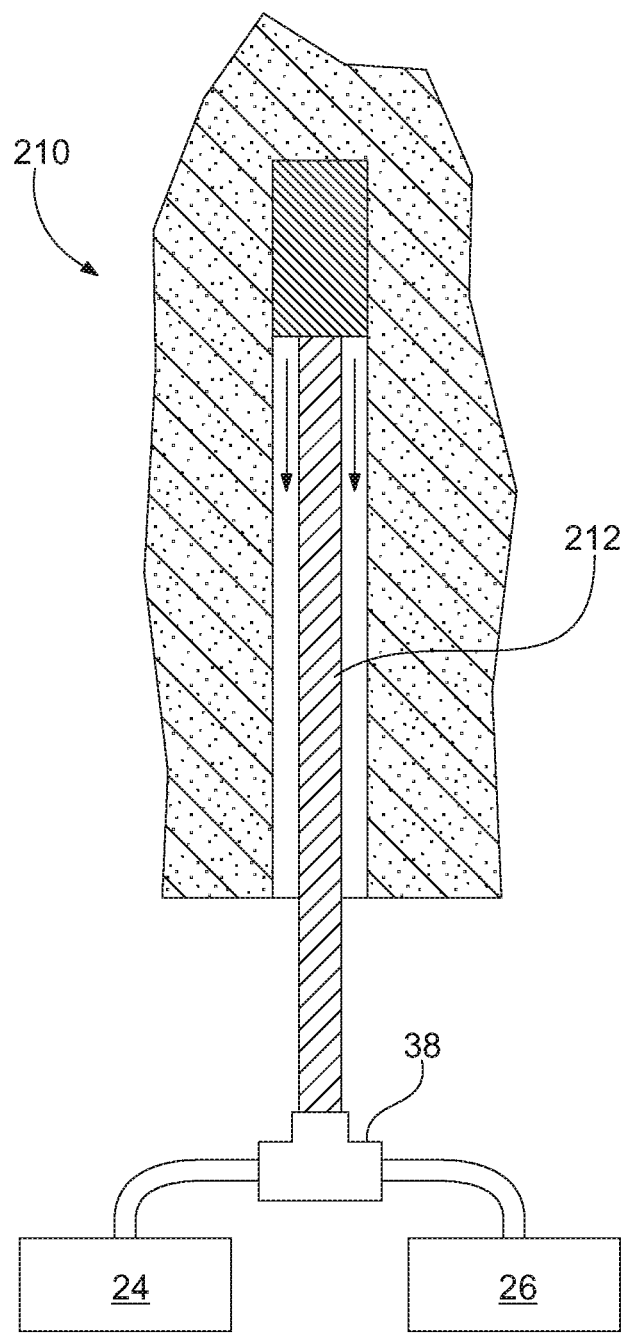

Referring to FIG. 14A, a system 200 uses a divided injection tube 202 in order to keep the two components separate. When the resin and catalyst exit the injection tube they will lay side by side in the borehole. Turbulent and laminar flow is not an issue with this system 200 and method. The method of using this system 200 typically includes: drilling the borehole; inserting the injection tube 202 into the borehole; pumping resin and catalyst at any flow rate to prevent mixing; simultaneously with pumping the resin and catalyst, retracting the injection tube 202 at a set rate to prevent voids and flowback ahead of the injection tube 202; and installing a mine roof bolt (not shown) and spinning the mine roof bolt to mix the resin and catalyst. The system 200 may be configured to automatically retract the injection tube 202 at the set rate, which is based on the volume flow rate of the resin and catalyst. As discussed above, the bolt arm 140 may be programmed to automatically retract the tube 202 at the set rate. Typical properties for this method are below:

Resin Viscosity: 125,000-225,000 cps
Catalyst Viscosity: 10,000-25,000 cps
Injection Line ID: ¾"
Injection Line Length: 14'
Flow Rate: 1-3 gpm Referring to FIG. 14B, a system 210 utilizes a single injection line 212. The typical size of the injection line 212 is ¾" for a 33 mm borehole. The resin and catalyst are pumped into the Wye at a slower rate in order to keep the flow laminar. The resin and catalyst will lay side by side with minuscule mixing. As the resin and catalyst exits the injection line 212, the resin and catalyst will remain side by side in the borehole. The mine roof bolt is then inserted into the separated resin and catalyst and rotated to mix resin and catalyst. Typical properties for this method are below:

Resin Viscosity: 200,000-225,000 cps
Catalyst Viscosity: 20,000-25,000 cps
Injection Line ID: ¾"
Injection Line Length: 14'
Flow Rate: 1-1.5 gpm With the method of using the system 210 of FIG. 14B, if the flow rate is increased from laminar flow to an intermediate flow rate, minor mixing will occur in the injection line 212. This flow rate is about 1.5 gpm. The minor mixing of the resin and catalyst will cause small hardened flakes of mixed resin and catalyst ⅛" wide by ½" in length by 1/16" thick to form within the raw resin and catalyst as the resin and catalyst are injected. Approximately only 10% of the resin may react with the catalyst during this partial mixing process. The reacted pieces of resin/catalyst act as small mixing blades when a mine roof bolt is installed.

The method of using this system 210 typically includes: drilling the borehole; inserting the injection line 212 into the borehole; pumping resin and catalyst at a laminar flow rate to prevent mixing; simultaneously with pumping, retracting the injection line 212 at a set rate to prevent voids and flowback ahead of the injection line 212; and installing a mine roof bolt (not shown) and spinning the bolt to mix the resin and catalyst.

Figure 14C:
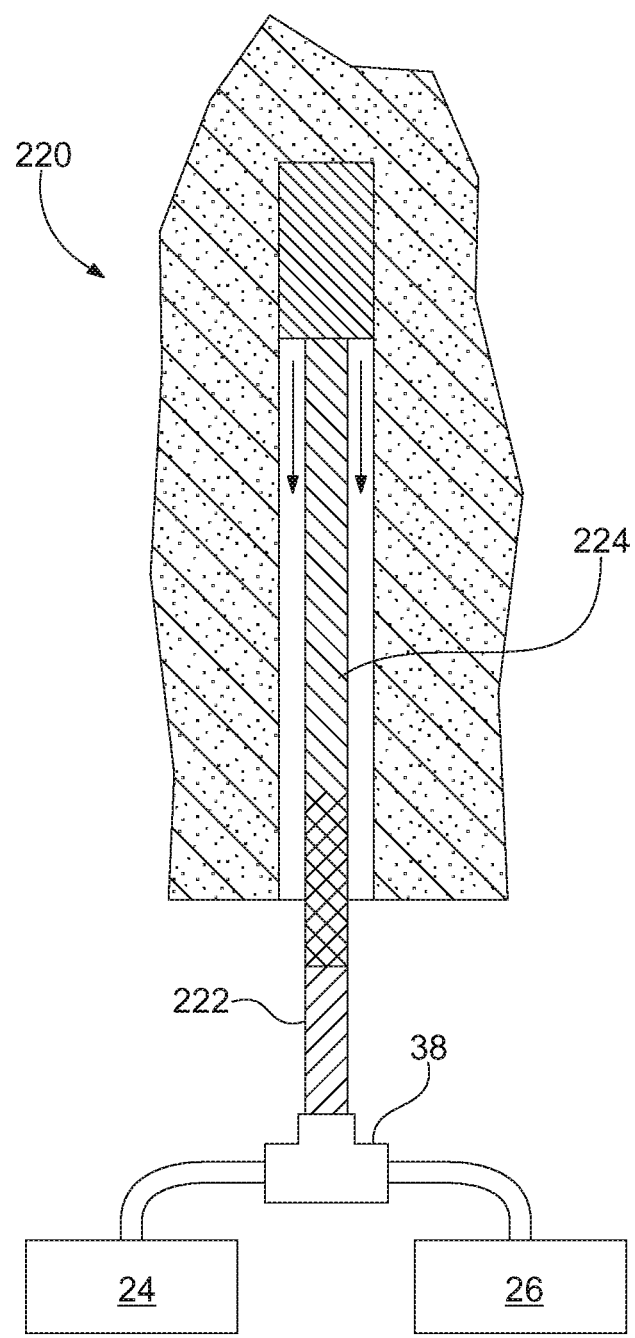

Referring to FIG. 14C, a system 220 uses a single injection line 222. The typical size of the injection line 222 is ¾". The resin and catalyst are pumped into the Wye at a faster rate to create an intermediate to turbulent flow. The resin and catalyst will mix as it flows through the injection tube 222. In one aspect of this method, a grout tube 224 may be attached to the mine roof bolt and remain in the cured resin/catalyst mixture. However, in other aspects, the mine roof bolt may be installed after injection of the resin and catalyst as described above in connection with the system of FIG. 14B. Typical properties for this method are below:

Resin Viscosity: 125,000-150,000 cps
Catalyst Viscosity: 10,000-15,000 cps
Injection Line ID: ¾"
Injection Line Length: 14'
Flow Rate: 2.0-2.5 gpm The method of installing the system 220 of FIG. 14C typically includes: drilling the borehole; connecting the injection line 222 to the grout tube 224 which lays alongside the mine roof bolt (not shown) or inserting the injection line 222 into the end of the borehole; pumping a predetermined amount of resin and catalyst into the borehole at a turbulent flow rate to allow mixing of the resin and catalyst; and stopping the pumping when the borehole is full. The mine roof bolt will be completely installed and no spinning of the mine roof bolt will be necessary due to the turbulent flow and prior mixing of the resin and catalyst.

Figure 14D:
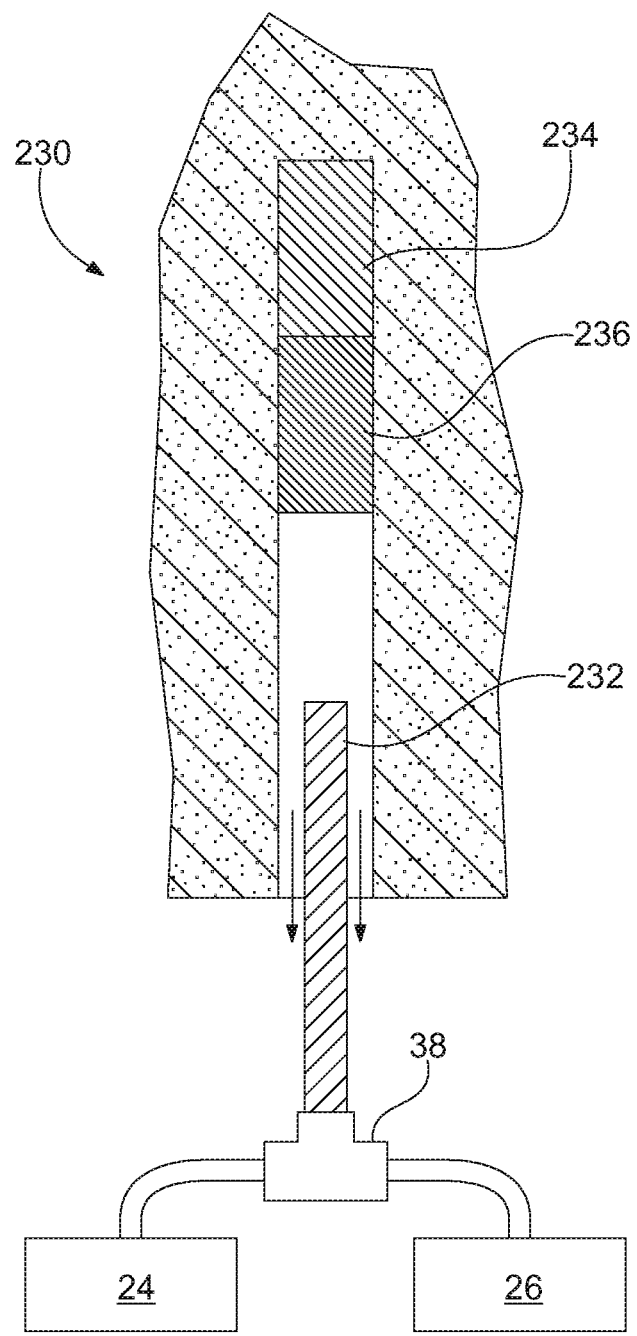

Referring to FIG. 14D, a system 230 utilizes a single injection line 232 and creates a point anchored arrangement. The typical size of the injection line 232 is ¾" for a 33 mm borehole. At the start of injection, the resin and catalyst are pumped into the Wye at a fast rate to create turbulent (mixing) flow then at a predetermined position, the flow is switched to a laminar (non-mixing) flow. The mixed resin/catalyst at a top section 234 of the borehole starts to react where the resin and catalyst at a bottom portion 236 of the borehole does not react or setup. A mine roof bolt (not shown) is quickly installed and spun to mix the bottom section 236 starting the reaction time for the mixed resin and catalyst. The top section 234, which was mixed during injection, will set before the bottom section 236 to allow the bolt to be torqued thereby creating tension in the bolt before the bottom section 236 sets. The system 230 is similar to a point anchored rebar bolt that uses a fast resin/catalyst cartridge at the top and a slow resin/catalyst cartridge at the bottom. Typical properties for this method are below:

Resin Viscosity: 125,000-225,000 cps
Catalyst Viscosity: 10,000-25,000 cps
Injection Line ID: ¾"
Injection Line Length: 14'
Flow Rate: 1-2.5 gpm The method of installing the system of FIG. 14D typically includes: drilling the borehole; inserting the injection line 232 into the end of the borehole; pumping a predetermined amount of resin and catalyst into the borehole at a turbulent flow rate to allow mixing of resin and catalyst; after a predetermined length of time or amount of resin and catalyst supplied at a turbulent flow rate, switching to a laminar flow rate of the resin and catalyst to prevent mixing; simultaneously with the turbulent and laminar flow rate pumping, retracting the injection line 232 at a set rate to prevent voids and flowback ahead of the injection line; and installing a mine roof bolt (not shown) and spinning the mine roof bolt to mix the resin and catalyst. As noted above, the top section 234 of resin/catalyst injected with a turbulent flow rate, thereby mixing the resin and catalyst, will set first to allow a drive member, such as a nut, at the bottom of the mine roof bolt to be torqued to the tension the mine roof bolt.

Figure 15:
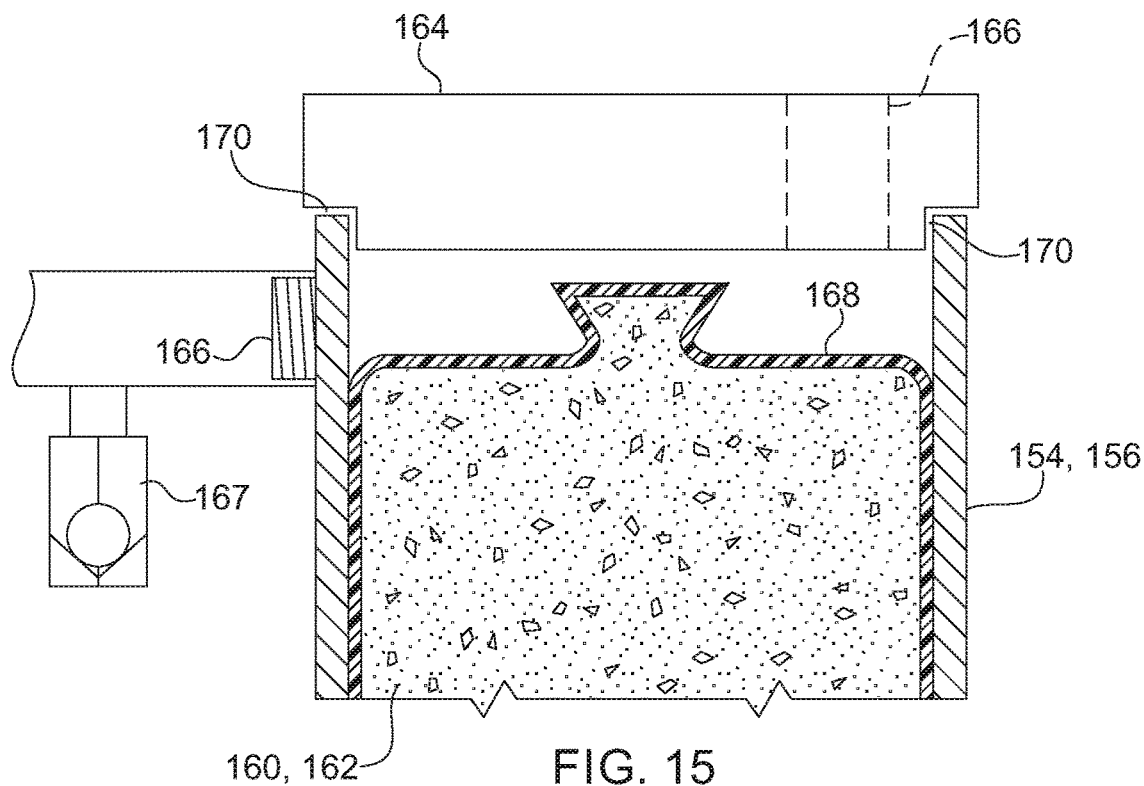
FIG. 15 is a partial cross-sectional view of a pumping arrangement according to one aspect of the invention, showing an initial position of the pumping arrangement.
Figure 16:
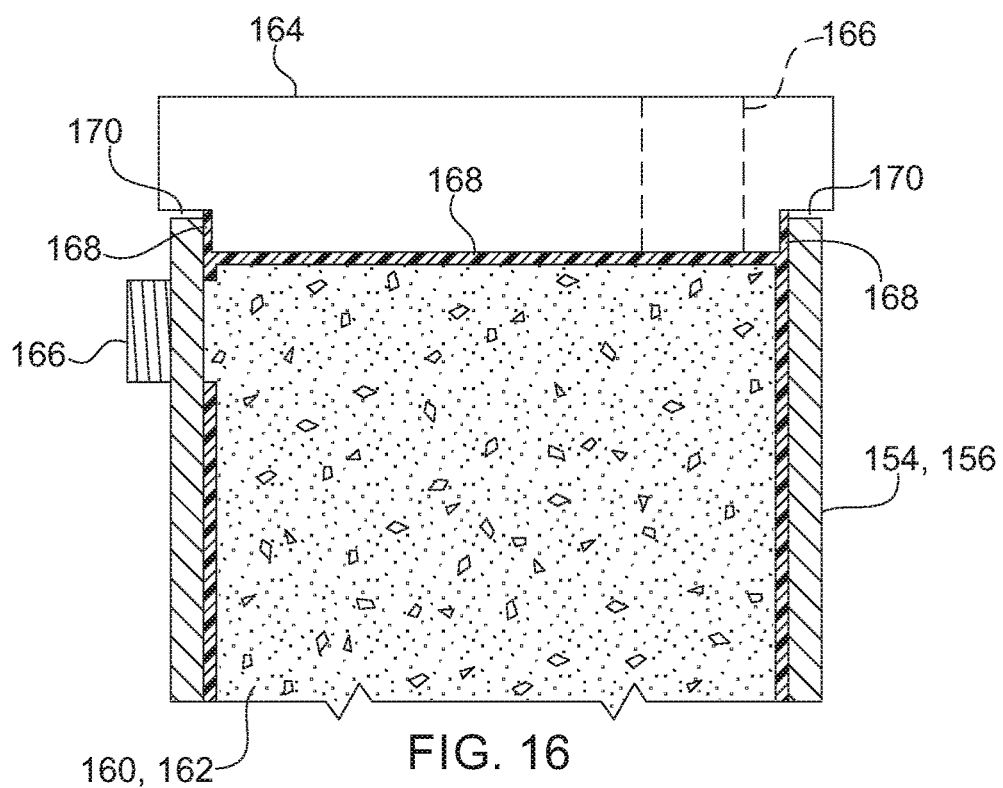
FIG. 16 is a partial cross-sectional view of a pumping arrangement according to one aspect of the invention, showing a pumping position of the pumping arrangement.

Referring to FIGS. 15 and 16, the resin and catalyst cartridges 160, 162 may be fed into the cylinders 154, 156 by removing the cap 164. The cap 164 may be moveable relative to the cylinders 154, 156 via any suitable arrangement. The cap 164 may be hinged, laterally moveable using a gate valve-like arrangement, or may be vertically moveable with the cylinders 154, 156 being moveable via a sliding base. The resin and catalyst cartridges 160, 162 may be provided with various resin to catalyst ratios from about 1:1 to 95:5. In one aspect, the ratio may be about 2:1 with the resin and catalyst provided separately in the cartridges 160, 162. The cylinders 154, 156 include a port 166 extending through a sidewall of the cylinders 154, 156, although the port 166 may also be provided in the cap 164 as indicated by dashed lines in FIGS. 15 and 16. The port 166 may be a ¾" hose connection port, although other suitable connections and ports may be utilized. The cartridges 160, 162 include a body 168 that defines a space for receiving the resin or catalyst. The body 168 may be formed from a non-reactive plastic materials, such as Nylon, Polypropylene, or polytetrafluoroethylene-based material, although other suitable materials may be utilized. In one example, the body 168 for the resin cartridge 160 is formed from Nylon and the body 168 for the catalyst cartridge 162 is formed from polyethylene. Nylon is shown to be effective in preventing the migration of styrene from the cartridge 160. Polyethylene prevents the migration of water from the catalyst cartridge 162. The resin cartridge 160 may be 6" in diameter and the catalyst cartridge 162 may be 4" in diameter with each cartridge 160, 162 having a height of 14", which corresponds to the size of the cylinders 154, 156, although suitable sizes may be utilized. The body 168 of the resin cartridges 160, 162 may have a thickness of 6-10 mil. In one aspect, the body 168 has a thickness of 6 mil.

Referring again to FIGS. 15 and 16, the cap 164 and the cylinders 154, 156 define a gap 170 between the cap 164 and the cylinders 154, 156. The gap 170 allows air to escape from within the cylinders 154, 156 during the initial compression of the cartridges 160, 162 within the cylinders 154, 156. If the lid 164 forms an air-tight seal with the cylinders 154, 156, air would become trapped within the cylinders 154, 156 and would eventually be forced out through the grout tube 66 causing undesirable air bursts or pops, uneven flow, and/or turbulent mixing of the resin and catalyst. As shown in FIG. 16, when the cartridges 160, 162 are compressed, the air will escape through the gap 170 with the body 168 of the cartridges 160, 162 expanding to self-seal the gap 170 between cap 164 and the cylinders 154, 156. Thus, the cap 164 and cylinders 154, 156 form a self-sealing design where resin and catalyst does not escape through the gap 170 and where the plastic bag does not break or extrude through the gap 170. Further, when the cartridges 160, 162 are compressed and pressurized, the body 168 of the cartridges 160, 162 will only be punctured at the location of the port 166 and flow directly into the port 166 for eventual delivery to the borehole. When the cylinders 154, 156 are fully compressed, only the body 168 of the cartridges 160, 162 and a minimal amount of resin or catalyst will remain. The body 168 of the cartridges 160, 162 may then be discarded and the cylinders 154, 156 can be reloaded with full cartridges 160, 162. This arrangement of the cylinders 154, 156, cartridges 160, 162, and cap 164 keeps the cylinders 154, 156 clean during use for easy loading and unloading and protects the seals of the piston of the cylinders 154, 156 from wear from the resin material. Furthermore, the cylinders 154, 156 may also be provided with a separate bladder (not shown) within the cylinders 154, 156 that receives the cartridges 160, 162. The separate bladder may be made from rubber, polytetrafluoroethylene (PTFE), or other suitable flexible bladder materials. The separate bladder can provide an additional layer of protection for the cylinders 154, 156.

Referring still to FIG. 15, the port 166 may be in fluid communication with a valve 167, such as a one-way check valve, that is in fluid communication with atmosphere. After the body 168 of the cartridges 160, 162 is compressed, the cylinders 154, 156 are withdrawn, as discussed above, which creates a vacuum. The valve 167 allows air to enter the cylinder 154, 156 via the port 166 to break the vacuum thereby preventing the body 168 of the cartridges 160, 162 from being pulled into the port 166, which can inhibit the removal of the cartridges 160, 162 after their contents have been expelled.

Figure 17:
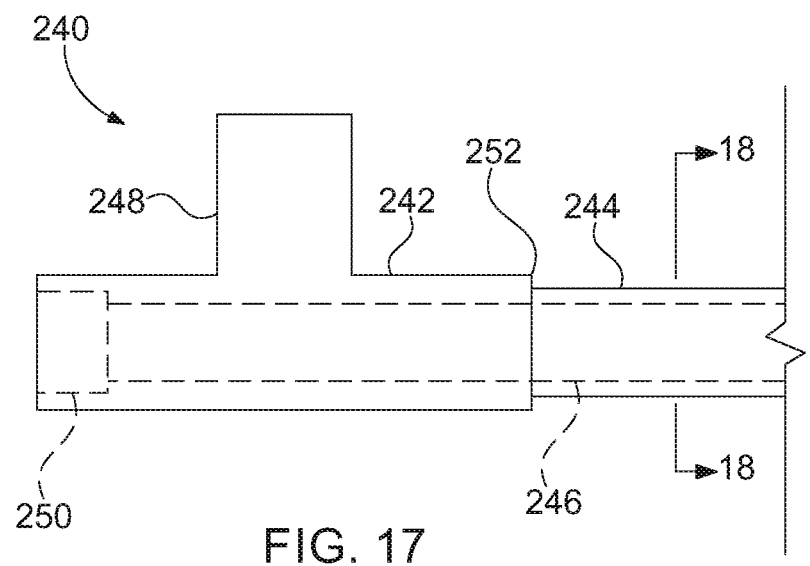
FIG. 17 is a front view of a tube assembly according to one aspect of the invention.
Figure 18:
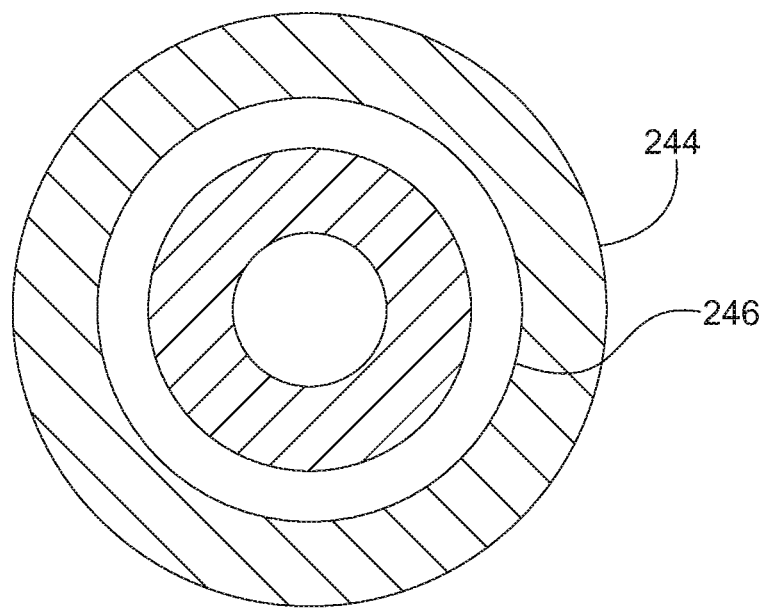
FIG. 18 is a cross-sectional view taken along line 18-18 shown in FIG. 17.

Referring to FIGS. 17 and 18, an injection tube assembly 240 according to a further aspect of the invention includes a connection fitting 242 that receives a first tube 244 and a second tube 246. The connection fitting 242 has a first port 248 in fluid communication with the first tube 244 and a second port 250 in fluid communication with the second tube 246. The second tube 246 is received within the first tube 244. The second tube 246 extends through the connection fitting 242 and is connected to the second port 250. The first tube 244 is connected to an end connection 252 of the connection fitting 242 with the first port 248 in fluid communication with the annular space between the first and second tubes 244, 246. The connection fitting 242 may be a push-to-connect type fitting, although other suitable connections and fittings may be utilized. The first and second tubes 244, 246 may be polymer tubes, such as nylon, polyethylene, cross-linked polyethylene, etc. The second tube 246 may be utilized for the resin and the first tube 244 may be utilized for the catalyst, although the second tube 246 may also be utilized for the catalyst with the first tube 244 being utilized for the resin. The resin cylinder pump 106 discussed above may be connected to the second port 250 and the catalyst cylinder pump 108 may be connected to the first port 248 to deliver the catalyst and resin into a borehole. A lubricant may be provided on the tubes 244, 246 to improve the flow of resin and catalyst through the tubes 244, 246. The lubricant may be provided on the inside of the first tube 244, the outside of the second tube 246, and/or the inside of the second tube 246.

Figure 19:
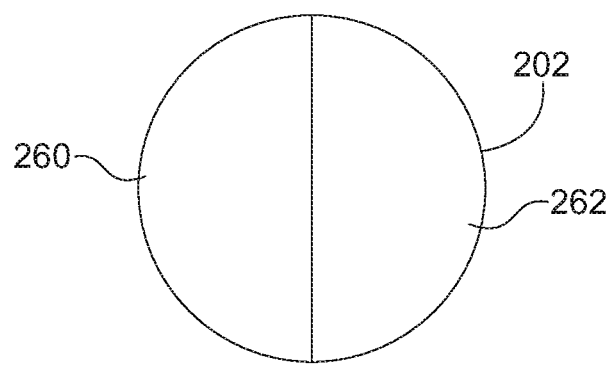
FIG. 19 is a cross-sectional view of a tube assembly according to a further aspect of the invention.

Referring to FIG. 19, the divided injection tube 202 of FIG. 14A may be a D-shaped tube arrangement. In particular, the divided injection tube 202 may include two D-shaped portions 260, 262 for the resin and catalyst. The divided injection tube 202 may be made from nylon, although other suitable materials may be utilized.

Figure 20:
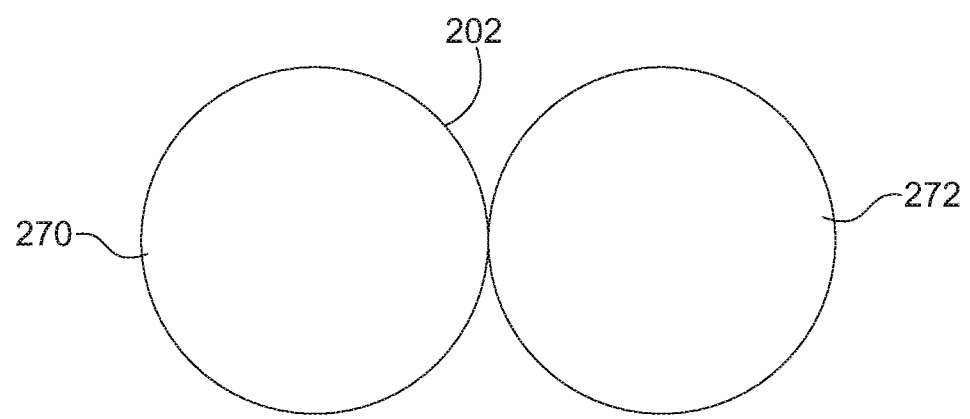
FIG. 20 is a cross-sectional view of a tube assembly according to a further aspect of the invention.

Referring to FIG. 20, the divided injection tube 202 of FIG. 14A may also be two separate tubes 270, 272 that are heat-welded to each other along a longitudinal axis of the tubes 270, 272.

The systems 10, 40, 70, 80, 90, 200, 210, 220, 230 and various configurations discussed above may be utilized in connection with any suitable rock bolt, including cable bolts, friction bolts, rebar bolts, etc. The systems 10, 40, 70, 80, 90, 200, 210, 220, 230, for example, may be utilized in connection with the friction bolt shown and described in U.S. Provisional Patent Application No. 62/366,345 filed on Jul. 25, 2016, which is hereby incorporated by reference in its entirety. Further, rather than providing a separate injection or grout tube, the rock bolt may be a hollow core bolt with the resin and catalyst supplied to the borehole via the hollow core.

Figure 21:
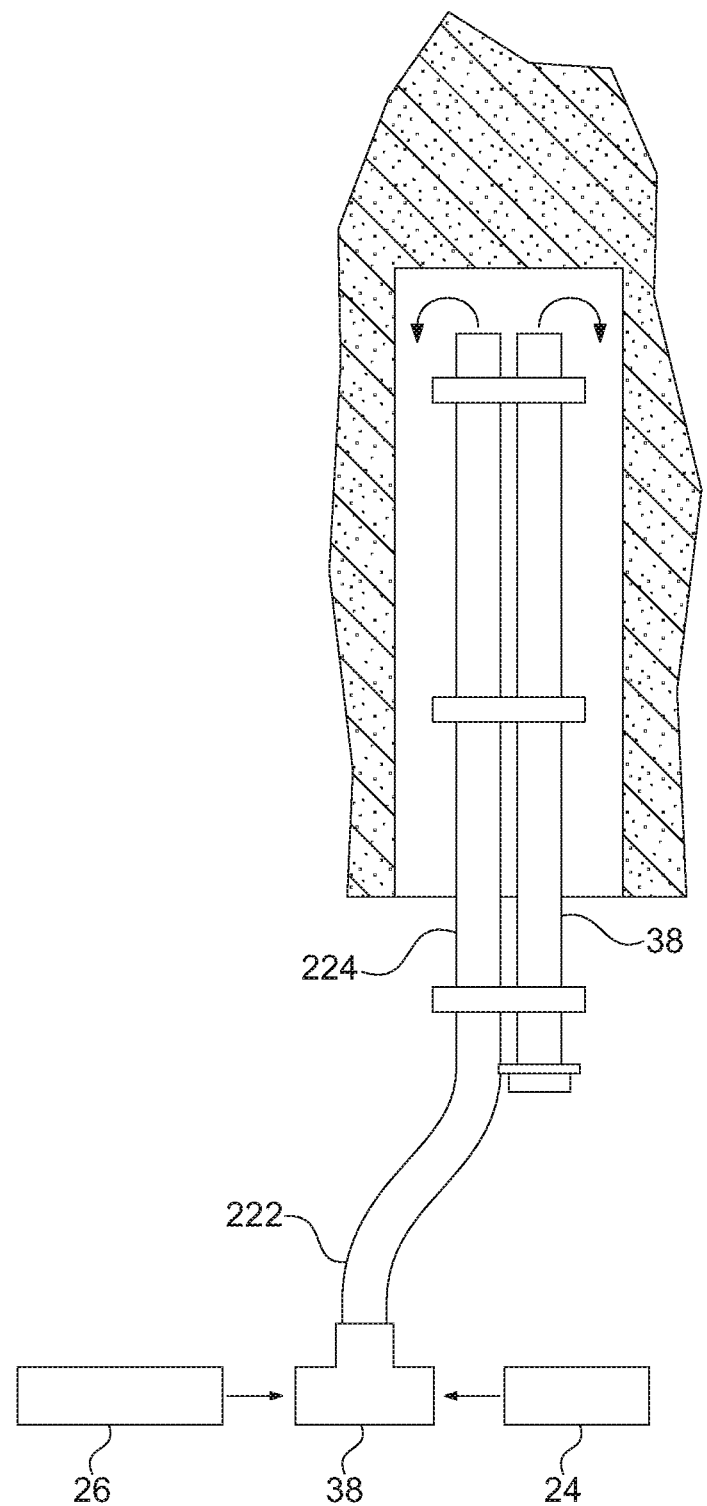
FIG. 21 is an elevational view of a pumping system and method for installing a mine roof bolt according to a further aspect of the invention showing the filling of a borehole.
Figure 22:
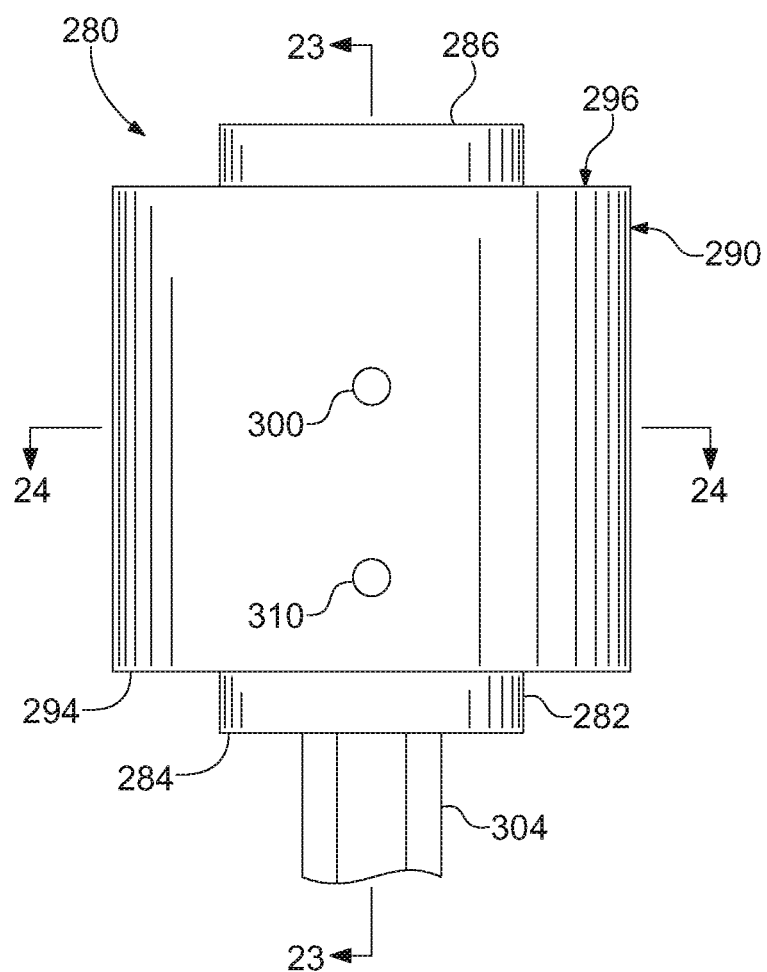
FIG. 22 is a front view of an injection fitting according to one aspect of the invention.
Figure 23:
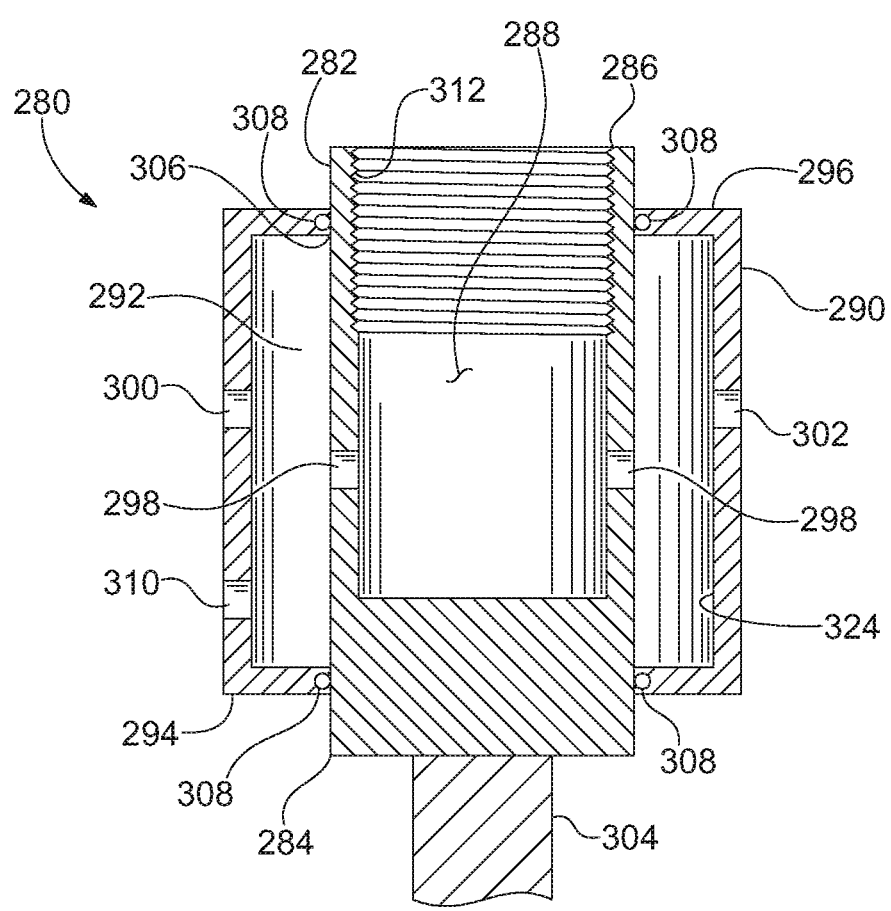
FIG. 23 is a cross-sectional view taken along line 23-23 in FIG. 22.

Referring to FIG. 21, the grout tube 224 may be attached to the mine bolt 36 with the mine bolt 36 and the grout tube 224 being inserted into the borehole, which was discussed above in connection with FIG. 14C. The grout tube 224 is secured to the mine bolt 36 using wire or tape at a plurality of spaced-apart locations, although other suitable arrangements may be utilized to secure the grout tube 224 to the mine bolt 36. The resin and catalyst are delivered to the borehole via the grout tube 224 with the grout tube 224 and the bolt 36 being encased by the resin and grout and left within the borehole upon curing of the resin. The grout tube 224 may be connected to the injection tube 222 with the grout tube 224 being separated from the injection tube 222 after delivery of the resin and catalyst such that the injection tube 222 and connector 38 can be utilized for installing additional bolts 36. The injection tube 222 and connector 38 may be in fluid communication with the static mixer 62 discussed above. The mine bolt 36 may be a cable bolt, such as a twin strand cable bolt with a plurality of bulbs along the length of the bolt 36, although other suitable cable bolts may be utilized. The mine bolt 36 may also have a length of at least 30 ft., although other suitable length cable bolts may be utilized.

Referring to FIGS. 22-25, an injection fitting 280 for a pumpable resin system according to a further embodiment is shown. The injection fitting 280 includes a main body 282 having a first end 284 and a second end 286 positioned opposite the first end 284. The main body 282 defines a central opening 288 at the second end 286 of the main body 282 that is configured to receive a rock bolt. The central opening 288 extends from the second end 286 of the main body 282 to a position intermediate the first and second ends 284, 286 of the main body 282. The injection fitting 280 also includes a grout body 290 that defines a space 292 between the main body 282 and the grout body 290. The grout body 290 has a first end 294 and a second end 296 positioned opposite the first end 294. The main body 282 defines a pair of grout openings 298 in fluid communication with the central opening 288 of the main body 282. The main body 282 is rotatable relative to the grout body 290. The grout body 290 defines a resin port 300 and a catalyst port 302 that are each in fluid communication with the space 292 between the main body 282 and the grout body 290 and the grout openings 298 of the main body 282.

The main body 282 is cylindrical and includes a drive head 304 at the first end 284 of the main body 282 that is configured to be engaged by a drive tool (not shown), such as a drill implement of a boom arm of a mine bolting machine. The grout body 290 is annular and receives the main body 282 within a central opening 306 defined by the grout body 290. The main body 282 and/or grout body 290 includes a pair of seals 308 that are configured to provide a sealed interface between the main body 282 and the grout body 290. The main body 282 is free to rotate relative to the grout body 290 when the main body 282 is rotated via the drive head 304. Axial movement of the main body 282 relative to the grout body 290 may be restricted via a retaining clip (not shown) at the second end 286 of the main body 282 or a flange (not shown) projecting from the main body 282, although other suitable arrangements for restricting axial movement of the main body 282 relative to the grout body 290 may be utilized.

Figure 25:
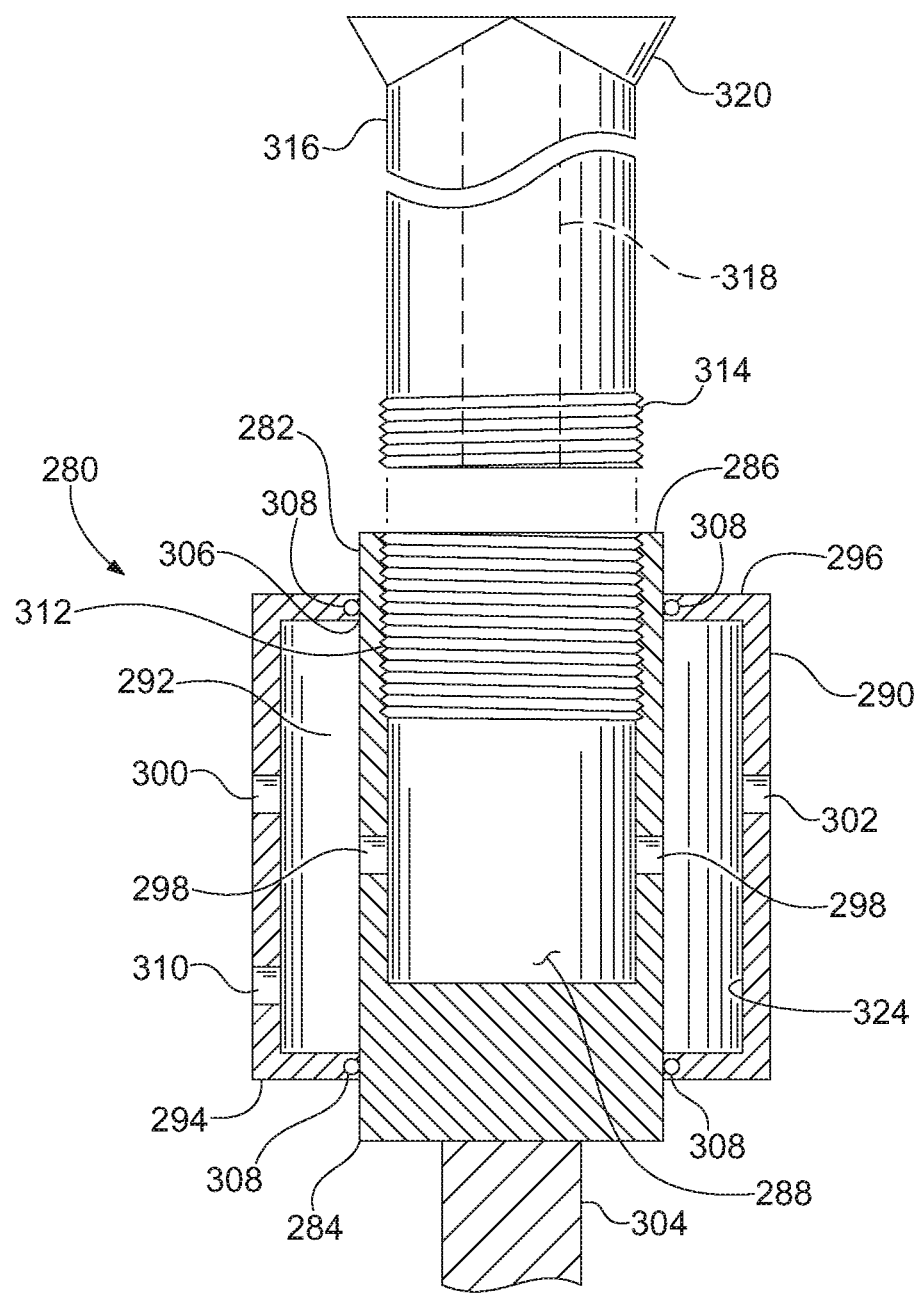
FIG. 25 is a cross-sectional view taken along line 24-24 in FIG. 22, showing the injection fitting used in conjunction with a self-drilling mine bolt.

The grout body 290 further includes a water port 310 that is in fluid communication with the grout openings 298 of the main body 282. Alternatively, the main body 282 may define a further port for injecting water. The water port 310 may be utilized to inject water or a water and oil solution to flush the fitting 280 after each use. The main body 282 includes a threaded portion 312 adjacent to the central opening 288 of the main body 282. As shown in FIG. 25, the threaded portion 312 of the main body 282 is configured to receive a corresponding threaded portion 314 of a rock bolt 316. More specifically, the rock bolt 316 may be a self-drilling rock bolt defining a central opening 318 configured to be in fluid communication with the central opening 288 of the injection fitting 280 when the rock bolt 316 is secured to the fitting 280. In one aspect, the rock bolt 316 is secured to the fitting 280 via engagement of the corresponding threaded portions 312, 314. The rock bolt 316 includes a drill bit 320 configured to drill a bore hole in rock strata.

Figure 24:
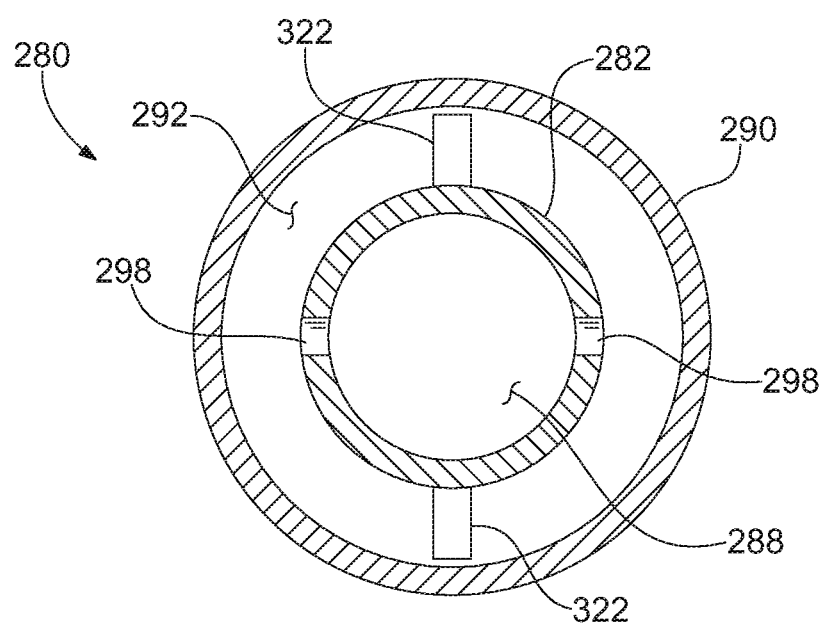
FIG. 24 is a cross-sectional view taken along line 24-24 in FIG. 22.

Referring to FIG. 24, the main body 282 includes a pair of wipers 322 extending radially outward from the main body 282 into the space 292 between the main body 282 and the grout body 290. The wipers 322 are configured to remove resin and catalyst from an inner surface 324 of the grout body 290. The wipers 322 may extend the first end 294 of the grout body 290 to the second end 296 of the grout body 290. Although two wipers 322 are shown, one or more wipers 322 may be utilized.

Referring again to FIGS. 22-25, the injection fitting 280 may be utilized by securing the rock bolt 316 to the injection fitting 280 using the corresponding threaded portions 312, 314. The rock bolt 316 is used to drill a bore hole in the rock strata via engagement with the drive head 304. During rotation of the main body 282 of the fitting 280 and the rock bolt 316, the grout body 290 remains fixed relative to the main body 282 of the fitting 280 and the rock bolt 316. Water or a drilling fluid may be supplied to the drill bit 320 via the central opening 318 of the rock bolt 316 and one of the ports 300, 302, 310 of the injection fitting 280. The rock bolt 316 may be grouted by supplying resin and catalyst to the resin and catalyst ports 300, 302 using any of the supply systems discussed herein. The resin and catalyst flow through the respective ports 300, 302, into the space 292 between the main body 282 and the grout body 290, and through the grout openings 298 of the main body 282 and into the central opening 288 of the main body 282. The resin and catalyst can then flow from the central opening 288 of the main body 282 through the central opening 318 of the rock bolt 316 and into the bore hole previously drilled by the rock bolt. The main body 282 is then disengaged from the rock bolt 316 by unthreading the main body 282 from the rock bolt 316. The fitting 280 may be flushed via the water port 310 with water or a water and oil solution to clean out the fitting 280 and to prevent accumulation of cured resin within the fitting 280. Further rock bolts 316 may then be installed utilizing the same process discussed above.

Figure 26A:
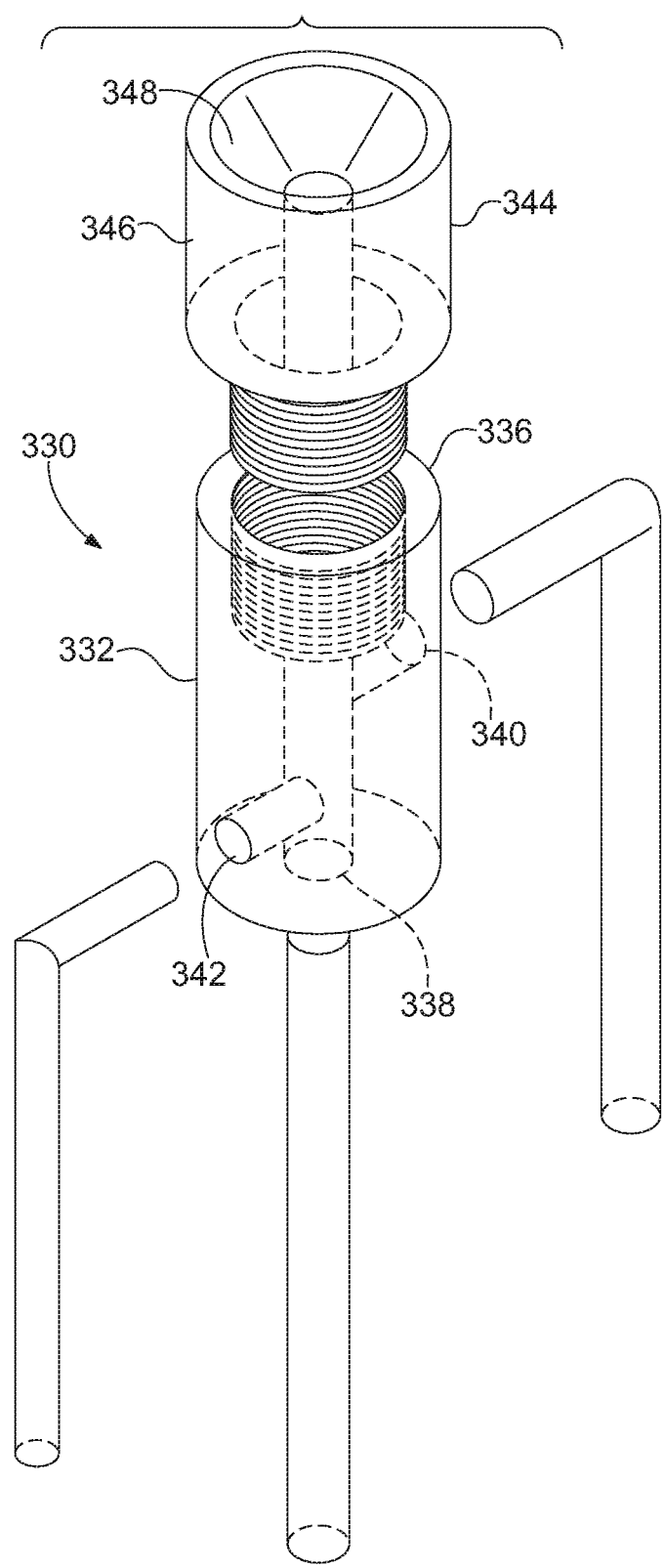
FIG. 26A is an exploded perspective view of a resin injection system according to one aspect of the present invention.
Figure 26B:
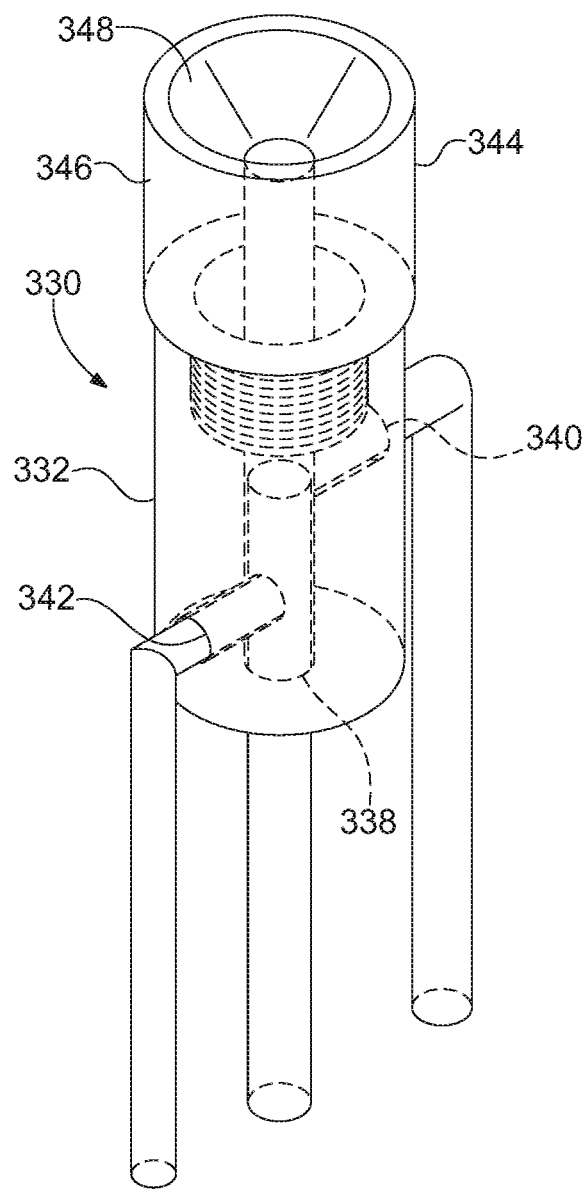
FIG. 26B is a perspective view of the resin injection system of FIG. 26A.
Figure 26C:
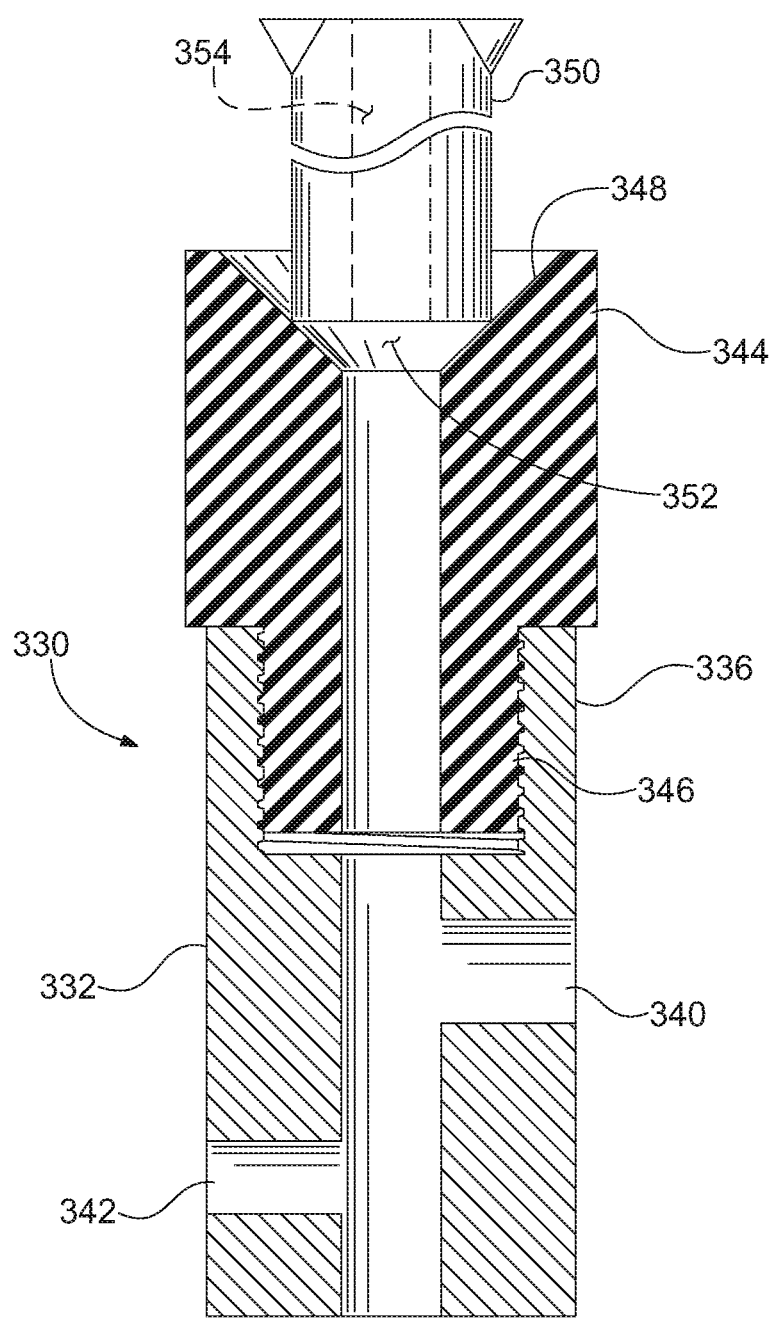
FIG. 26C is a cross-sectional view of the resin injection system of FIG. 26A.

Referring to FIGS. 26A-26C, an injection fitting 330, according to a further aspect of the invention, includes a body 332 having a first end 334 and a second end 336 positioned opposite the first end 334. The body 332 defines a resin port 338, a catalyst port 340, and a water port 342. The first end 334 of the body 332 is configured to engage a boom arm of a mine bolting machine. The fitting 330 further includes a rock bolt engagement member 344 having a body 346 with a conical surface 348 that is configured to engage and form a seal with a rock bolt 350. The body 346 may be produced from an elastomeric material, although the body 346 may be produced from any suitable material that can form a seal with the rock bolt 350. The rock bolt engagement member 344 is secured to the body 332. The rock bolt engagement member 344 may be secured to the body 332 by a threaded arrangement, although any suitable securing arrangement may be utilized. The resin may be supplied to the resin port 338 via the boom arm or a separate injection line connected to the boom arm.

The conical surface 348 of the rock bolt engagement member 344 may define an interior space 352 with the resin port 338 and the catalyst port 340 in fluid communication with the interior space 352. During use, the conical surface 348 of the rock bolt engagement member 344 engages the rock bolt 350 and forms a seal with the rock bolt 350. Resin and catalyst are supplied to the resin port 338 and the catalyst port 340, into the interior space, and through a central opening 354 defined by the rock bolt 350. The upward force from the boom arm is sufficient for the body 346 of the rock bolt engagement member 344 to form a seal with the rock bolt 350 during the injection of the resin and catalyst. The body 332 may be flushed with an oil/water mixture using the water port 342. The rock bolt 350 may be a self-drilling rock bolt.

Figure 27:
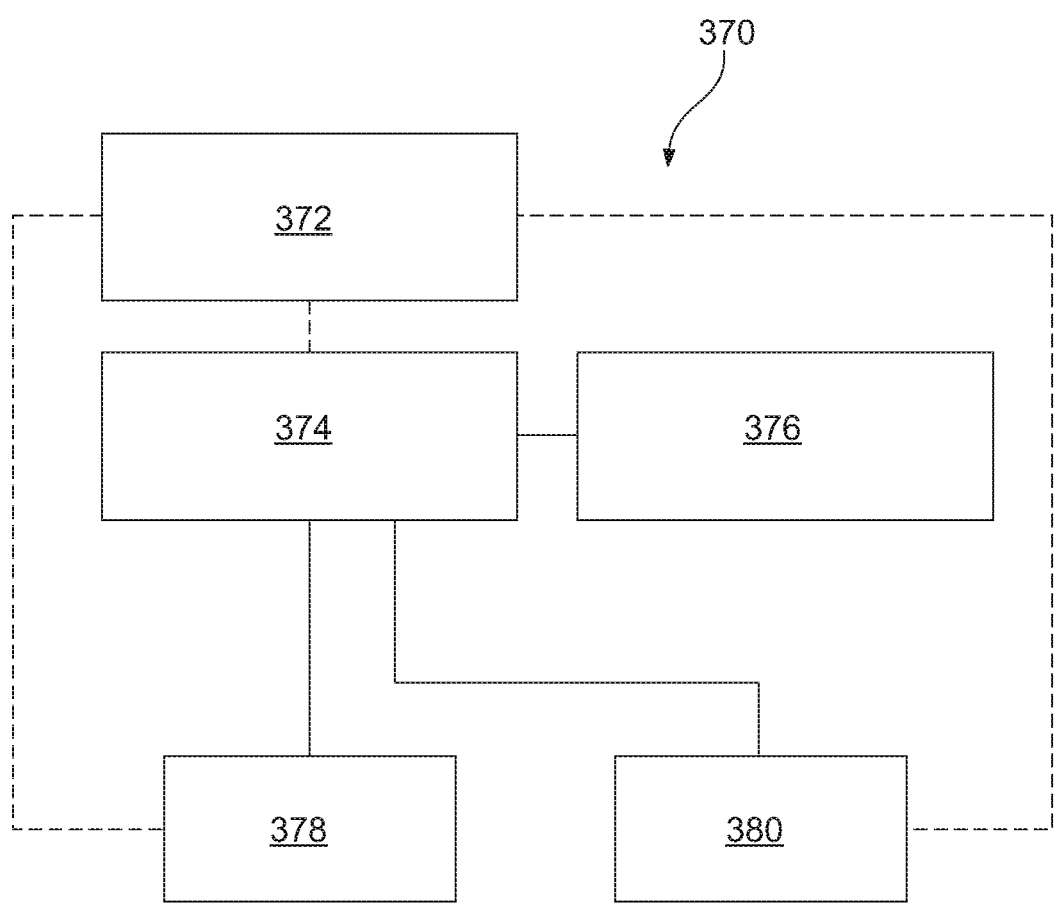
FIG. 27 is a schematic view of a pumping system and method for installing a mine roof bolt according to a further aspect of the invention.
Figure 28:
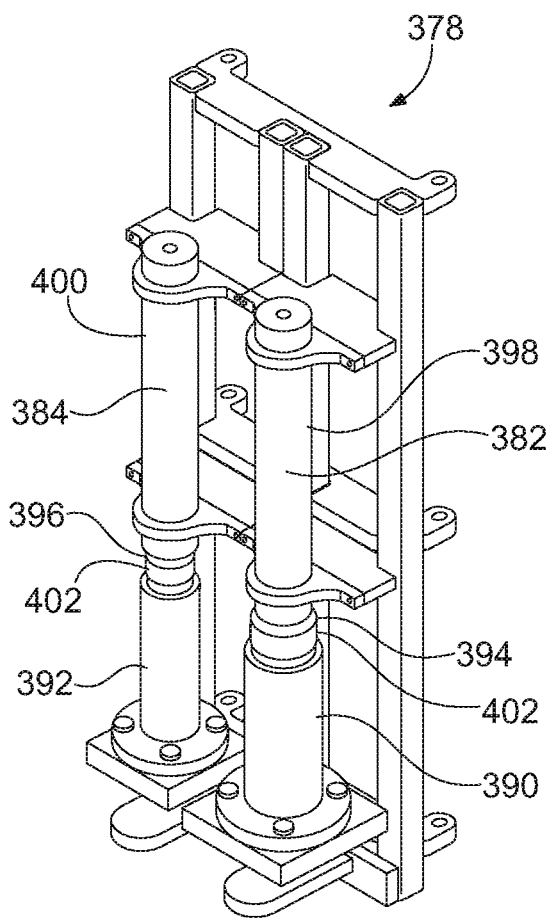
FIG. 28 is a perspective view of a load cylinder set according to one aspect of the present invention, showing the load cylinder set in a dispensing position.
Figure 29:
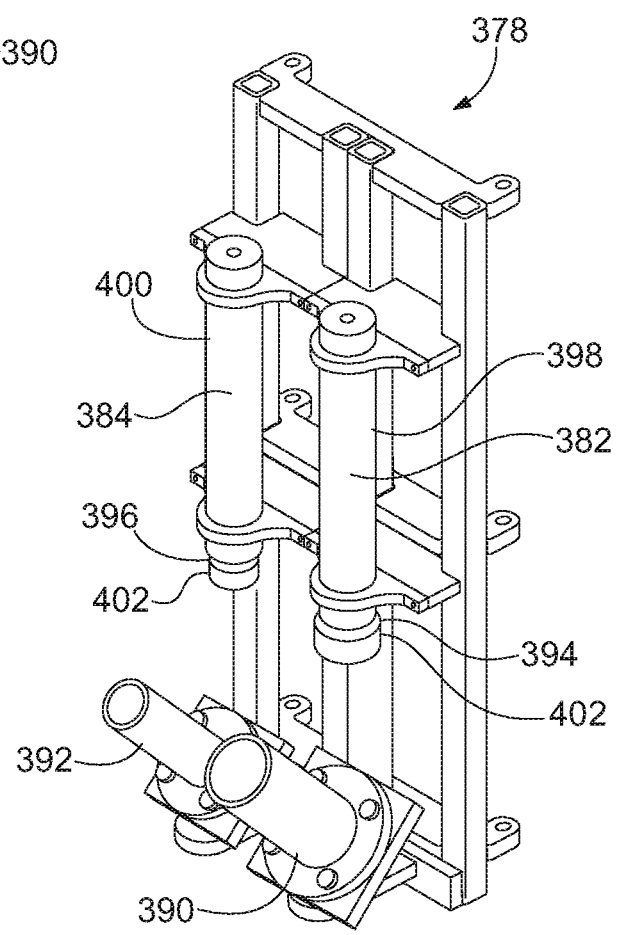
FIG. 29 is a perspective view of a load cylinder set according to one aspect of the present invention, showing the load cylinder set in a load position.
Figure 30:
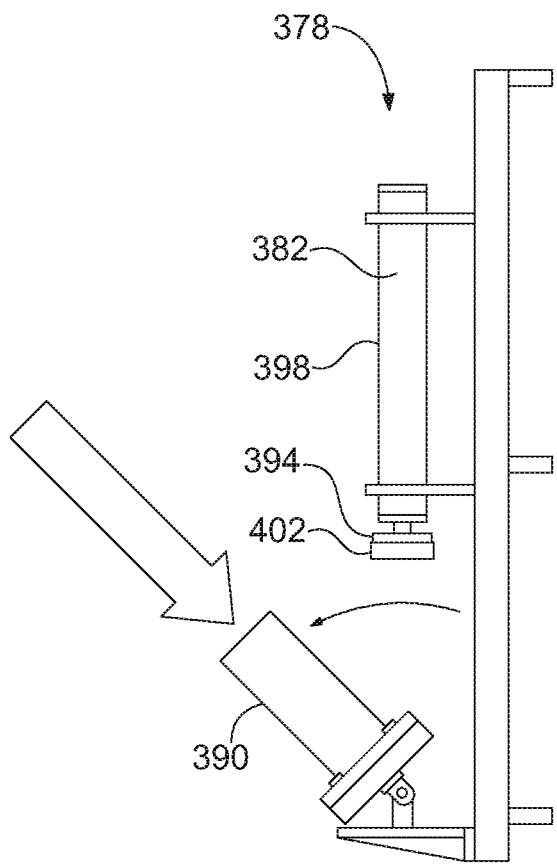
FIG. 30 is a side view of the load cylinder set of FIG. 28, showing the load cylinder set in a load position.
Figure 31:
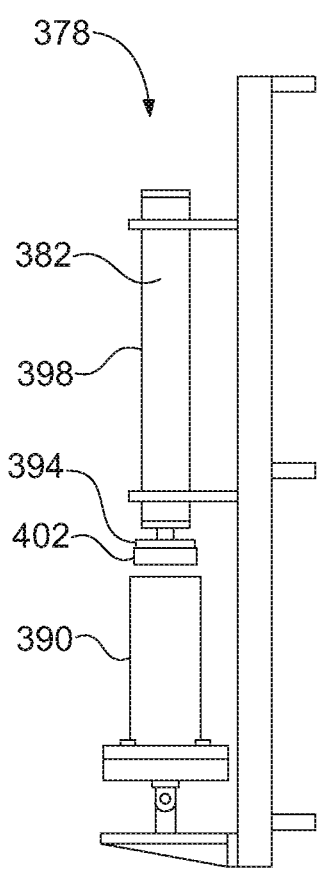
FIG. 31 is a side view of the load cylinder set of FIG. 28, showing the load cylinder set in a dispensing position.

Referring to FIG. 27, a pumpable system 370 according to a further aspect of the present invention includes a control module 372, a hydraulic motor 374, a hydraulic reservoir 376, a load cylinder set 378, and an injection cylinder set 380. The control module 372 is electronically connected to the hydraulic motor 374 and the load cylinder set 378 and the injection cylinder set 380. The load cylinder set 378 includes a resin load cylinder 382 and a catalyst load cylinder 384 and the injection cylinder set 380 includes a resin injection cylinder 386 and a catalyst injection cylinder 388 similar to the system 150 shown in FIG. 13 and discussed above. The cylinders 382, 384, 386, 388 each include a linear encoder, which is in communication with the control module 372, although other suitable sensors to measure the position of pistons within the cylinders 382, 384, 386, 388 may be utilized. The control module 372 is configured to dispense a predetermined amount of resin and catalyst from the injection cylinders 386, 388 based on an input from a user. The control module 372 may include an automatic injection input corresponding to a number of preprogrammed or preset configurations for dispensing predetermined amounts of resin and catalyst and may also include a manual injection input corresponding to custom user-inputted dispensing amounts of resin and catalyst. The control module 372 may be a PLC controller including at least one processor, or any other like computing device for controlling one or more aspects of the system 370. The PLC or processor may be programmed using any suitable programming language, including, for example in ladder logic available from Rockwell, although any other suitable programming language may be utilized. The hydraulic motor is in fluid communication with the hydraulic reservoir 376 and supplies the hydraulic fluid to the load cylinder set 378 and the injection cylinder set 380 based on the input from the control module 372. Although a programmable control module 372 may be utilized, the system 370 may also be utilized manually to turn the hydraulic motor 374 on or off to dispense resin and catalyst from the cylinders 382, 384, 386, 388. The system 370 may also include a plurality of isolation valves that allows the cylinders 382, 384, 386, 388 to be controlled individually and independently.

The injection cylinder set may be supplied from the hydraulic motor 374 via a mechanical spool valve (not shown). The spool valve may supply twice the volume of hydraulic fluid from the reservoir 376 to the resin injection cylinder 386 compared to the catalyst injection cylinder 388 to obtain a 2:1 ratio for supplying the resin and catalyst from the cylinders 386, 388. Alternatively, servo valves may be utilized to electronically control the cylinders 386, 388 to obtain the desired resin/catalyst supply ratio.

Referring to FIGS. 28-31, the load cylinder set 378 is similar and operates similarly to the system 150 shown in FIG. 13 and discussed above. Rather than loading the cartridges 160, 162 via the cap 164, however, the cylinders 382, 384 each include a rotatable chamber 390, 392 that rotates from a dispensing position where the chambers 390, 392 are aligned with respective piston heads 394, 396 to a load position where the chambers 390, 392 are positioned at an angle, such as 45 degrees, relative to the piston heads 394, 396. In the load position, the cartridges 160, 162 may be loaded into the chambers 390, 392 with the chambers 390, 392 being subsequently moved into the dispensing position to allow the piston heads 394, 396 to supply the resin and catalyst to the injection cylinder set 380. The load cylinder set 378 may include a lockout arrangement to prevent the actuation of the piston heads 394, 396 when the chambers 390, 392 are in the load position. The load cylinders 382, 384 also include stationary cylinders 398, 400. The stationary cylinders 398, 400 may have the same diameter and length. The resin chamber 390 and the catalyst chamber 392 may have different diameters with the piston heads 394, 396 sized to cooperate with the resin and catalyst chambers 390, 392. The resin piston head 394 and the catalyst piston head 396 includes a cleaning seal that is configured to remove resin and catalyst from the chambers 390, 392. The cleaning seal may be a polymeric material. In one aspect, the cleaning seal is manufactured from high density polyethylene, although other suitable materials may be utilized. The cleaning seal may be readily replaced once the cleaning seal becomes worn. The resin load chamber 390 and the catalyst load chamber 392 may include a piercing member (not shown) that is configured to pierce the cartridges 160, 162 when the cylinders 382, 384 are actuated.

Figure 34:
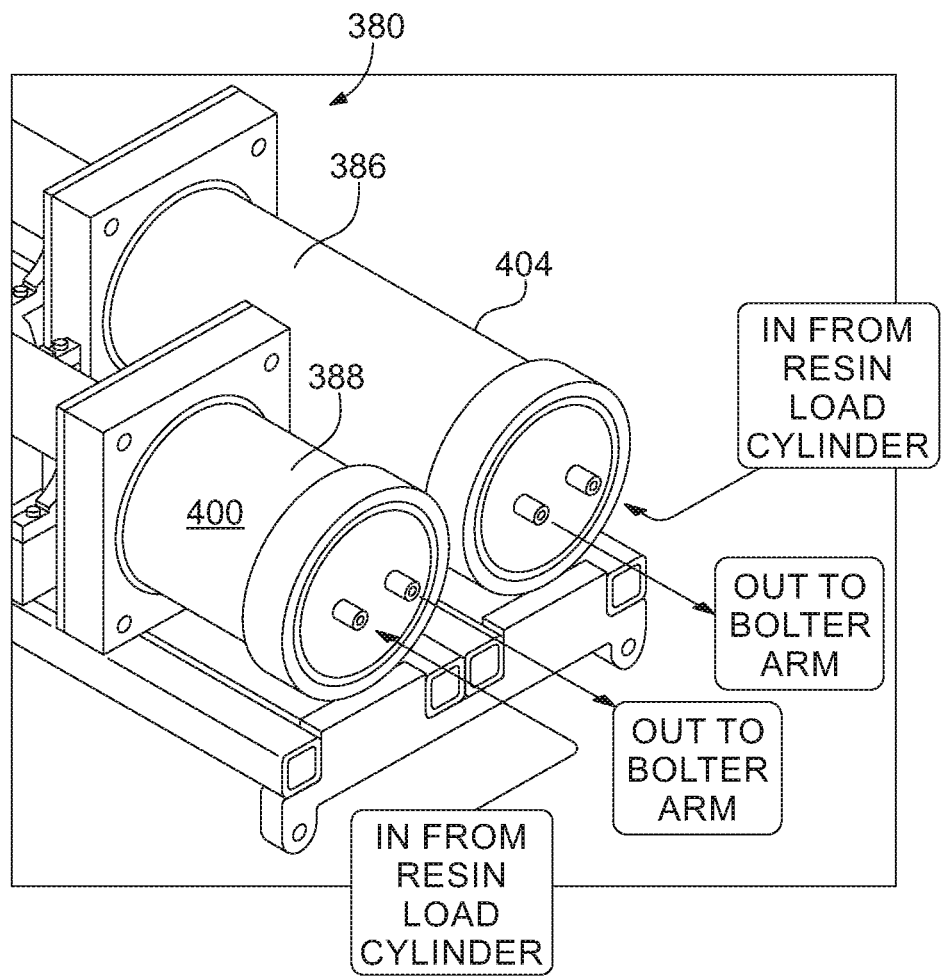
FIG. 34 is a bottom perspective view of the injection cylinder set of FIG. 32.

Referring to FIGS. 32-34, the injection cylinder set 380 is similar and operates similarly to the system 150 shown in FIG. 13 and discussed above. The injection cylinders 386, 388 receive resin and catalyst from the load cylinders 382, 384 and are configured to supply resin and catalyst to a borehole via a bolter, grout tube, or other suitable arrangement. The injection cylinders 386, 388 each include a chamber 404, 406 and hydraulic cylinder 408, 410. The chambers 404, 406 may have the same diameter, but different lengths. The hydraulic cylinders 408, 410 may also have the same diameter, but different lengths.

Figure 35:
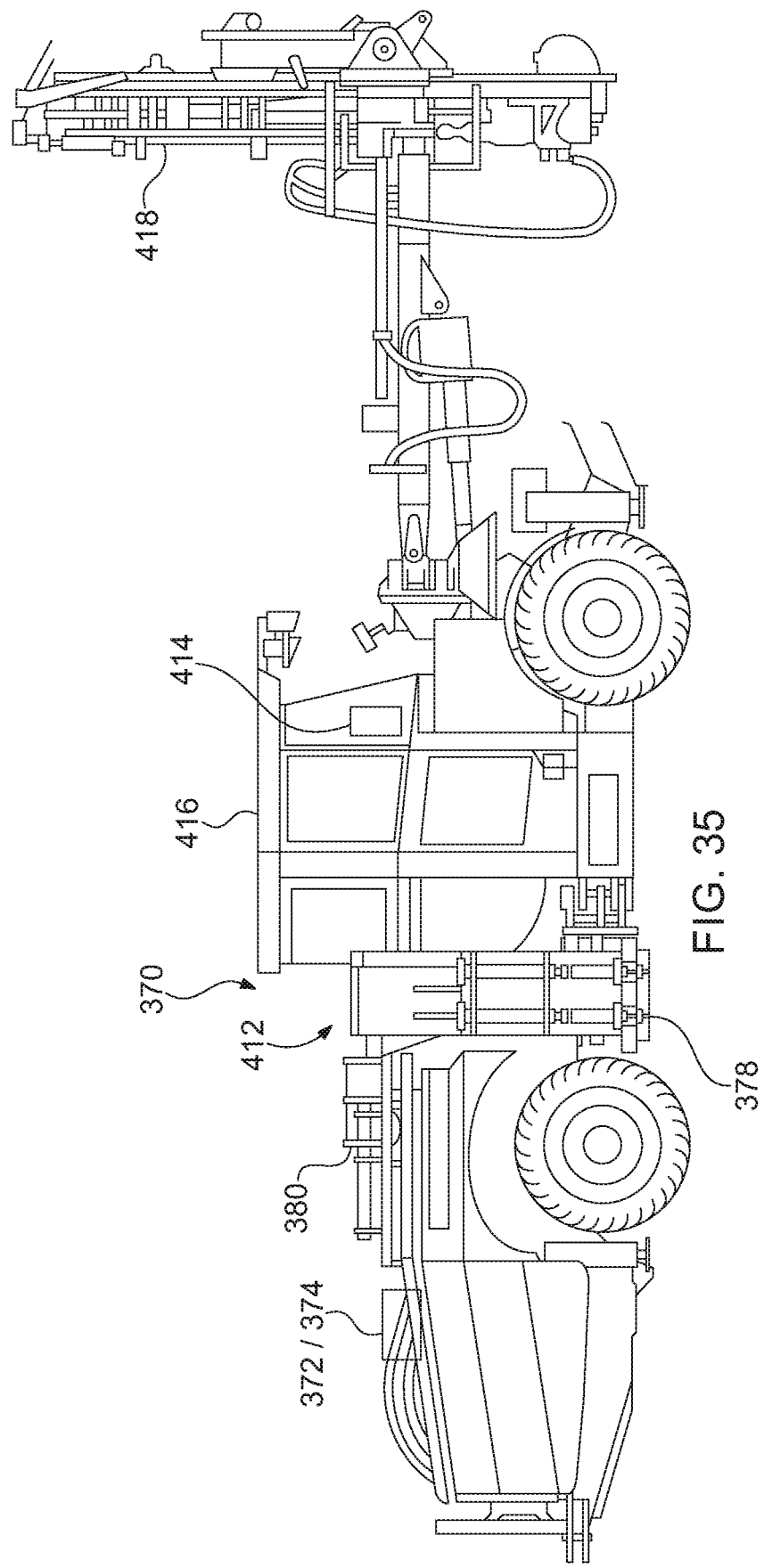
FIG. 35 is side view of the system of FIG. 27, showing the system mounted to a bolter machine.
Figure 36:
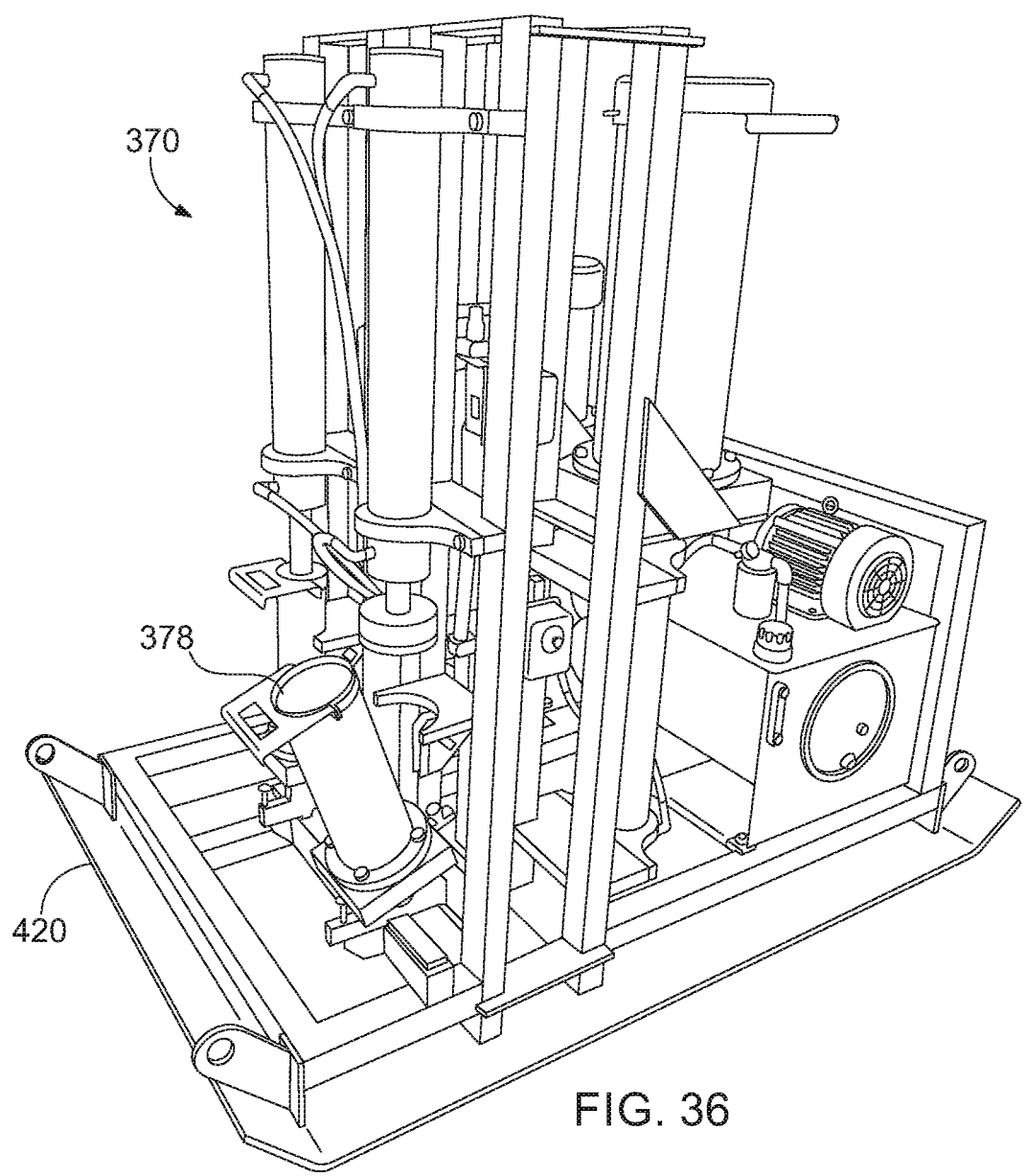
FIG. 36 is a side perspective view of the system of FIG. 27, showing the system mounted to a skid.

Referring to FIG. 35, the system 370 is shown positioned on a bolter machine 412. The load cylinder set 378 may be positioned on the side of the bolter machine 412 to allow easy access for loading cartridges 160, 162 into the cylinders 382, 384. A control panel 414 may be positioned in a cab 416 of the bolter machine 412. The control panel 414 is in communication with the control module 372 to allow an operator of the bolter machine 412 to control the supply of resin and catalyst to a bolter arm 418 as discussed above. The control module 372, hydraulic motor 374, reservoir 376, load cylinder set 378, and injection cylinder set 380 may be provided within housings or guards to protect them from the surrounding environment.

Figure 37:
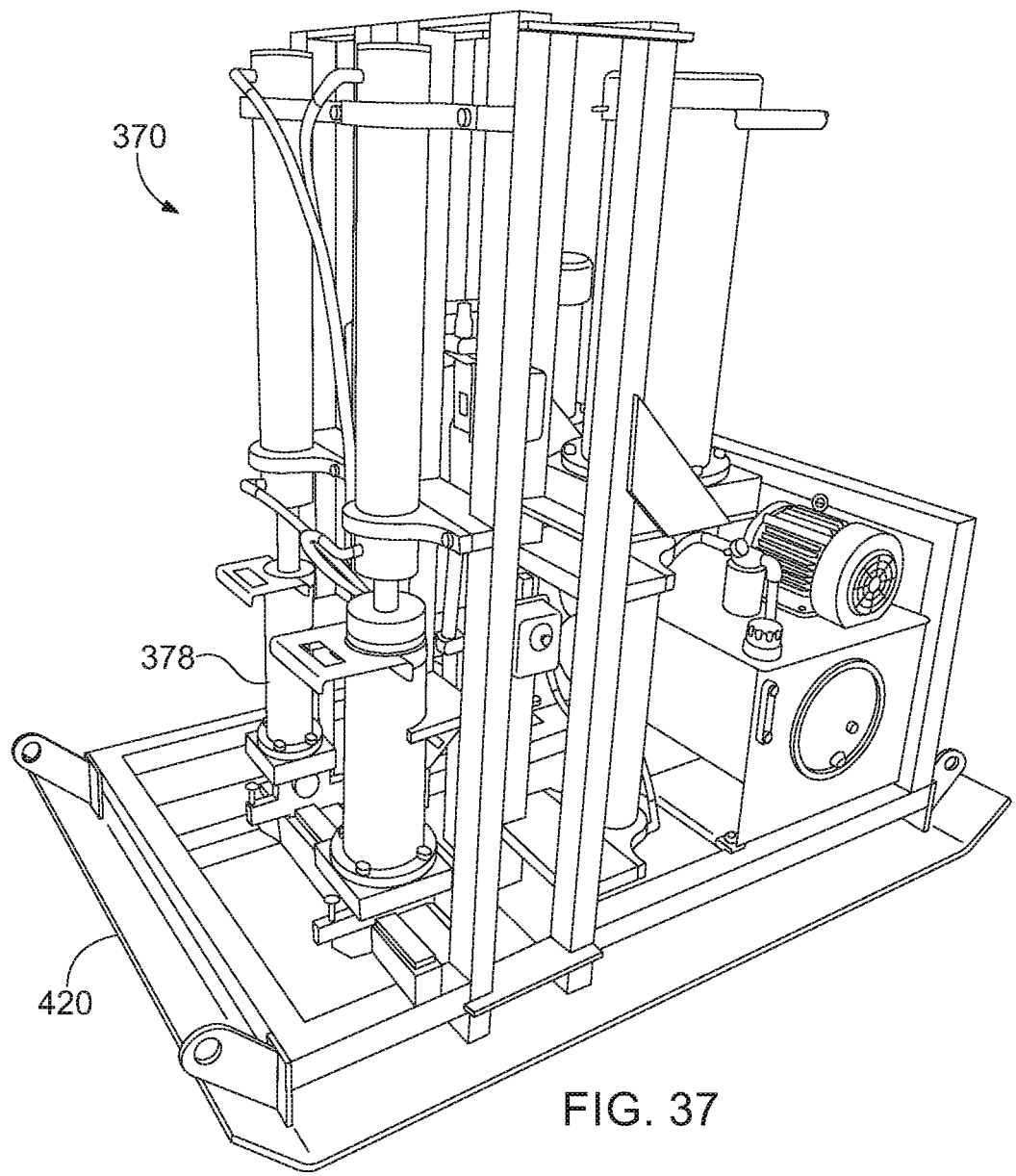
FIG. 37 is a front perspective view of the system of FIG. 27, showing the system mounted to a skid.
Figure 38:
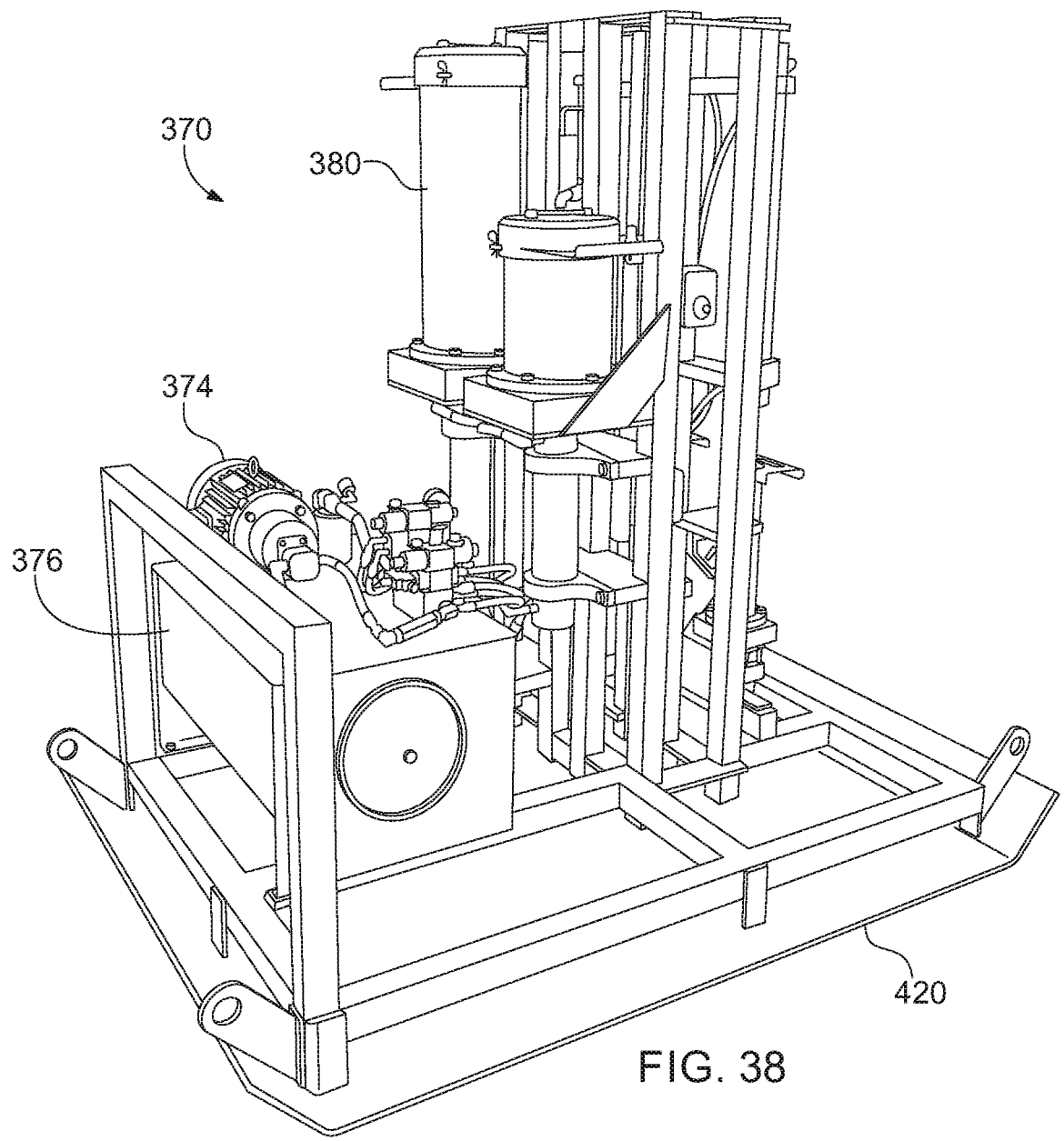
FIG. 38 is a rear perspective view of the system of FIG. 27, showing the system mounted to a skid.

Referring to FIGS. 37 and 38, the system 370 may also be provided on a skid 420 as a standalone unit. Although not shown, the control module 372, hydraulic motor 374, reservoir 376, load cylinder set 378, and injection cylinder set 380 may be provided within housings or guards on the skid 420 to protect them from the surrounding environment. The skid 420 and the system 370 in general may be utilized in connection with any of the arrangements discussed above in connection with systems 10, 40, 70, 80, 90, 200, 210, 220, 230.

Figure 39:
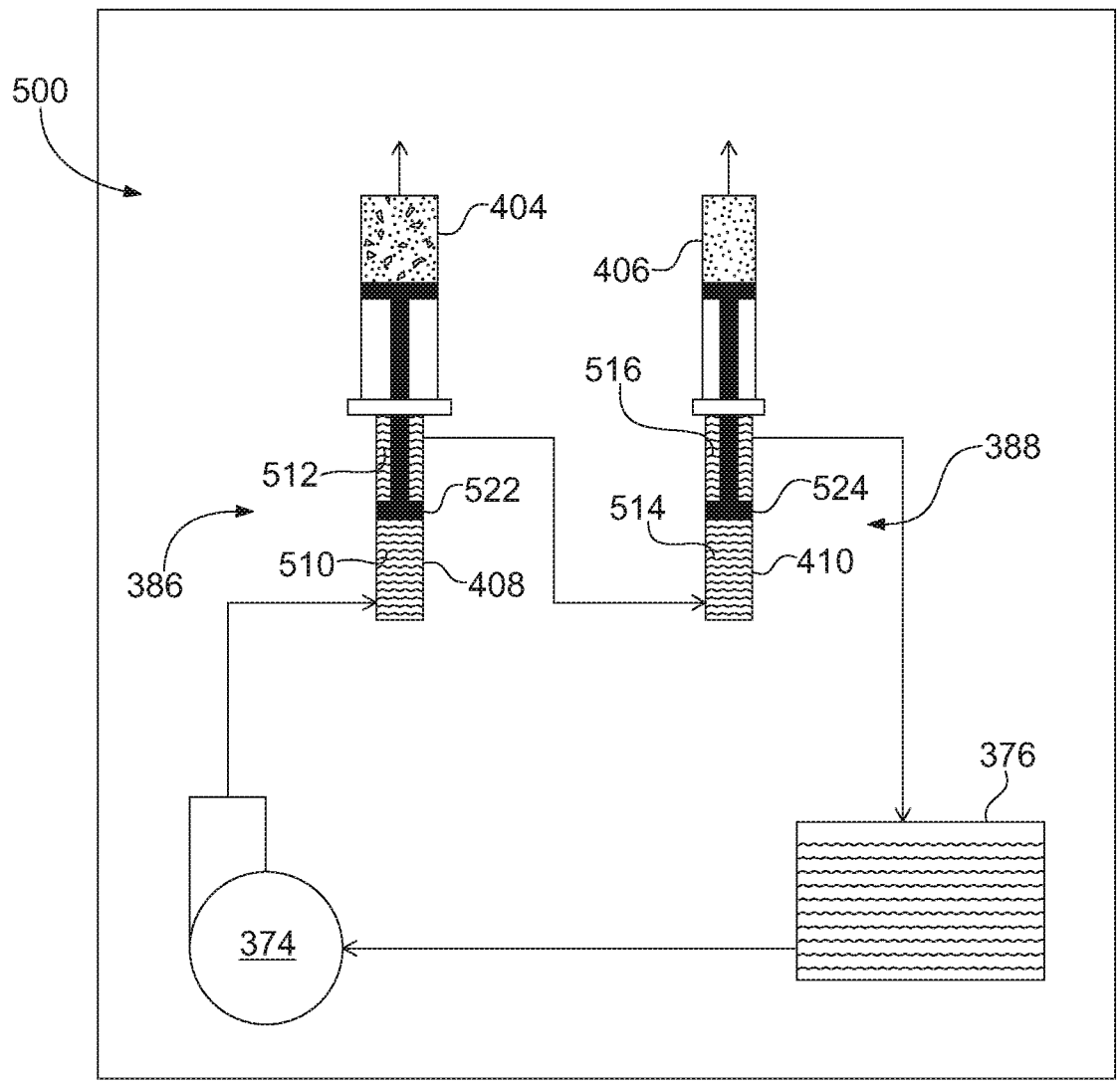
FIG. 39 is an elevational view of a pumping system and method for installing a mine roof bolt according to a further aspect of the invention.

Referring to FIG. 39, an injection cylinder set 500 according to a further aspect of the present invention is shown. The injection cylinder set is similar to the injection cylinder 380 shown in FIGS. 32-34 and discussed above. Rather than utilizing a spool valve to control the ratio of the resin and catalyst being supplied from the cylinders 386, 388, the resin injection cylinder 386 and the catalyst injection cylinder 388 are synchronized to ensure that the catalyst injection cylinder 388 is displaced when the resin injection cylinder 386 is displaced. In the same manner discussed above in connection with injection cylinder set 380, the injection cylinders receive resin and catalyst from the load cylinders 382, 384 and are configured to supply resin and catalyst to a borehole via a bolter, grout tube, or other suitable arrangement. In the injection cylinder set 500, the hydraulic cylinders 408, 410 are identical in size, which improves serviceability and reduces costs, although other suitable sized cylinders may be utilized. The resin chamber 404 is larger in volume than the catalyst chamber 406. In one aspect, the resin chamber 404 is 10" in diameter and 27 inches long and the catalyst chamber 406 is 7" in diameter and 27 inches long.

Referring again to FIG. 39, the hydraulic cylinders 408, 410 may be double-acting cylinders with the resin hydraulic cylinder 408 fluidly connected to the catalyst hydraulic cylinder 410 in series such that movement of the resin hydraulic cylinder 408 results in corresponding movement of the catalyst hydraulic cylinder 410. The resin hydraulic cylinder 408 and the catalyst hydraulic cylinder 410 each include first and second chambers 510, 512, 514, 516 positioned on opposite sides of a piston 522, 524. The first chamber 510 of the resin hydraulic cylinder 408 is in fluid communication with the hydraulic pump 374, the second chamber 512 of the resin hydraulic cylinder 408 is in fluid communication with the first chamber 514 of the catalyst hydraulic cylinder 410, and the second chamber 516 of the catalyst hydraulic cylinder 410 is in fluid communication with the hydraulic reservoir 376.

Figure 40:
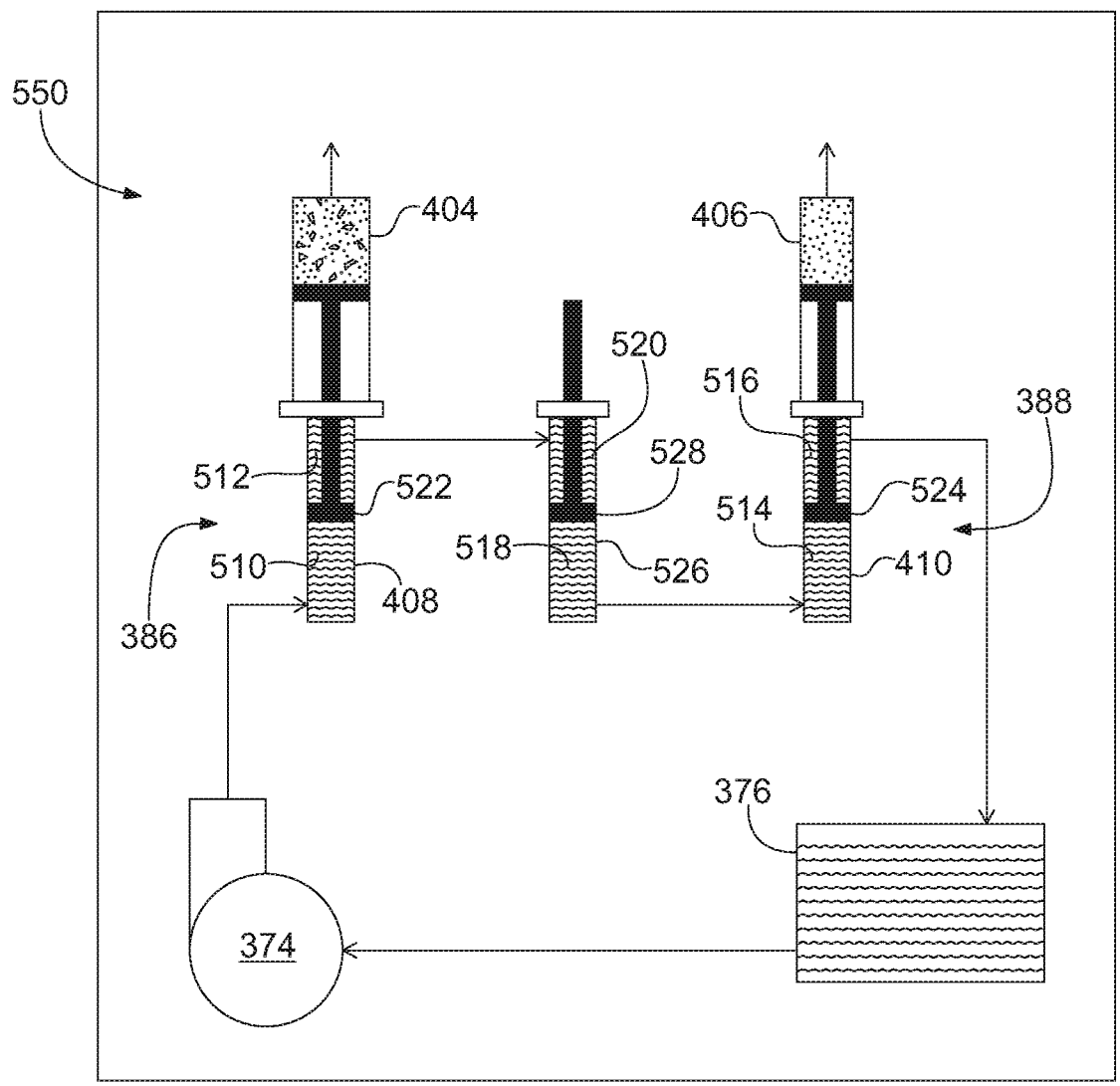
FIG. 40 is an elevational view of a pumping system and method for installing a mine roof bolt according to a further aspect of the invention.
Figure 41:
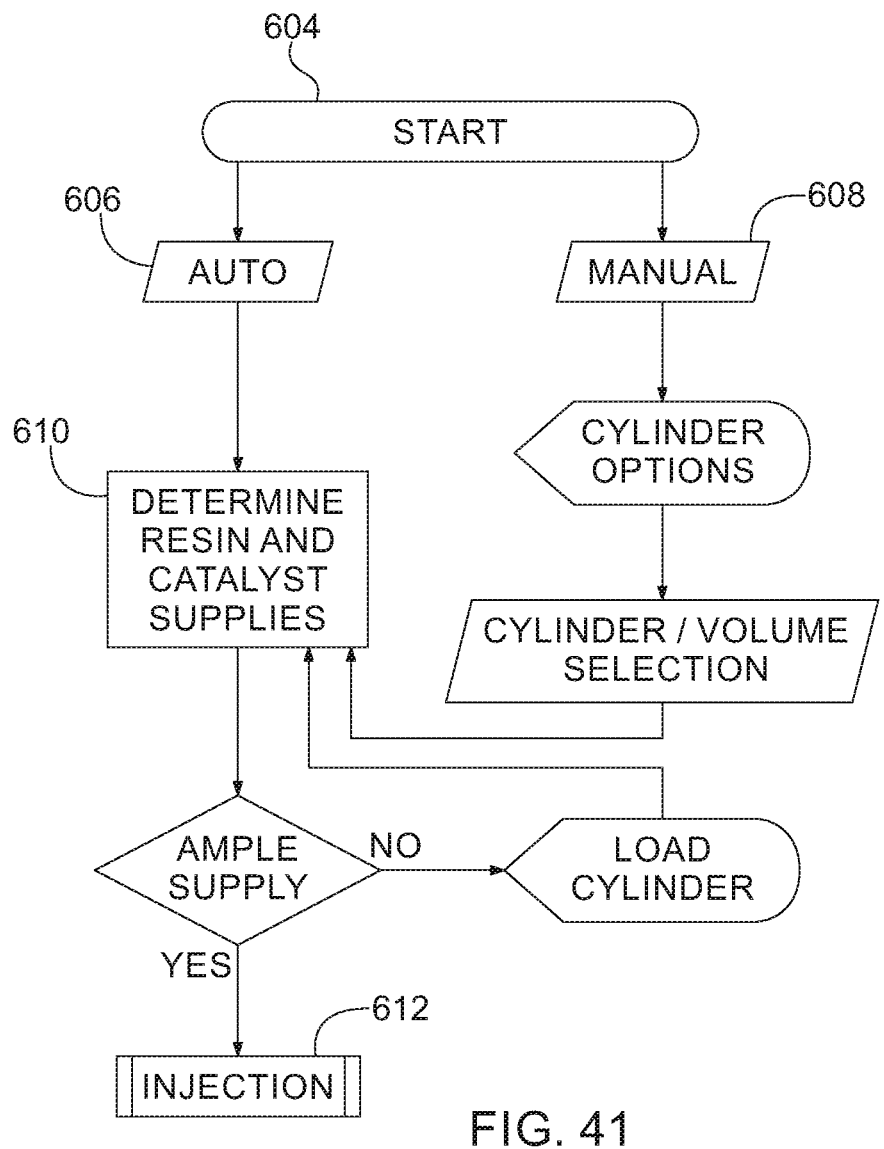
FIG. 41 is a schematic view of a method for controlling a pumpable resin system according to one aspect of the invention.

Referring to FIG. 40, an injection cylinder set 550 according to a further aspect of the present invention is shown. The injection cylinder set 550 is similar to the injection cylinder sets 380, 500 shown in FIGS. 32-34 and 39 and discussed above. In contrast to the injection cylinder set 500 of FIG. 39, however, the injection cylinder set 550 further includes a synchronizing cylinder 526 provided in series between the resin injection cylinder 386 and the catalyst injection cylinder 388. The injection cylinder set 600 ensures the resin and catalyst injection cylinders 386, 388 are synchronized to ensure that the catalyst injection cylinder 388 is displaced when the resin injection cylinder 386 is displaced. The synchronizing cylinder 526 includes first and second chambers 518, 520 positioned on opposite sides of a piston 528, with the first chamber 510 of the resin hydraulic cylinder 408 in fluid communication with the hydraulic pump 374, the second chamber 512 of the resin hydraulic cylinder 408 in fluid communication with the second chamber 520 of the synchronizing cylinder 526, the first chamber 518 of the synchronizing cylinder 526 in fluid communication with the first chamber 514 of the catalyst hydraulic cylinder 410, and the second chamber 516 of the catalyst hydraulic cylinder 410 in fluid communication with the hydraulic reservoir 376. The synchronizing cylinder 526 ensures equal cross-sectional area of the second chamber 512 of the resin hydraulic cylinder 408 and the second chamber 520 of the synchronizing cylinder 526 and equal cross-sectional area of the first chamber 518 of the synchronizing cylinder 526 and the first chamber 514 of the catalyst cylinder 410. The resin hydraulic cylinder 408, the synchronizing cylinder 526, and the catalyst hydraulic cylinder 410 are identical in size, although other suitable arrangement may be utilized. The resin hydraulic cylinder 408, the synchronizing cylinder 526, and the catalyst hydraulic cylinder 410 are each configured to be actuated independently. The injection cylinder set 600 may include make up valves or anti-cavitation valves (not shown) to allow the catalyst hydraulic cylinder 410 to retract, the resin hydraulic cylinder 408 to retract, and the independent control of the synchronizing cylinder 526 to reset the synchronizing cylinder 526 if the resin and catalyst cylinders 408, 410 bottom out at different times. The synchronizing cylinder 526 includes a linear encoder to determine the position of the piston 528 and the amount of stroke available, although other suitable sensors may be utilized to determine the position and stroke available for the cylinder 526.

The injection cylinder sets 500, 550 may be utilized with the pumpable resin system 370 discussed above and in connection with any of the delivery arrangements and methods discussed herein.

Referring to FIGS. 41-44, schematic diagrams of a system and method for controlling the pumpable resin system 370 discussed above according to one aspect of the present invention are shown. As discussed above, the control of the pumpable resin system 370 is accomplished via the control module 372, which may be a PLC controller including at least one processor, or any other like computing device for controlling one or more aspects of the system 370.

Referring to FIGS. 41-44, the computer-implemented method includes the step 604 of receiving an injection input from the control panel 414. Although the control panel 414 is shown in FIG. 35 in a cab of the bolter machine 416, the control panel 414 may be provided in any suitable location, such as on the skid 420 for the skid-based application. As discussed above, the injection input may include an automatic injection input 606 and a manual injection input 608, with the automatic injection input 606 including one or more preprogrammed resin and catalyst values, such as a pre-set volume of resin and catalyst or a pre-set pressure of the delivery line or lines. By monitoring the pressure of the delivery line using a pressure sensor or transducer, the control module 372 is configured to stop the delivery of resin and catalyst once a pre-set pressure within the delivery line is obtained, with the pre-set pressure corresponding to a typical pressure of the delivery line when the borehole has been suitably filled with resin and catalyst. The manual injection input 608 may include the user-inputted selection of cylinders 386, 388, 526 and the selection of a volume for each cylinder, although the manual injection input 608 may also allow the manual actuation and stopping of each cylinder 386, 388, 526. The method further includes the step 610 of determining resin and catalyst volumes within the resin and catalyst injection cylinders 386, 388, which may be determined using a signal received by the control module 372 from the linear encoders. In particular, based on the position of the pistons 522, 524 of the resin and catalyst injection cylinders 386, 388, a volume of resin and catalyst remaining in chambers 404, 406 of the cylinders can be calculated using the equation: volume=$\pi r^2 h$. If an ample supply of resin and catalyst are available, the method executes the injection sub-routine 612 shown in FIG. 42. If an ample supply of resin and catalyst are unavailable, the control panel 414 may display a notification to user indicating that resin and/or catalyst need to be loaded via the load cylinders 378. In one aspect, an ample supply is a minimum volume of resin and catalyst necessary to complete the selected injection routine. The minimum volume of resin and catalyst may be the automatic pre-set resin and catalyst volumes, the manually-inputted resin and catalyst volumes, or any other volumes required by an automatic or manually-inputted injection routine.

Figure 42:
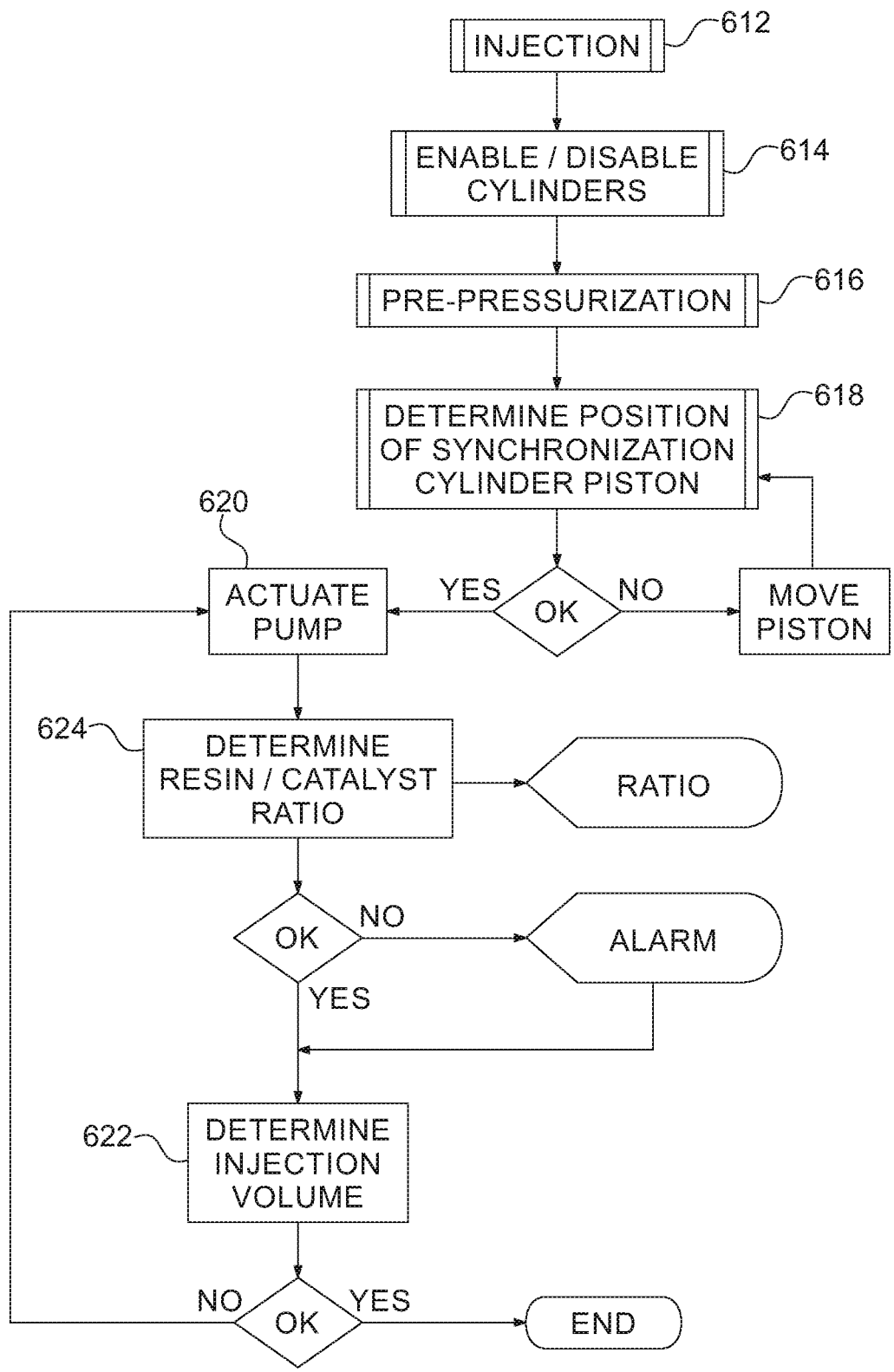
FIG. 42 is a schematic view of the method of FIG. 41, showing an injection sub-routine according to one aspect of the invention.
Figure 43:
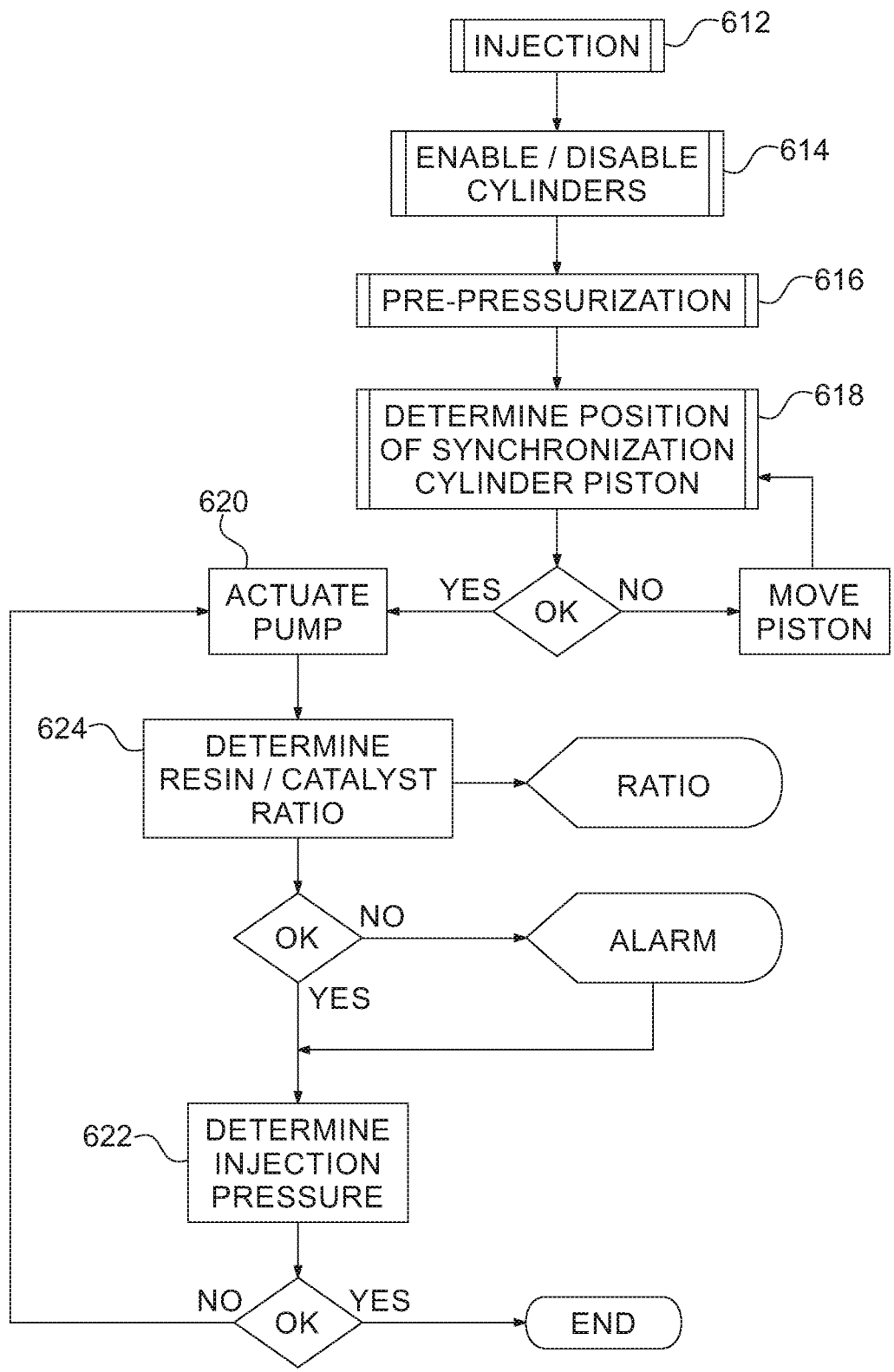
FIG. 43 is a schematic view of the method of FIG. 41, showing an injection sub-routine according to one aspect of the invention.
Figure 44:
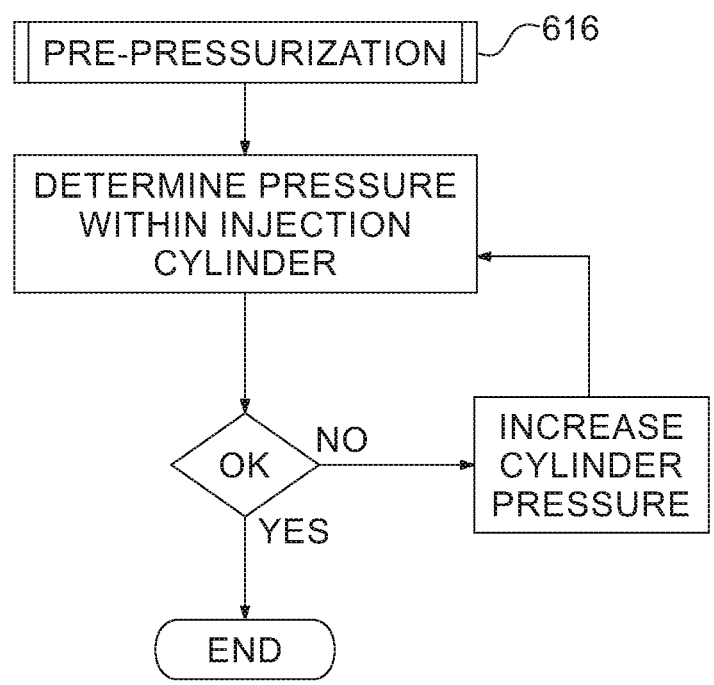
FIG. 44 is a schematic view of the method of FIG. 41, showing a pre-pressurization sub-routine according to one aspect of the invention.

Referring to FIGS. 42-44, the injection sub-routine 612 of the method includes the step 614 of enabling or disabling the resin, synchronizing, or catalyst cylinders 386, 388, 526 if independent control of the cylinders is required based on the injection input. The method also includes a pre-pressurization sub-routine 616 that is configured to pre-pressurize the resin and catalyst chambers 404, 406 to ensure any air has been sufficiently removed and also to pre-pressurize the chambers to ensure adequate flow upon injection. In particular, as the resin is more viscous than the catalyst, the resin chamber 404 may be pre-pressurized at a pressure higher than the catalyst chamber 406 to ensure adequate flow the resin, particularly for long runs of the delivery line. The pre-pressurization includes determining a pressure within the resin and catalyst injection cylinders and separately increasing pressure within the resin and catalyst injection cylinders until a predetermined pressure value within the resin and catalyst injection cylinder is reached. The injection sub-routine 612 of the method further includes the step 618 of determining a position of a piston 528 of the synchronizing cylinder 526 and moving the piston 528 of the synchronizing cylinder 526 independently from the resin injection cylinder 386 and the catalyst injection cylinder 388.

Referring again to FIGS. 42 and 43, the injection sub-routine 612 of the method includes the steps 620, 622 of generating a signal for the hydraulic pump to actuate the resin and catalyst cylinders and determining whether a resin and catalyst value corresponding to the injection input has been obtained. For an automatic or manual injection input, the control module 372 is configured to determine whether the inputted resin and catalyst volume (FIG. 42) or the inputted resin and catalyst pressure (FIG. 43) has been met. If the inputted resin and catalyst volume (FIG. 42) or the inputted resin and catalyst pressure (FIG. 43) has not been met, the hydraulic pump 374 continues to feed hydraulic pressure to the resin and catalyst injection cylinders 386, 388 to deliver resin and catalyst. Once the inputted resin and catalyst volume (FIG. 42) or the inputted resin and catalyst pressure (FIG. 43) has been met, the hydraulic pump 374 is disabled or de-energized to halt the delivery of resin and catalyst. During delivery of resin and catalyst, the system 370 and method may determine a resin and catalyst ratio being delivered based on the position of the injection cylinders 386, 388 and the corresponding volume as discussed above. A ratio of resin to catalyst volume may be displayed on the control panel 414. The method may also include the step 624 of determining whether the resin to catalyst ratio is within a pre-determined range, such as a 2:1 ratio +/−1%, and, if not, sound an alarm or provide a notification to a user and/or stop the injection process. The method may also include the step of actuating isolating valves (not shown) to isolate the resin injection cylinder 386 or the catalyst injection cylinder 388 based on the injection input. Although not shown, the system 370 may further include a system shutdown input displayed on the control panel 414 that ceases all operations of the system. Further, the system 370 and corresponding method of controlling the cylinders 386, 388, 526 may provide for a number diagnostic routines to notify a user of errors in the process, malfunctioning equipment, and other issues arising. The diagnostic routines may be run via a user-inputted command into the panel 414 or may run automatically during operation of the system 370.

Accordingly, the system 370 and control module 372 are configured to carry out any of the steps of the method discussed above in connection with FIGS. 41-44.

According to a further aspect of the present invention, a computer program product for controlling the pumpable resin system 370, includes at least one non-transitory computer-readable medium including program instructions that, when executed by the control module, cause the control module to: receive an injection input from the control panel 414; determine resin and catalyst volumes within respective resin and catalyst injection cylinders 386, 388; determine whether sufficient volumes of resin and catalyst are available for executing the injection input; generate a signal for the hydraulic pump 374 to actuate the resin and catalyst cylinder 386, 388; and determine whether a resin and catalyst value corresponding to the injection input has been obtained. The computer program product may include instructions for any of the steps of the method discussed above in connection with FIGS. 41-44.

In non-limiting aspects or embodiments of the invention, the implementation of a processor as described to communicate with the cylinders 386, 388, 526, pump 374, and other components of the system 370 provides the benefit of reducing product waste, reducing the likelihood of pumping errors, and providing visual/auditory feedback to operators of the described system. The invention as described herein further provides for improved interoperability among system hardware, in addition to providing the ability to monitor, store performance data, and evaluate the efficiency of the injection process. Furthermore, the described arrangement of the system 370 provides the technical improvement of ensuring proper resin to catalyst ratio.

Referring to FIGS. 45 and 46, an injection fitting 640 according to a further aspect of the present invention includes a rotating striker bar 642, a stationary grout swivel body 644, and first and second seal members 646, 648. The striker bar 642 includes a drive surface 650 configured to engage a drive tool of a bolter machine. The striker bar 642 may be configured to be utilized with a percussion drilling machine and wet drilling with water or other suitable fluid. The first and second seals 646, 648 may be percussion resistant and configured to maintain a seal between the grout swivel body 644 and the striker bar 642 during percussion drilling. The striker bar 642 includes a threaded portion 652 for securing the striker bar 642 to a mine roof bolt. The grout swivel body 644 defines an injection port 654 in fluid communication with an interior chamber 656 defined by the grout swivel body 644. The striker bar 642 defines an injection port 658 positioned between the first and second seals 646, 648 and in fluid communication with the interior chamber 656 and the injection port 654 of the grout swivel body 644.

Referring again to FIGS. 45 and 46, during use of the fitting 640, the striker bar 642 is secured to a mine roof bolt using the threaded portion 652. The striker bar 642 is then used to drill a borehole in rock strata via the mine roof bolt, which may include percussion drilling and wet drilling with a fluid. Once drilling is complete, resin and catalyst are delivered via a delivery line to the injection port 654 of the grout swivel body 644, into the interior chamber 656, into the injection port 658 of the striker bar 642, and into a hollow core of a mine roof bolt secured to the striker bar. The striker bar 642 is then flushed with water to remove any residual resin and catalyst.

Figure 47:
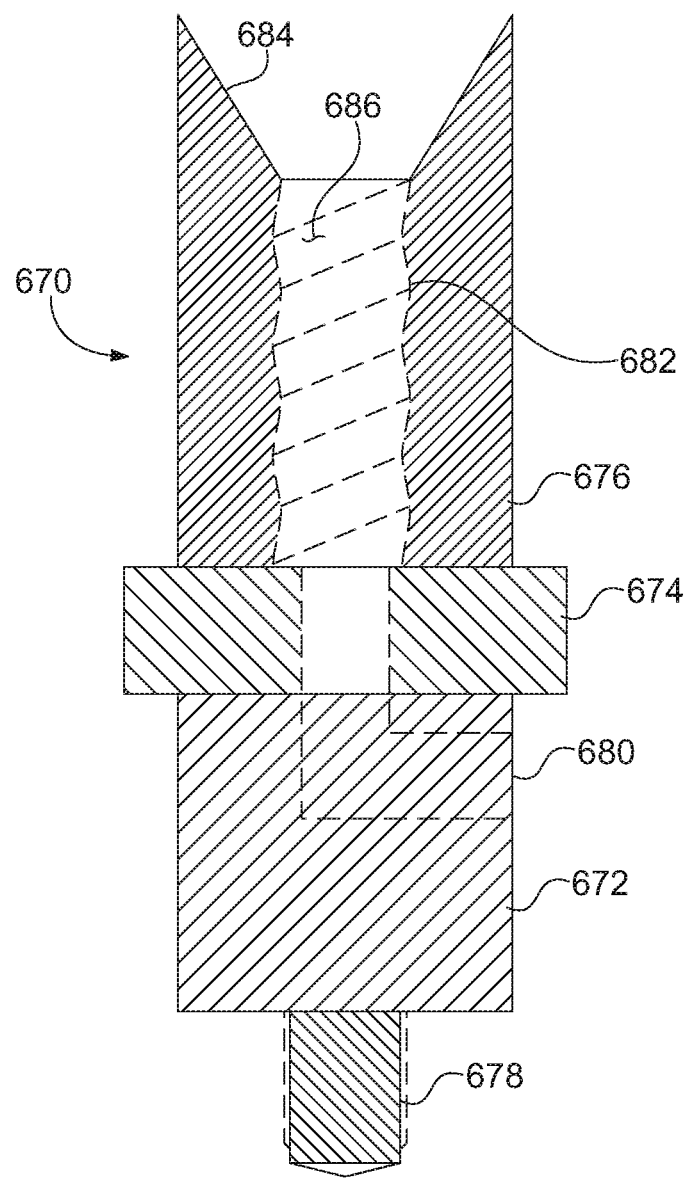
FIG. 47 is a cross-sectional view of an injection fitting according to one aspect of the present invention.

Referring to FIG. 47, an injection fitting 670 according to a further aspect of the present invention includes a stationary grout body 672, a stationary hydraulic motor 674, and a rotating body 676. The stationary grout body 672 includes a threaded shaft 678 for attaching to a bolter arm of a bolter machine. The stationary grout body 672 defines an injection port 680 configured to receive a delivery line for delivering resin and catalyst. The rotating body 676 includes a threaded portion 682 configured to be secured to a hollow core mine roof bolt. The rotating body 676 includes a frusto-conical surface 684 and is rotatable via the hydraulic motor 674. The injection port 680 is in fluid communication with a passageway 686 of the rotating body 672.

Referring again to FIG. 47, during use of the fitting 670, the threaded shaft 678 is secured to the bolter arm and the rotating body 676 is secured to the mine roof bolt via the threaded portion 682. The rotating body 676 rotates separately from the stationary grout body 672 to drill a borehole into rock strata using the mine roof bolt. The resin and catalyst is injected into the borehole via the injection port 680 through the rotating member 676, through the mine roof bolt, and into the borehole.

Referring to FIGS. 45-47, the injection fittings 640, 670 may be utilized to rotate the mine roof bolt to mix the resin and catalyst after injection into the borehole. If no static mixer is utilized during injection, minimal mixing of resin and catalyst occurs inside the injection fittings 640, 670 and inside the mine roof bolt. The resin and catalyst generally starts to mix 2-3 feet within the mine roof bolt and as the resin and catalyst exits the mine roof bolt. As the resin/catalyst are generally unmixed inside the injection fittings 640, 670 and the entry point of the mine roof bolt, the need to rush injection to prevent the resin/catalyst from hardening inside the injection fitting is eliminated. Further, as set times are not a concern with such a configuration, a faster setting resin/catalyst combination may be utilized, which can reduce installation times. Such a configuration also allows the injection fittings 640, 670 to remain on the mine roof bolt during curing. Once fully cured or hardened, the injection fittings may be removed with any unreacted material inside the fittings removed via a water flush.

While various aspects of the system were provided in the foregoing description, those skilled in the art may make modifications and alterations to these aspects or aspects without departing from the scope and spirit of the invention. For example, it is to be understood that this disclosure contemplates that, to the extent possible, one or more features of any aspect or aspect can be combined with one or more features of any other aspect or aspect. Accordingly, the foregoing description is intended to be illustrative rather than restrictive. The invention described hereinabove is defined by the specification, and all changes to the invention that fall within the meaning and the range of equivalency of the specification are to be embraced within its scope.

The invention claimed is:

1. A pumpable resin system for installation of mine bolts comprising:
   a resin injection cylinder comprising a resin chamber and a resin hydraulic cylinder;
   a catalyst injection cylinder comprising a catalyst chamber and a catalyst hydraulic cylinder, the resin hydraulic cylinder synchronized with the catalyst hydraulic cylinder;
   a hydraulic pump in fluid communication with the resin hydraulic cylinder and the catalyst hydraulic cylinder;
   a hydraulic reservoir in fluid communication with the hydraulic pump; and
   a delivery line in fluid communication with the resin injection cylinder and the catalyst injection cylinder, the delivery line configured to deliver resin and catalyst from the resin injection cylinder and catalyst injection cylinder into a borehole,
   wherein the resin hydraulic cylinder and the catalyst hydraulic cylinder comprise double-acting cylinders, the resin hydraulic cylinder fluidly connected to the catalyst hydraulic cylinder in series such that movement of the resin hydraulic cylinder results in corresponding movement of the catalyst hydraulic cylinder.

2. The system of claim 1, wherein the resin hydraulic cylinder and the catalyst hydraulic cylinder are identical in size.

3. The system of claim 1, wherein the resin chamber has a larger volume than the catalyst chamber.

4. The system of claim 1, further comprising a synchronizing cylinder in fluid communication with the resin hydraulic cylinder and the catalyst hydraulic cylinder.

5. The system of claim 4, wherein the resin hydraulic cylinder, the synchronizing cylinder, and the catalyst hydraulic cylinder each include first and second chambers positioned on opposite sides of a piston, the first chamber of the resin hydraulic cylinder in fluid communication with the hydraulic pump, the second chamber of the resin hydraulic cylinder in fluid communication with the second chamber of the synchronizing cylinder, the first chamber of the synchronizing cylinder in fluid communication with the first chamber of the catalyst hydraulic cylinder, and the second chamber of the catalyst hydraulic cylinder in fluid communication with the hydraulic reservoir.

6. The system of claim 5, wherein the resin hydraulic cylinder, the synchronizing cylinder, and the catalyst hydraulic cylinder are identical in size.

7. The system of claim 5, wherein the resin chamber has a larger volume than the catalyst chamber.

8. The system of claim 5, wherein the resin hydraulic cylinder, the synchronizing cylinder, and the catalyst hydraulic cylinder are each configured to be actuated independently.

9. The system of claim 1, further comprising:
   a resin load cylinder in fluid communication with the resin injection cylinder; and
   a catalyst load cylinder in fluid communication with the catalyst injection cylinder.

* * * * *